US011226525B2

United States Patent
Li et al.

(10) Patent No.: US 11,226,525 B2
(45) Date of Patent: Jan. 18, 2022

(54) METHODS FOR REPAIRING GATE-LINE DISCONNECTION AND SHORT CIRCUIT BETWEEN GATE LINE AND DATA GATE AND REPAIR STRUCTURE

(71) Applicants: HEFEI BOE DISPLAY TECHNOLOGY CO., LTD., Anhui (CN); BOE TECHNOLOGY GROUP CO., LTD., Beijing (CN)

(72) Inventors: Lixiong Li, Beijing (CN); Ping Chen, Beijing (CN); Hewei Wang, Beijing (CN); Song Wu, Beijing (CN); Jianwei Yu, Beijing (CN); Haitao Hu, Beijing (CN); Guodong Wu, Beijing (CN); Shuai Ji, Beijing (CN)

(73) Assignees: HEFEI BOE DISPLAY TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/768,593

(22) PCT Filed: Oct. 25, 2019

(86) PCT No.: PCT/CN2019/113218
§ 371 (c)(1),
(2) Date: May 29, 2020

(87) PCT Pub. No.: WO2020/083360
PCT Pub. Date: Apr. 30, 2020

(65) Prior Publication Data
US 2021/0173269 A1 Jun. 10, 2021

(30) Foreign Application Priority Data
Oct. 26, 2018 (CN) .......................... 201811258793.1

(51) Int. Cl.
*G02F 1/1362* (2006.01)
*G02F 1/13* (2006.01)
*G02F 1/1368* (2006.01)

(52) U.S. Cl.
CPC ...... *G02F 1/136272* (2021.01); *G02F 1/1309* (2013.01); *G02F 1/1368* (2013.01); *G02F 1/136286* (2013.01)

(58) Field of Classification Search
CPC ................................................ G02F 1/136272
See application file for complete search history.

(56) References Cited

U.S. PATENT DOCUMENTS 5,976,978 A 11/1999 Salisbury
6,462,800 B1 10/2002 Kim et al.
(Continued)

FOREIGN PATENT DOCUMENTS

CN 101581840 A 11/2009
CN 101666948 * 3/2010 ........... G02F 1/1362
(Continued)

OTHER PUBLICATIONS

First Office Action for related CN App No. 201811258793.1 dated May 25, 2020. English translation provided; 20 pages.

*Primary Examiner* — Sang V Nguyen
(74) *Attorney, Agent, or Firm* — Procopio, Cory Hargreaves & Savitch, LLP

(57) ABSTRACT

A method for repairing the gate-line disconnection includes: determining a disconnected position of a gate line; determining two connecting elements that are closest to the disconnected position and are respectively located at two sides of the disconnected position along an extending direction of the gate line; selecting one or two sub-pixels electrically connected to the two connecting elements as repair sub-pixels, determining a common electrode line coupled to a common electrode of each repair sub-pixel as a selected (Continued)

common electrode line; forming a communication path between a front portion and a rear portion at the disconnected position to bypass the disconnected position, the communication path including at least the common electrode of each repair sub-pixel and a separate line segment cut from the selected common electrode line; disconnecting the common electrode in the communication path from other common electrodes; and disconnecting each repair sub-pixel from a data line.

18 Claims, 19 Drawing Sheets

(56) References Cited

U.S. PATENT DOCUMENTS

| 2005/0030441 | A1 | 2/2005 | Song |
| 2009/0284680 | A1 | 11/2009 | Peng |
| 2017/0277008 | A1 | 9/2017 | Jiang et al. |

FOREIGN PATENT DOCUMENTS

| CN | 102798999 | A | 3/2010 | |
| CN | 102798999 | * | 11/2012 | ............... G02F 1/13 |
| CN | 103257464 | A | 8/2013 | |
| CN | 104880871 | A | 9/2015 | |
| CN | 107065343 | A | 8/2017 | |
| CN | 108287442 | A | 7/2018 | |
| CN | 101666948 | A | 3/2021 | |
| JP | 2001059976 | A | 3/2001 | |
| WO | 2005116745 | A1 | 12/2005 | |

* cited by examiner

METHODS FOR REPAIRING GATE-LINE DISCONNECTION AND SHORT CIRCUIT BETWEEN GATE LINE AND DATA GATE AND REPAIR STRUCTURE

CROSS-REFERENCE TO RELATED APPLICATIONS

This application is a national phase entry under 35 USC 371 of International Patent Application No. PCT/CN2019/113218 filed on Oct. 25, 2019, which claims priority to Chinese Patent Application No. 201811258793.1, filed with the China National Intellectual Property Administration on Oct. 26, 2018, and titled "METHODS FOR REPAIRING GATE-LINE DISCONNECTION AND SHORT CIRCUIT BETWEEN GATE LINE AND DATA GATE, DISPLAY DEVICE", which are incorporated herein by reference in their entirety.

TECHNICAL FIELD

The present disclosure relates to the field of display technologies, more particularly, to methods for repairing a gate-line disconnection and a short circuit between a gate line and a data line, and a repair structure.

BACKGROUND

An array substrate is one of core components in a display panel, and includes a plurality of signal lines disposed in different layers.

At present, during pattern processing of forming signal lines in the process of manufacturing the array substrate, the formed signal lines may have various defects due to the influence of deposition uniformity of metal materials, the cleanliness of a substrate, the precision of etching process and other factors.

With regard to the defective signal lines in the array substrate, they need to be repaired, so that the display panel may achieve the normal display.

SUMMARY

In a first aspect, a repair method for a gate-line disconnection in an array substrate is provided. The array substrate includes a plurality of sub-pixels, a plurality of gate lines, a plurality of data lines, a plurality of common electrode lines and a plurality of compensation structures. Each sub-pixel includes a transistor, a pixel electrode and a common electrode. Transistors of a row of sub-pixels are coupled to a same gate line, and transistors of a column of sub-pixels are coupled to a same data line. Common electrodes of the row of sub-pixels are coupled to a same common electrode line. Common electrodes of the plurality of sub-pixels are electrically connected through the plurality of common electrode lines and the plurality of compensation structures.

The method for repairing the gate-line disconnection includes: determining a disconnected position of a gate line; determining two connecting elements that are closest to the disconnected position and are respectively located at two sides of the disconnected position along an extending direction of the gate line on which the disconnected position is located, wherein the two connecting elements are two elements which are from transistors coupled to the gate line on which the disconnected position is located and compensation structures across the gate line and coupled to common electrodes of sub-pixels to which the gate line is coupled; selecting one or two sub-pixels electrically connected to the determined two connecting elements as repair sub-pixels from the sub-pixels coupled to the gate line on which the disconnected position is located, and determining a common electrode line coupled to a common electrode of each repair sub-pixel as a selected common electrode line; forming a communication path between a front portion and a rear portion at the disconnected position to bypass the disconnected position by using the communication path, the communication path including at least the common electrode of each repair sub-pixel and a separate line segment cut from the selected common electrode line; and disconnecting the common electrode in the communication path from other common electrodes, and disconnecting each repair sub-pixel from a data line to which the repair sub-pixel is coupled.

In some embodiments, the communication path includes at least a transistor and a pixel electrode of one repair sub-pixel, the common electrode of each repair sub-pixel, and the separate line segment cut from the selected common electrode line. Or, the communication path includes at least a compensation structure coupled to a common electrode of one repair sub-pixel, the common electrode of each repair sub-pixel, and the separate line segment cut from the selected common electrode line.

In some embodiments, a common electrode line is disposed between every two adjacent gate lines. The plurality of compensation structures are divided into a plurality of groups, and each group of compensation structures includes multiple compensation structures arranged at intervals along a column direction. Compensation structures in each group of compensation structures are alternately arranged with common electrodes of a column of sub-pixels to connect the common electrodes of the column of sub-pixels in series. The two connecting elements that are closest to the disconnected position and are respectively located at two sides of the disconnected position are two transistors, or one transistor and one compensation structure.

In some embodiments, selecting one or two sub-pixels electrically connected to the determined two connecting elements as repair sub-pixels from the sub-pixels coupled to the gate line on which the disconnected position is located, includes: if the two connecting elements that are closest to the disconnected position and are respectively located at two sides of the disconnected position are two transistors, selecting sub-pixels to which the two transistors respectively belong as a first repair sub-pixel and a second repair sub-pixel; if the two connecting elements that are closest to the disconnected position and are respectively located at two sides of the disconnected position are one transistor and one compensation structure, and a sub-pixel to which the one transistor belongs and a sub-pixel to which a common electrode coupled to the one compensation structure belongs are different sub-pixels, selecting the sub-pixel to which the common electrode coupled to the one compensation structure belongs as the first repair sub-pixel, and the sub-pixel to which the one transistor belongs as the second repair sub-pixel; and if the two connecting elements that are closest to the disconnected position and are respectively located at two sides of the disconnected position are one transistor and one compensation structure, and a sub-pixel to which the one transistor belongs and a sub-pixel to which a common electrode coupled the one compensation structure belongs are a same sub-pixel, selecting the same sub-pixel to which the one transistor belongs as the first repair sub-pixel. The first repair sub-pixel is coupled to the front portion at the disconnected position, and the second repair sub-pixel is coupled to the rear portion at the disconnected position.

In some embodiments, in a case where the two connecting elements that are closest to the disconnected position and are respectively located at two sides of the disconnected position are the two transistors and a common electrode of the second repair sub-pixel is not coupled to compensation structures, forming the communication path between the front portion and the rear portion at the disconnected position includes: coupling the front portion at the disconnected position to a common electrode of the first repair sub-pixel through a second terminal of a transistor of the first repair sub-pixel and a pixel electrode of the first repair sub-pixel; and coupling the rear portion at the disconnected position to a common electrode of the second repair sub-pixel through a second terminal of a transistor of the second repair sub-pixel and a pixel electrode of the second repair sub-pixel.

In some embodiments, in a case where the two connecting elements that are closest to the disconnected position and are respectively located at two sides of the disconnected position are the two transistors and a common electrode of the second repair sub-pixel is coupled to compensation structures, the compensation structures coupled to the common electrode of the second repair sub-pixel include a first compensation structure across the gate line on which the disconnected position is located and a second compensation structure across the selected common electrode line; and forming the communication path between the front portion and the rear portion at the disconnected position includes: coupling the front portion at the disconnected position to a common electrode of the first repair sub-pixel through a second terminal of a transistor of the first repair sub-pixel and a pixel electrode of the first repair sub-pixel; and coupling the rear portion at the disconnected position to the common electrode of the second repair sub-pixel through a second terminal of a transistor of the second repair sub-pixel and a pixel electrode of the second repair sub-pixel.

In some embodiments, in a case where the two connecting elements that are closest to the disconnected position and are respectively located at two sides of the disconnected position are the two transistors and a common electrode of the second repair sub-pixel is coupled to compensation structures, the compensation structures coupled to the common electrode of the second repair sub-pixel include a first compensation structure across the gate line on which the disconnected position is located and a second compensation structure across the selected common electrode line, and forming the communication path between the front portion and the rear portion at the disconnected position includes: coupling the front portion at the disconnected position to a common electrode of the first repair sub-pixel through a second terminal of a transistor of the first repair sub-pixel and a pixel electrode of the first repair sub-pixel; and coupling the rear portion at the disconnected position to the common electrode of the second repair sub-pixel through the first compensation structure coupled to the common electrode of the second repair sub-pixel.

In some embodiments, disconnecting the common electrode in the communication path from other common electrodes includes: disconnecting the first compensation structure and the second compensation structure coupled to the common electrode of the second repair sub-pixel from other common electrodes except the common electrode of the second repair sub-pixel.

In some embodiments, in a case where the two connecting elements that are closest to the disconnected position and are respectively located at two sides of the disconnected position are the one transistor and the one compensation structure, and the sub-pixel to which the one transistor belongs and the sub-pixel to which the common electrode coupled to the one compensation structure belongs are the same sub-pixel, compensation structures coupled to the common electrode of the first repair sub-pixel include a first compensation structure across the gate line on which the disconnected position is located and a second compensation structure across the selected common electrode line; and forming the communication path between the front portion and the rear portion at the disconnected position includes: coupling the front portion at the disconnected position to the common electrode of the first repair sub-pixel through a second terminal of a transistor of the first repair sub-pixel and a pixel electrode of the first repair sub-pixel; and coupling the rear portion at the disconnected position to the common electrode of the first repair sub-pixel through the first compensation structure coupled to the common electrode of the first repair sub-pixel.

In some embodiments, disconnecting the common electrode in the communication path from other common electrodes includes: disconnecting the first compensation structure and the second compensation structure coupled to the common electrode of the first repair sub-pixel from other common electrodes except the common electrode of the first repair sub-pixel.

In some embodiments, in a case where the two connecting elements that are closest to the disconnected position and are respectively located at two sides of the disconnected position are the one transistor and the one compensation structure, the sub-pixel to which the transistor belongs and the sub-pixel to which the common electrode coupled to the compensation structure belongs are different sub-pixels, and the first repair sub-pixel and the second repair sub-pixel are both coupled to respective compensation structures, compensation structures coupled to the common electrode of the first repair sub-pixel and compensation structures coupled to the common electrode of the second repair sub-pixel all include: a first compensation structure across the gate line on which the disconnected position is located, and a second compensation structure across the selected common electrode line; and forming the communication path between the front portion and the rear portion at the disconnected position includes: coupling the front portion at the disconnected position to the common electrode of the first repair sub-pixel through the first compensation structure coupled to the common electrode of the first repair sub-pixel; and coupling the rear portion at the disconnected position to the common electrode of the second repair sub-pixel through the first compensation structure coupled to the common electrode of the second repair sub-pixel.

In some embodiments, disconnecting the common electrode in the communication path from other common electrodes includes: disconnecting the first compensation structure and the second compensation structure coupled to the common electrode of the first repair sub-pixel from other common electrodes except the common electrode of the first repair sub-pixel; and disconnecting the first compensation structure and the second compensation structure coupled to the common electrode of the second repair sub-pixel from other common electrodes except the common electrode of the second repair sub-pixel.

In a second aspect, a repair structure for a gate-line disconnection in an array substrate is provided. The repair structure is obtained by performing the method in any of the above embodiments. The repair structure includes the disconnected gate line including the front portion and the rear portion at a disconnected position; the one or two repair sub-pixels, each repair sub-pixel including a transistor, a pixel electrode and a common electrode; and the selected common electrode line including the separate line segment coupled to the common electrode of each repair sub-pixel, the separate line segment being not coupled to other portions of the selected common electrode line. The front portion and the rear portion at the disconnected position have the communication path therebetween, and the communication path is configured to bypass the disconnected position. The communication path includes at least the common electrode of each repair sub-pixel and the separate line segment in the selected common electrode line. The common electrode in the communication path is not coupled to other common electrodes, and each repair sub-pixel is not coupled to a data line.

In some embodiments, the communication path includes at least a transistor and a pixel electrode of one repair sub-pixel, the common electrode of each repair sub-pixel, and the separate line segment in the selected common electrode line.

In some embodiments, the repair structure includes two repair sub-pixels that are a first repair sub-pixel coupled to the front portion at the disconnected position and a second repair sub-pixel coupled to the rear portion at the disconnected position, and a common electrode of the second repair sub-pixel is not coupled to compensation structures. The front portion at the disconnected position is coupled to a common electrode of the first repair sub-pixel through a second terminal of a transistor of the first repair sub-pixel and a pixel electrode of the first repair sub-pixel, and the rear portion at the disconnected position is coupled to the common electrode of the second repair sub-pixel through a second terminal of a transistor of the second repair sub-pixel and a pixel electrode of the second repair sub-pixel.

In some embodiments, the repair structure comprises two repair sub-pixels that are a first repair sub-pixel coupled to the front portion at the disconnected position and a second repair sub-pixel coupled to the rear portion at the position, and a common electrode of the second repair sub-pixel is coupled to compensation structures. The compensation structures coupled to the common electrode of the second repair sub-pixel include a first compensation structure across the gate line on which the disconnected position is located and a second compensation structure across the selected common electrode line. The front portion at the disconnected position is coupled to a common electrode of the first repair sub-pixel through a second terminal of a transistor of the first repair sub-pixel and a pixel electrode of the first repair sub-pixel. The rear portion at the disconnected position is coupled to the common electrode of the second repair sub-pixel through a second terminal of a transistor of the second repair sub-pixel and a pixel electrode of the second repair sub-pixel. The first compensation structure and the second compensation structure are not coupled to common electrodes of other sub-pixels except the second repair sub-pixel.

In some embodiments, the repair structure includes two repair sub-pixels that are a first repair sub-pixel coupled to the front portion at the disconnected position and a second repair sub-pixel coupled to the rear portion at the disconnected position, and a common electrode of the second repair sub-pixel is coupled to compensation structures. The compensation structures coupled to the common electrode of the second repair sub-pixel include a first compensation structure across the gate line on which the disconnected position is located and a second compensation structure across the selected common electrode line. The front portion at the disconnected position is coupled to a common electrode of the first repair sub-pixel through a second terminal of a transistor of the first repair sub-pixel and a pixel electrode of the first repair sub-pixel. The rear portion at the disconnected position is coupled to the common electrode of the second repair sub-pixel through the first compensation structure coupled to the common electrode of the second repair sub-pixel. The first compensation structure and the second compensation structure are not coupled to common electrodes of other sub-pixels except the second repair sub-pixel.

In some embodiments, the repair structure includes one repair sub-pixel that is coupled to the front portion at the disconnected position and compensation structures. The compensation structures coupled to a common electrode of the repair sub-pixel include a first compensation structure across the gate line on which the disconnected position is located and a second compensation structure across the selected common electrode line. The front portion at the disconnected position is coupled to the common electrode of the repair sub-pixel through a second terminal of a transistor of the repair sub-pixel and a pixel electrode of the repair sub-pixel. The rear portion at the disconnected position is coupled to the common electrode of the repair sub-pixel through the first compensation structure coupled to the common electrode of the repair sub-pixel. The first compensation structure and the second compensation structure are not coupled to common electrodes of other sub-pixels except the repair sub-pixel.

In some embodiments, the repair structure includes two repair sub-pixels that are a first repair sub-pixel coupled to the front portion at the disconnected position and a second repair sub-pixel coupled to the rear portion at the position, and common electrodes of the first repair sub-pixel and the second repair sub-pixel are both coupled to compensation structures. Compensation structures coupled to a common electrode of the first repair sub-pixel and compensation structures coupled to a common electrode of the second repair sub-pixel all include a first compensation structure across the gate line on which the disconnected position is located and a second compensation structure across the selected common electrode line. The front portion at the disconnected position is coupled to the common electrode of the first repair sub-pixel through the first compensation structure coupled to the common electrode of the first repair sub-pixel. The rear portion at the disconnected position is coupled to the common electrode of the second repair sub-pixel through the first compensation structure coupled to the common electrode of the second repair sub-pixel. The first compensation structure and the second compensation structure coupled to the common electrode of the first repair sub-pixel are not coupled to common electrodes of other sub-pixels except the first repair sub-pixel, and the first compensation structure and the second compensation structure coupled to the common electrode of the second repair sub-pixel are not coupled to common electrodes of other sub-pixels except the second repair sub-pixel.

In a third aspect, a method for repairing a short circuit between a gate lien and a data line in an array substrate is provided. The method includes: determining a short-circuit position between a gate line and a data line; disconnecting two sides of and adjacent to the short-circuit position on the gate line along an extending direction of the gate line to form a disconnection; and repairing the gate line with the disconnection by using the method for repairing the gate-line disconnection in some embodiments above.

In a fourth aspect, an array substrate is provided, which includes the repair structure for the gate-line disconnection in any of the embodiments above.

In a fifth aspect, a display device is provided, which includes the array substrate provided in the above aspects.

BRIEF DESCRIPTION OF THE DRAWINGS

In order to describe technical solutions in embodiments of the present disclosure or in the prior art more clearly, the accompanying drawings to be used in the description of embodiments or the prior art will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

Figure 1:
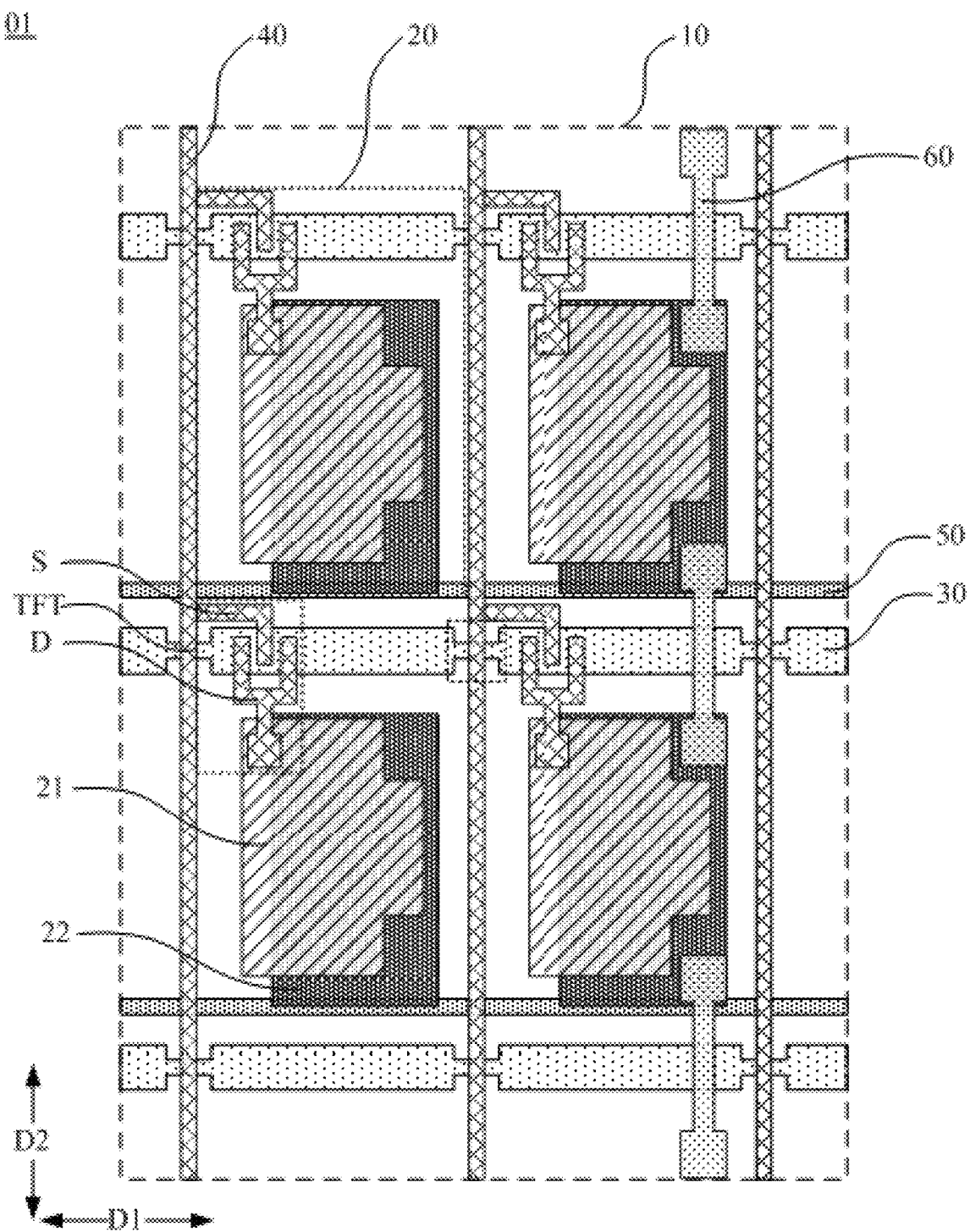
FIG. 1 is a schematic top view showing a local structure of an array substrate according to the related technology.

The technical solutions in the embodiments of the present disclosure will be described clearly and completely in conjunction with the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

The terms "first" and "second" below are only used for description and may not be interpreted as an indication or implication of relative importance or an implication of the quantity of technical features indicated. Features with "first" and "second" may thus include one or more such features explicitly or implicitly. "A plurality of" in the description of embodiments of the present disclosure means two or more unless otherwise specified.

It will be noted that all terms, including technical and scientific terms, used in the embodiments of the present disclosure have the same meanings as the common understanding of persons of ordinary skills in the art to which the present disclosure belongs unless otherwise defined. It will also be understood that terms as defined in a common dictionary should be interpreted to have the same meanings as in the context of relevant technologies and should not be interpreted with idealized or extremely formalized meanings unless so explicitly defined herein.

For example, the terms "first" and "second" and similar terms used in the description and claims of the present disclosure do not indicate any sequence, quantity or importance and are only used to distinguish different components. "Include" or "comprise" and similar terms mean that elements or items before the term cover those after the term and their equivalents and do not exclude other elements or items. Terms indicating an orientation or a position relation such as "on/above", "under/below", "row/row direction" and "column/column direction" are simplified descriptions based on the orientation/position relation shown in the accompanying drawings and only for describing the technical solutions of the present disclosure rather than an indication or implication that the device or element referred to must have the specific orientation and be constructed and operated with the specific orientation and therefore may not be understood as restrictions on the present disclosure.

For example, in some cases, the embodiments involving the "row direction" may also be implemented in the "column direction", and vice versa. The solutions of the present disclosure shall also be subject to the protection scope of the present disclosure after being rotated by 90° or mirrored.

Various signal lines in the array substrate of the display panel may have defects such as a short circuit or a disconnection under the influence of various factors. For example, the signal lines of the array substrate include gate lines and data lines. Since a gate line and a data line are insulated by only the gate insulating layer at their intersection, the gate line and the gate line may prone to various defects. For example, a disconnection (Open) may occur in the gate line and/or the data line, which may cause the gate line and/or data line in which the disconnection occurs to fail to transmit corresponding signals normally, thereby influencing the display effect of the display panel; and a short circuit may occur at the intersection of the gate line and the data line (i.e., data gate short, abbreviated as DGS), which may cause the signals of the gate line and the data line to affect each other, so that the display panel may not achieve normal display.

In the related art, after the array substrate is used to form the display panel, for example, after the array substrate and an opposite substrate are packaged to form a liquid crystal display panel, it is required to conduct a cell test on each display panel to determine its quality. The cell test includes a detection of defects of all signal lines and further repairs.

For easy description, the structure of the array substrate involved herein is first described by way of examples below.

FIG. 1 is a schematic top view of a local structure of an array substrate 01. The array substrate 01 includes a base substrate 10, and a plurality of sub-pixels 20, a plurality of gate lines 30, a plurality of data lines 40, a plurality of common electrode lines 50 and a plurality of compensation structures 60 that are disposed on the base substrate 10.

With continued referring to FIG. 1, each sub-pixel 20 includes a transistor (e.g., a thin film transistor, abbreviated as TFT), a pixel electrode 21 and a common electrode 22. The plurality of sub-pixels 20 included in the array substrate 01 are arranged in an array of multiple rows and columns. Herein, the row direction in which multiple sub-pixels 20 are arranged is a first direction D1, and the column direction in which multiple sub-pixels 20 are arranged is a second direction D2. It can be understood that the row direction and the column direction in which the plurality of sub-pixels 20 are arranged intersect each other. That is, the first direction D1 and the second direction D2 intersect each other. For example, the first direction D1 and the second direction D2 are perpendicular to each other.

Transistors TFT of each row of sub-pixels 20 (for example, each row of sub-pixels 20 arranged along the first direction D1) are coupled to a gate line 30, and transistors TFT of a same row of sub-pixels 20 are coupled to a same gate line 30. Transistors TFT of each column of sub-pixels 20 (for example, each column of sub-pixels 20 arranged along the second direction D2) are coupled to a data line 40, and transistors TFT of a same column of sub-pixels 20 are coupled to a same data line 40.

Common electrodes 22 of the plurality of sub-pixels 20 are electrically connected through the plurality of common electrode lines 50 and the plurality of compensation structures 60. Common electrodes 22 of each row of sub-pixels 20 are coupled to a common electrode line 50, and common electrodes 22 of a same row of sub-pixels 20 are coupled to a same common electrode line 50.

It will be noted that, since FIG. 1 is a schematic top view of a local structure of an array substrate 01 and only shows the top view of a portion of the array substrate 01 with various structures, the base substrate 10 is represented only with a dotted box in FIG. 1 and the actual number of the sub-pixels 20 included in the array substrate 01 is much greater than the number shown in FIG. 1. FIG. 1 is only illustrative.

It will be understood that transistors TFT of each row of sub-pixels 20 are coupled to a gate line 30, so that the gate line 30 provides a scanning signal to each transistor TFT coupled to the gate line.

Control terminals (often referred to as gates) of the transistors TFT of each row of sub-pixels 20 are coupled to a gate line 30. The gate of the transistor TFT may be a protrusion from the gate line 30, or the gate of the transistor TFT may also be a portion of the body of the gate line 30 along its extending direction. FIG. 1 shows only the latter case as an example, that is, "the gate is a portion of the body of the gate line 30 along its extending direction". That is, in FIG. 1, the gate of the transistor TFT is the portion of the gate line 30 connected to remaining portions of the transistor TFT. Patterns of the gate and the gate line can follow various structures in the related art, which are not limited herein.

Transistors TFT of each column of sub-pixels 20 are coupled to a data line 40, so that the data line 40 provides a data signal to each transistor TFT coupled to the data line to control the display panel formed after assembly of the array substrate 01 and the opposite substrate to display images.

For example, first terminals of the transistors TFT of each column of sub-pixels 20 are coupled to a data line 40. The first terminal of the transistor TFT may be an input called as a source and the second terminal of the transistor TFT may be an output called as a drain. Therefore, the sentence "the first terminals of the transistors TFT of each column of sub-pixels 20 are coupled to a data line 40" can be understood as that sources of the transistors TFT of each column of sub-pixels 20 are coupled to the data line 40. In this case, drains of the transistors TFT of each column of sub-pixels 20 are coupled to a column of pixel electrodes 21.

It will be noted that, although the embodiments provided in the present disclosure are described by taking an example in which the source of the transistor TFT is coupled to a data line and the drain of the transistor TFT is coupled to a pixel electrode, persons of ordinary skills in the art should understand that the first terminal of the transistor TFT may be called as the output, i.e., the drain, and the second terminal of the transistor TFT may be called as the input, i.e., the source due to the interchangeability of the source and the drain of the transistor in terms of structure and composition. This is an equivalent transformation of the embodiments of the present disclosure.

Of course, the array substrate 01 further includes insulating layers for isolating different conductive layers, for example, a gate insulating layer provided for isolating the gate pattern layer from the source-drain pattern layer. The gate pattern layer includes the gates of the transistors TFT and the gate lines 30, and the source-drain pattern layer includes the sources S and the drains D of the transistors TFT and the data lines 40. For another example, a passivation layer is provided for isolating the pixel electrodes 21 from the common electrodes 22. In addition, of course, the transistor TFT further includes structures such as an active layer.

Since the embodiments of the present disclosure do not involve any improvement of the specific structures of the insulating layers and the transistor TFT in the array substrate, the active layer in the transistor TFT and the insulating layers are not shown in FIG. 1, and the related technologies may be adopted for the specific position of each insulating layer, the specific structure of the transistor TFT and the shape of each electrode structure, which are not limited in the embodiments of the present disclosure.

In the embodiments of the present disclosure, common electrodes 22 of the sub-pixels 20 of the array substrate 01 are independent block electrodes rather than a whole plate-shaped electrode layer, and the common electrodes 22 are configured to transmit the same common voltage signal. Therefore, the common electrodes 22 of each row of sub-pixels 20 are coupled to a corresponding common electrode line 50, so as to receive the common voltage signals.

Herein, in some embodiments, the common electrode 22 is made of transparent conductive oxide material(s) such as indium tin oxide (ITO), and the common electrode line 50 and the gate line 30 are arranged in a same layer and made of metal materials with low resistivity such as copper (Cu). That is to say, the common electrode 22 and the common electrode line 50 are formed by different pattern treatment processes and it is difficult to form them simultaneously in the same pattern treatment process. Therefore, in order to ensure good electrical connection of the common electrode and the common electrode line, each common electrode 22 of each row of sub-pixels 20 is electrically connected to a common electrode line 50 through a portion of the common electrode 22 having an overlapping region with the common electrode line 50.

That is, the common electrodes 22 of each row of sub-pixels 20 may be coupled to a corresponding common electrode line 50 in a manner that each common electrode 22 of each row of sub-pixels 20 is electrically connected to a common electrode line 50 through a portion of the common electrode having an overlapping region with the common electrode line 50. The coupling manner may also be: each common electrode 22 of each row of sub-pixels 20 being bridged to a common electrode line 50 through a conductive structure so that each common electrode 22 of the row of sub-pixels 20 is electrically connected (i.e., coupled) to the common electrode line 50.

It will be noted that the so-called "overlapping region" in the embodiments of the present disclosure above and below refers to a region where orthographic projections of two structures on the base substrate 10 overlap.

In a case where the common electrode 22 and the common electrode line 50 are located in a same layer, their portions having an overlapping region therebetween may directly overlap to achieve an electrical connection. In a case where the common electrode 22 and the common electrode line 50 are located in different layers (i.e., an insulating layer is provided between the common electrode and the common electrode line), their portions having the overlapping region therebetween may be connected through via hole(s) passing through the insulating layer at a corresponding position to achieve an electrical connection.

In some embodiments, common electrodes 22 of the plurality of sub-pixels 20 are electrically connected through the plurality of common electrode lines 50 and the plurality of compensation structures 60. Each compensation structure 60 is located between two adjacent common electrodes 22 arranged in the column direction and is coupled to the two common electrodes 22, so that a column of common electrodes 22 may be connected in series by a column of compensation structures 60 provided. As a result, the compensation structures 60 and the common electrode lines 50 together form a grid-like electrical connection path, enabling the common electrodes 22 of the plurality of sub-pixels 20 to be electrically connected through the plurality of common electrode lines 50 and the plurality of compensation structures 60, thereby reducing the resistance of the overall structure (i.e., Com structure) composed of the common electrodes 22 and the common electrode lines 50 and improving the uniformity of the voltage applied to the Com structure.

The manner in which the compensation structure 60 is connected to the two adjacent common electrodes 22 arranged in the column direction includes, but is not limited to, the electrical connection between the compensation structure 60 and the two adjacent common electrodes 22 arranged in the column direction through portions of the compensation structure respectively having overlapping regions with the two adjacent common electrodes 22. Or, the compensation structure 60 may be connected to the two adjacent common electrodes 22 arranged in the column direction in a manner that the compensation structure 60 is bridged to the two adjacent common electrodes 22 through conductive structures respectively, so that the two adjacent common electrodes 22 are electrically connected together.

For example, the compensation structure 60 electrically connects the two adjacent common electrodes 22 arranged in the column direction together through the portions of the compensation structure respectively having overlapping regions with the two adjacent common electrodes 22. The shape of the overlapping region between the compensation structure 60 and the corresponding common electrode 22 includes, but is not limited to, the rectangle shown in FIG. 1, and the middle portion of the compensation structure 60 connecting the two upper and lower rectangles and across the gate line 30 includes, but is not limited to, the strip schematically shown in FIG. 1.

The specific shapes of the pixel electrode 21 and the common electrode 22 in the array substrate 01 are not limited as long as the pixel electrode 21 and the common electrode 22 are arranged oppositely, that is, there is an overlapping region between the two, forming a corresponding electric field for driving the deflection of liquid crystal molecules. Graphs of the pixel electrode 21 and the common electrode 22 shown in FIG. 1 are only illustrative.

Figure 2:
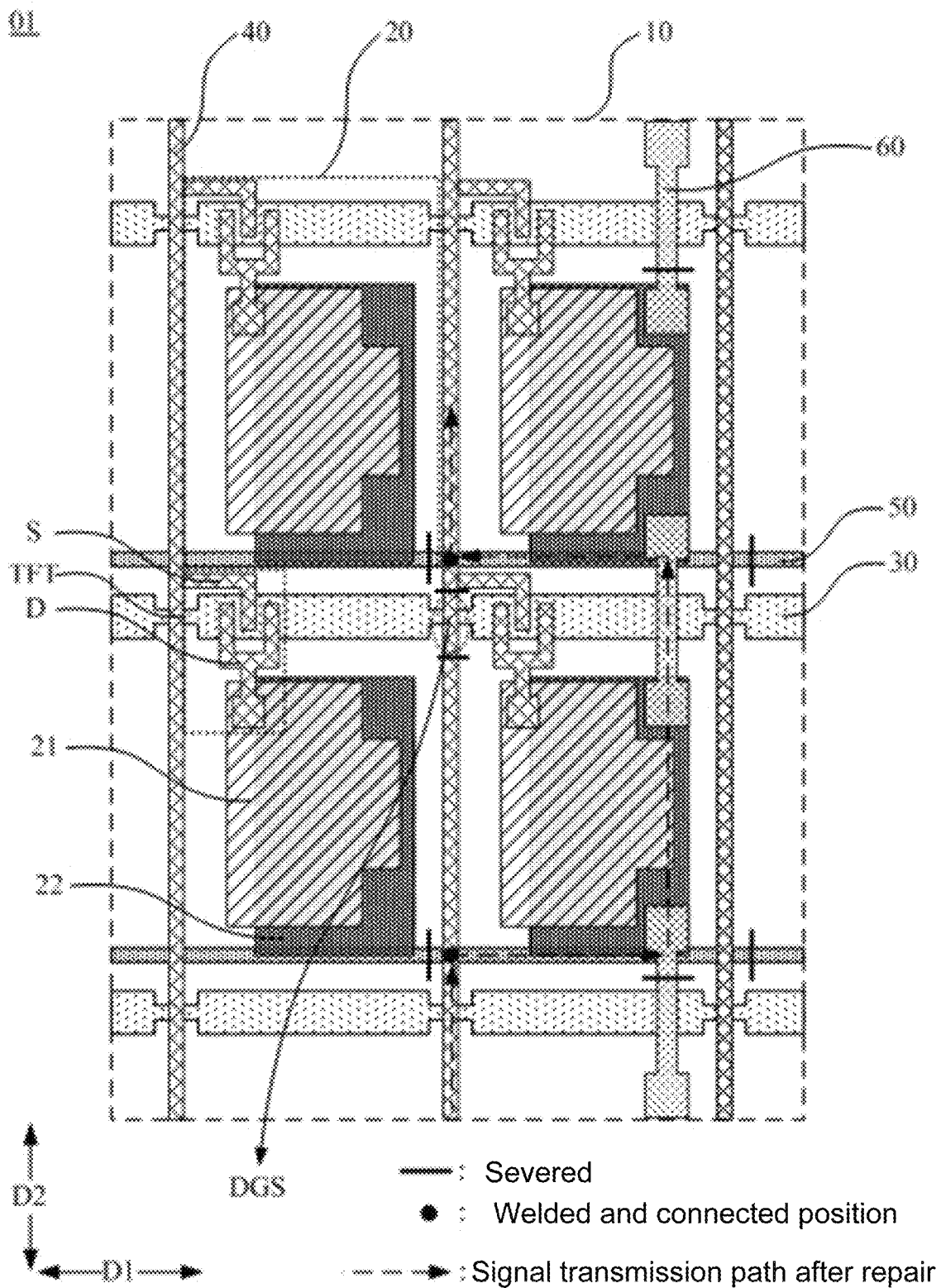
FIG. 2 is a schematic diagram showing a method for repairing a short circuit between a gate line and a data line according to the related technology.

With regard to the array substrate 01, after the array substrate 01 and the opposite substrate are packaged to form a liquid crystal display panel, if the liquid crystal display panel formed by package is detected and the detected defect is a short circuit between a data line and a gate line (DGS), one repair method is to convert the DGS into a disconnection of the data line and repair the disconnected data line with the help of structures such as a common electrode in the sub-pixel. As shown in FIG. 2, the repair process is as follows.

(1) The short-circuited data line 40 is severed at both sides of the short-circuit position (i.e., the intersection of the gate line 30 and the data line 40) along the extending direction of the data line 40, so as to form the disconnection of the data line 40.

(2) Two sides of the disconnected positions of the data line 40 are respectively welded and connected to the common electrode lines 50.

(3) Since the common electrode 22 of the sub-pixel 20 near the disconnected positions is electrically connected to a common electrode 22 of an adjacent sub-pixel 20 in a previous row through a compensation structure 60 while the common electrode 22 of the adjacent sub-pixel 20 in the previous row is electrically connected to a common electrode line 50 adjacent to the originally short-circuited gate line 30, in order to prevent the data line signal originally loaded on the data line 40 from being loaded onto the common electrodes 22 of other sub-pixels 20 after the common electrode lines 50 respectively at the two sides of the disconnected positions of the data line 40 are welded and connected together, it is required to sever the two common electrode lines 50 and compensation structures 60 each of which is between a common electrode 22 in the two sub-pixels 20 and other common electrodes 22, so that the data line signal loaded on the disconnected data line 40 can be transmitted by means of the common electrode 22 near the disconnected positions.

The above repair method needs to sacrifice two sub-pixels 20. That is, two sub-pixels 20 may not achieve normal display and will become dark spots after repair.

Figure 3:
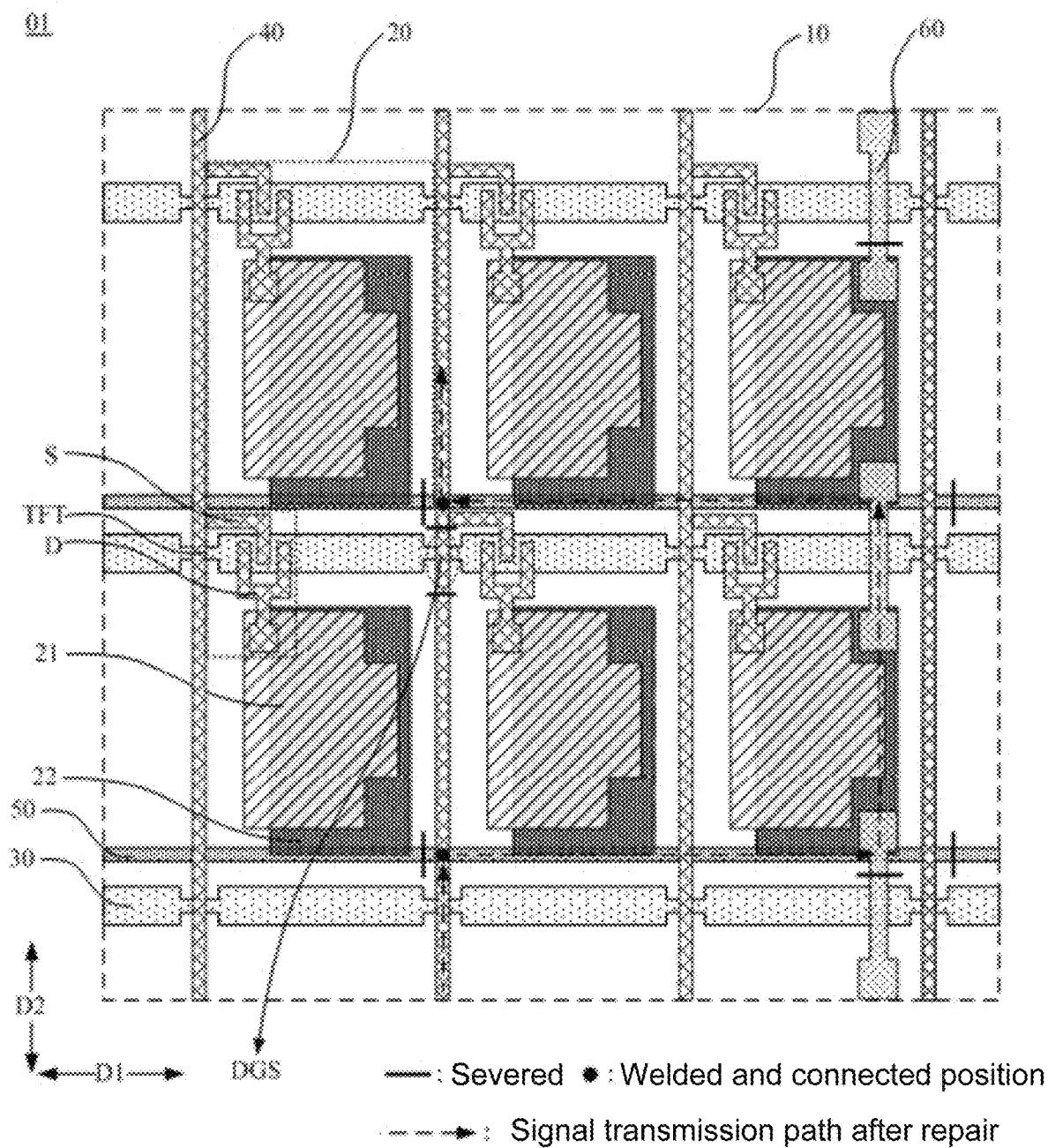
FIG. 3 is a schematic diagram showing another method for repairing a short circuit between a gate line and a data line according to the related technology.

However, in a case where the short-circuit position between the gate line 30 and the data line 40 (i.e., the position of the DGS) and the compensation structure 60 are separated by two sub-pixels 20 in the direction of the gate line (i.e. the row direction) as shown in FIG. 3, in order to prevent the data line signal originally loaded on the data line 40 from being loaded onto the common electrodes 22 of other sub-pixels 20 after the common electrode lines 50 at the two sides of the disconnected positions of the data line 40 are welded and connected together, it is required to sever compensation structures 60 each of which is between a common electrode 22 of four sub-pixels 20 and other common electrodes 22 in addition to the two common electrode lines at both sides of the disconnected positions.

In this way, the above repair method needs to sacrifice four sub-pixels 20. That is to say, after transmission of the data line signal loaded on the disconnected data line 40 with the help of the common electrodes 22 of the four sub-pixels 20, since the common electrodes 22 of the four sub-pixels 20 cannot be loaded with the corresponding common electrode voltage, the four sub-pixels 20 may not achieve the display and will become dark spots after repair of the display device including the array substrate 01. Due to the large number of dark spots formed after the repair, the product quality of the display panel may be affected greatly.

On this basis, some embodiments of the present disclosure provide a method for repairing a short circuit between a gate line and a data line in an array substrate. In the repair method, the short-circuit position is first determined; then the short-circuited gate line is severed at two sides of the short-circuit position along the extending direction of the gate line, so as to form a disconnection of the gate line; and then the disconnected gate line is repaired by using the method for repairing a gate-line disconnection. That is to say, with regard to the short circuit between the gate line and the data line, in the embodiments of the present disclosure, the repair of the short circuit between the gate line and the data line is finally realized through conversion of the short circuit between the gate line and the data line to the disconnection of the gate line and repair of the disconnection of the gate line with a specific repair method.

To clearly describe the method for repairing the short circuit between the gate line and the data line provided in the embodiments of the present disclosure, some methods for repairing a gate-line disconnection are first introduced below, so that persons skilled in the art may have clearer understanding of the method for repairing the short circuit between the gate line and the data line after understanding the method for repairing the the gate-line disconnection.

However, the methods for repairing the gate-line disconnection in the embodiments provided below are not simply applicable to the repair process of the short circuit between the gate line and the data line, and it can be understood that these methods for repairing the gate-line disconnection are also applicable to the pure disconnection of the gate line and some other scenes that require the application of these methods for repairing the gate-line disconnection.

Figure 4:
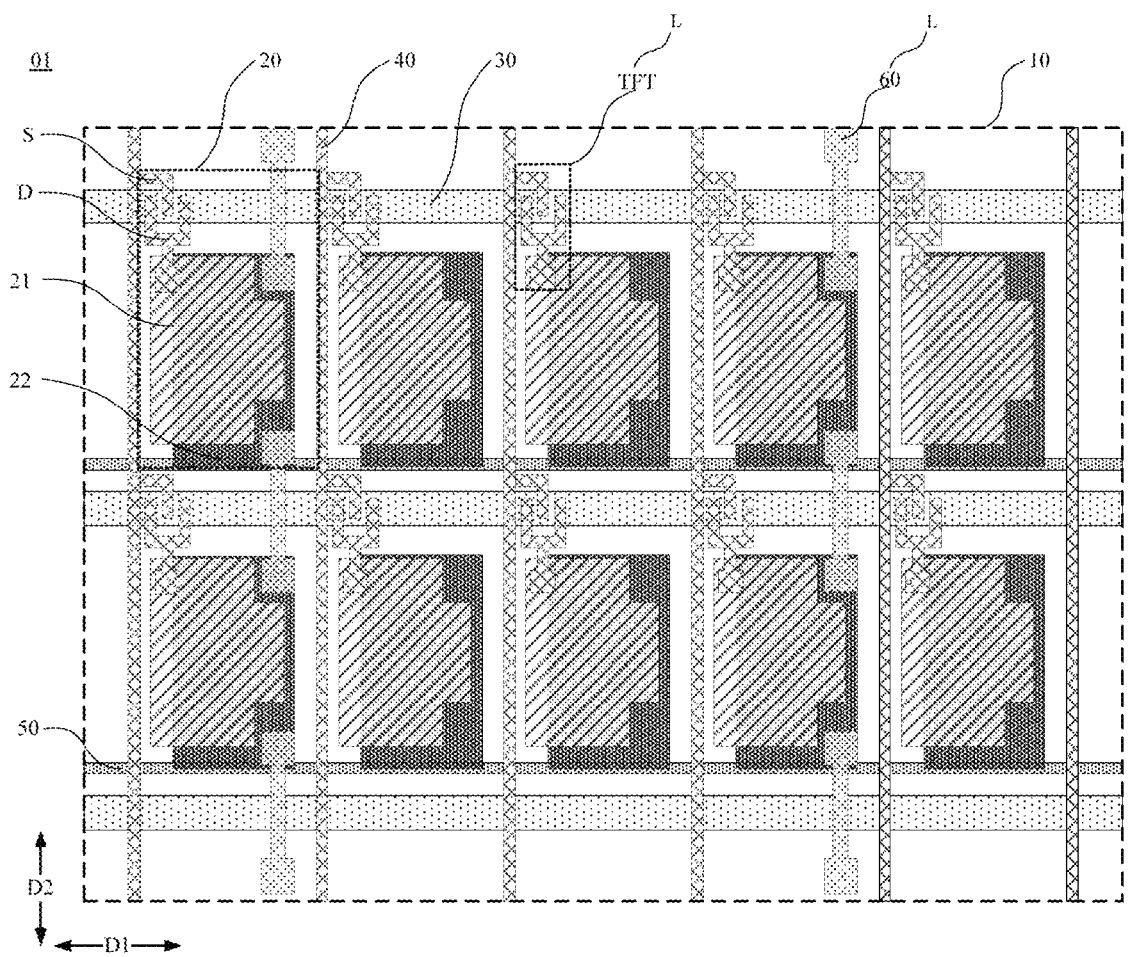
FIG. 4 is a schematic top view showing a local structure of an array substrate to which a method for repairing a gate-line disconnection is applied, in accordance with some embodiments of the present disclosure.

On this basis, some embodiments of the present disclosure provide a method for repairing a gate-line disconnection in an array substrate. As shown in FIG. 4, the array substrate 01 includes a plurality of sub-pixels 20, a plurality of gate lines 30, a plurality of data lines 40, a plurality of common electrode lines 50 and a plurality of compensation structures 60.

It can be understood that the array substrate 01 further includes a base substrate 10 on which the plurality of sub-pixels 20, the plurality of gate lines 30, the plurality of data lines 40, the plurality of common electrode lines 50 and the plurality of compensation structures 60 may be arranged.

With continued referring to FIG. 4, each sub-pixel 20 includes a transistor TFT, a pixel electrode 21 and a common electrode 22. Transistors TFT of a row of sub-pixels 20 are coupled to a same gate line 30, and transistors TFT of a column of sub-pixels 20 are coupled to a same data line 40. Common electrodes 22 of a row of sub-pixels 20 are coupled to a same common electrode line 50. Common electrodes 22 of the plurality of sub-pixels 20 are electrically connected through the plurality of common electrode lines 50 and the plurality of compensation structures 60.

With regard to the related description of the structure of the array substrate 01, reference is made to the foregoing description, which will not be elaborated here.

With continued referring to FIG. 4, as for a gate line 30 in the array substrate 01, there are multiple transistors TFT coupled to the gate line 30, and there is at least one compensation structure 60 across the gate line 30 and coupled to a common electrode 22 of a sub-pixel 20 coupled to the gate line 30. Transistors TFT coupled to a gate line 30 and compensation structures 60 that are across the gate line 30 and respectively coupled to common electrodes 22 of the sub-pixels 20 coupled to the gate line 30 are collectively referred to as connecting elements L of the gate line 30.

For example, for the second gate line 30 from up to bottom in FIG. 4, the gate line 30 is coupled to 5 transistors TFT, and there are 2 compensation structures 60 across the gate line 30 and coupled to common electrodes 22 of the 5 sub-pixels 20 coupled to the gate line 30. Therefore, the 5 transistors TFT and the 2 compensation structures 60 may be collectively referred to as connecting elements L corresponding to the gate line 30. It can be understood that the above is only described by taking the case shown in FIG. 4 as an example. In fact, for a display panel capable of displaying images normally, the array substrate may include thousands of sub-pixels. Therefore, the connecting elements L corresponding to the gate line 30 will not be limited to the 5 transistors TFT and the 2 compensation structures 60, but will include more transistors TFT and compensation structures 60.

It is not difficult to understand that the gate line 30 that has a short circuit in the array substrate 01 also corresponds to a plurality of connecting elements L, and the plurality of connecting elements L include transistors TFT coupled to the gate line 30, and compensation structures 60 across the gate line 30 and coupled to common electrodes 22 of sub-pixels 20 coupled to the gate line 30.

Figure 5:
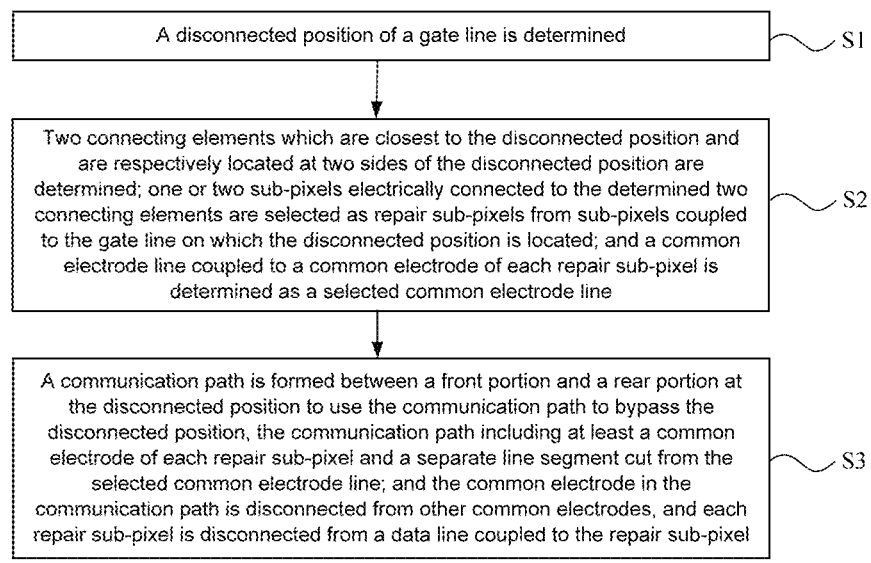
FIG. 5 is a schematic flowchart of a method for repairing a gate-line disconnection, in accordance with some embodiments of the present disclosure.

As shown in FIG. 5, in some embodiments, the method for repairing a gate-line disconnection includes S1 to S3.

In S1, a disconnected position of a gate line is determined.

In the S1, the manner of determining a disconnected position of a gate line includes, but is not limited to, the manner of manual inspection, or may also include the manner of inspection by means of a corresponding inspection equipment.

In S2, along the extending direction of the gate line on which the disconnected position is located, two connecting elements which are closest to the disconnected position and are respectively located at two sides of the disconnected position are determined; one or two sub-pixels electrically connected to the determined two connecting elements are selected as repair sub-pixels from sub-pixels coupled to the gate line on which the disconnected position is located; and a common electrode line coupled to a common electrode of each repair sub-pixel is determined as a selected common electrode line.

In the S2, the "extending direction of the gate line" is, for example, the row direction in which multiple sub-pixels 20 are arranged, for example, the first direction D1.

In addition, the two connecting elements are two elements that are in all of transistors coupled to the gate line on which the disconnected position is located and compensation structures across the gate line and respectively coupled to common electrodes of sub-pixels to which the gate line is coupled.

In S3, a communication path is formed between a front portion and a rear portion at the disconnected position to use the communication path to bypass the disconnected position, the communication path including at least a common electrode of each repair sub-pixel and a separate line segment cut from the selected common electrode line; and the common electrode in the communication path is disconnected from other common electrodes, and each repair sub-pixel is disconnected from a data line to which the repair sub-pixel is coupled.

In the S3, as shown in FIGS. 6 to 15, the disconnected position on the gate line 30 divides the corresponding portion of the gate line 30 into two segments. The "front portion" F1 at the disconnected position mentioned herein refers to one of the two segments, and the "rear portion" F2 at the disconnected position refers to the other of the two segments. For example, as shown in FIGS. 6 to 15, the disconnected position (marked "Open" in FIGS. 6 to 15, indicating a disconnection) divides the corresponding portion of the gate line 30 into two segments, i.e., a segment on the left of the disconnected position and a segment on the right of the disconnected position.

The "front portion" F1 at the disconnected position refers to a segment on the left of the disconnected position, and the "rear portion" F2 at the disconnected position refers to a segment on the right of the disconnected position. Of course, it is also possible that the "front portion" F1 at the disconnected position refers to a segment on the right of the disconnected position, and the "rear portion" F2 at the disconnected position refers to a segment on the left of the disconnected position.

Only the former case is taken herein as an example for description, that is, the "front portion" F1 at the disconnected position refers to a segment on the left of the disconnected position, and the "rear portion" F2 at the disconnected position refers to a segment on the right of the disconnected position. With regard to the disconnection repair in the latter case, reference may be made to the former case, which will not be elaborated herein.

In the S3, the so-called "bypass" is an action, that is, the gate line signal loaded on the disconnected gate line can bypass the disconnected position through the above-described communication path including at least a common electrode of each repair sub-pixel and a separate line segment cut from the selected common electrode line, so that the gate line signal can continue to be transmitted and thus is loaded into other transistors TFT connected to the gate line, and other sub-pixels except the repair sub-pixel among the row of sub-pixels can achieve normal display.

Moreover, in the S3, the "separate line segment" cut from the selected common electrode line is a line segment electrically isolated from the rest of the selected common electrode line. In addition, since the function of the communication path is to bypass the disconnected position on the gate line, and the communication path includes at least a common electrode of each repair sub-pixel and the separate line segment cut from the selected common electrode line, the separate line segment cut from the selected common electrode line is electrically connected to the common electrode of each repair sub-pixel.

Since the plurality of common electrode lines and the plurality of compensation structures form a grid-like electrical communication path, common electrodes of the plurality of sub-pixels are electrically connected through the plurality of common electrode lines and the plurality of compensation structures. Therefore, after the selected common electrode line is severed, the common voltage signal loaded on the remaining portion of the selected common electrode line except the separate line segment can be transmitted to other common electrodes that are electrically connected to the remaining portion through compensation structures at corresponding positions, so that the selected common electrode line can normally transmit a common voltage signal.

On this basis, by using the method for repairing the gate-line disconnection provided in the embodiments of the present disclosure, the disconnected position is bypassed by means of the communication path including at least a common electrode of each repair sub-pixel and a separate line segment cut from the selected common electrode line, so that the disconnection of the gate line can be repaired. The number of repairable gate lines is not limited, and the number of sub-pixels forming dark spots after one disconnected position is repaired is only 1 or 2, that is, the number of sub-pixels forming dark spots after one disconnected position is repaired is at most 2. However, with the repair method in the related art, the number of sub-pixels forming dark spots after one disconnected position is repaired is at least two, and even four for a certain disconnected position as described in the previous related art. Therefore, in comparison, by using the repair method provided in the embodiment of the present disclosure, the number of sub-pixels forming dark spots after one disconnected position is repaired is relatively small, so that the display effect after repair is good.

In some embodiments, as shown in FIGS. 6 to 14, the communication path includes at least a transistor TFT and a pixel electrode 21 of one repair sub-pixel, a common electrode 22 of each repair sub-pixel, and a separate line segment cut from a selected common electrode line.

Figure 15:
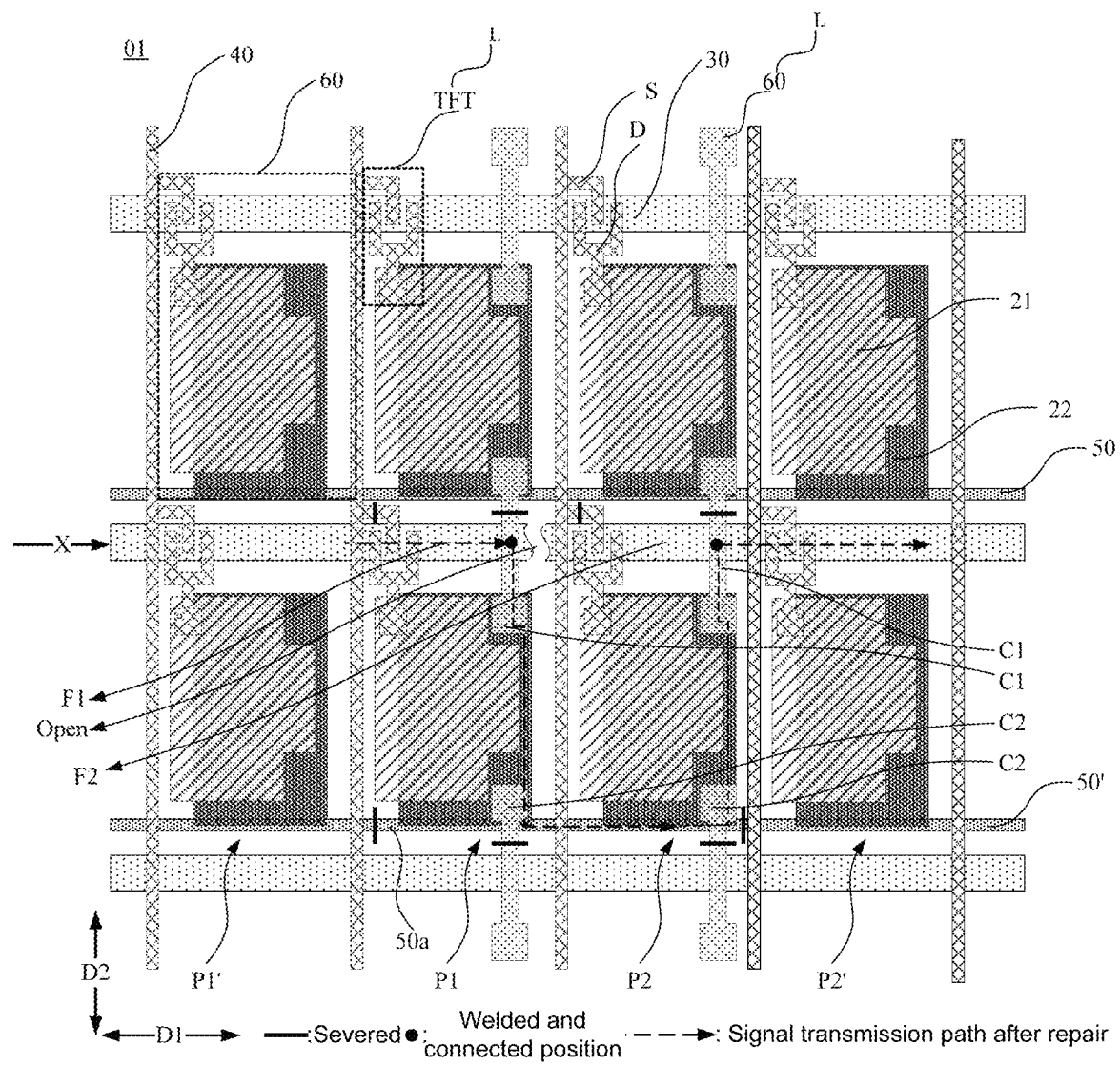
FIG. 15 is a schematic diagram showing yet another method for repairing a gate-line disconnection, in accordance with some embodiments of the present disclosure.

In some embodiments, as shown in FIG. 15, the communication path includes at least a compensation structure 60 coupled to a common electrode 22 of a repair sub-pixel, a common electrode 22 of each repair sub-pixel, and a separate line segment cut from a selected common electrode line.

With continued referring to FIG. 4, in the array substrate 01 to which the method for repairing the gate-line disconnection is applied, a common electrode line 50 is disposed between every two adjacent gate lines 30. The plurality of compensation structures 60 are divided into a plurality of groups of compensation structures, and each group of compensation structures includes multiple compensation structures 60 arranged at intervals along the column direction (the second direction D2). The compensation structures 60 of each group of compensation structures are alternately arranged with common electrodes 22 of a column of sub-pixels, and each compensation structure 60 is coupled to two common electrodes 22 adjacent in the column direction, so that compensation structures 60 of each group of compensation structures connect common electrodes 22 of a column of sub-pixels 20 in series.

Here, in the case where a common electrode line 50 is disposed between every two adjacent gate lines 30, for example, the common electrode line 50 may be disposed closer to one of the gate lines 30 (for example, one gate line 30 below the common electrode line).

With regard to the function of the compensation structure 60, reference is made to the foregoing description, which will not be elaborated here.

Here, the plurality of groups of compensation structures 60 respectively correspond to at least two columns of common electrodes 22 in the plurality of columns of common electrodes 22 included in the array substrate 01, and a group of compensation structures 60 corresponds to a column of common electrodes 22. Since each column of common electrodes 22 is located between two adjacent data lines 40, and the compensation structures 60 of each group of compensation structures are alternately arranged with common electrodes 22 of a corresponding column of sub-pixels 20, each group of compensation structures 60 is also located between two data lines 40 between which the corresponding column of common electrodes is located. The following two setting manners can be included.

First, one group of compensation structures 60 described above may be provided between every two adjacent data lines 40 in all data lines 40 included in the array substrate 01, that is, the plurality of groups of compensation structures 60 are arranged in a one-to-one correspondence with the plurality of column of common electrodes 22 included in the array substrate 01.

Second, the plurality of groups of compensation structures 60 may be respectively provided between a part of the data lines 40 among all the data lines 40 included in the array substrate 01, that is, the plurality of groups of compensation structures 60 are arranged in a one-to-one correspondence with some of the plurality of columns of common electrodes 22 included in the array substrate 01.

For example, with continued referring to FIG. 4, in the array substrate 01 to which the method for repairing the gate-line disconnection is applied, among the plurality of compensation structures 60, two adjacent groups of compensation structures 60 are separated by two columns of sub-pixels 20 arranged in the column direction (the second direction D2), that is, every three adjacent columns of sub-pixels 20 in the array substrate 01 share one column of compensation structures 60. That is, a group of compensation structures 60 is provided every three data lines 40.

The three-to-one structural design can, on the one hand, make the number of compensation structures 60 distributed in the entire substrate suitable, which is conducive to reducing the resistance of the entire Com structure. On the other hand, since the compensation structure 60 has the function of reducing the resistance of the entire Com structure, the compensation structure 60 is usually made of metal materials with lower resistivity, such as Cu, which have lower transparency. Therefore, the above-described three-to-one structural design has a smaller impact on the light transmittance, and can avoid increasing the energy consumption of the backlight module matched with the liquid crystal display panel including the array substrate 01.

It will be noted that the arrangement of the plurality of groups of compensation structures 60 in the array substrate 01 is not limited to the above-described examples, and one group of compensation structures 60 may be arranged every 2, 4, 5, 6, 7, 8, 9 or 10 data lines 40.

In the S2, the connecting elements L closest to the disconnected position on the gate line 30 and respectively located at two sides of the disconnected position may include at least the following two situations.

Figure 6:
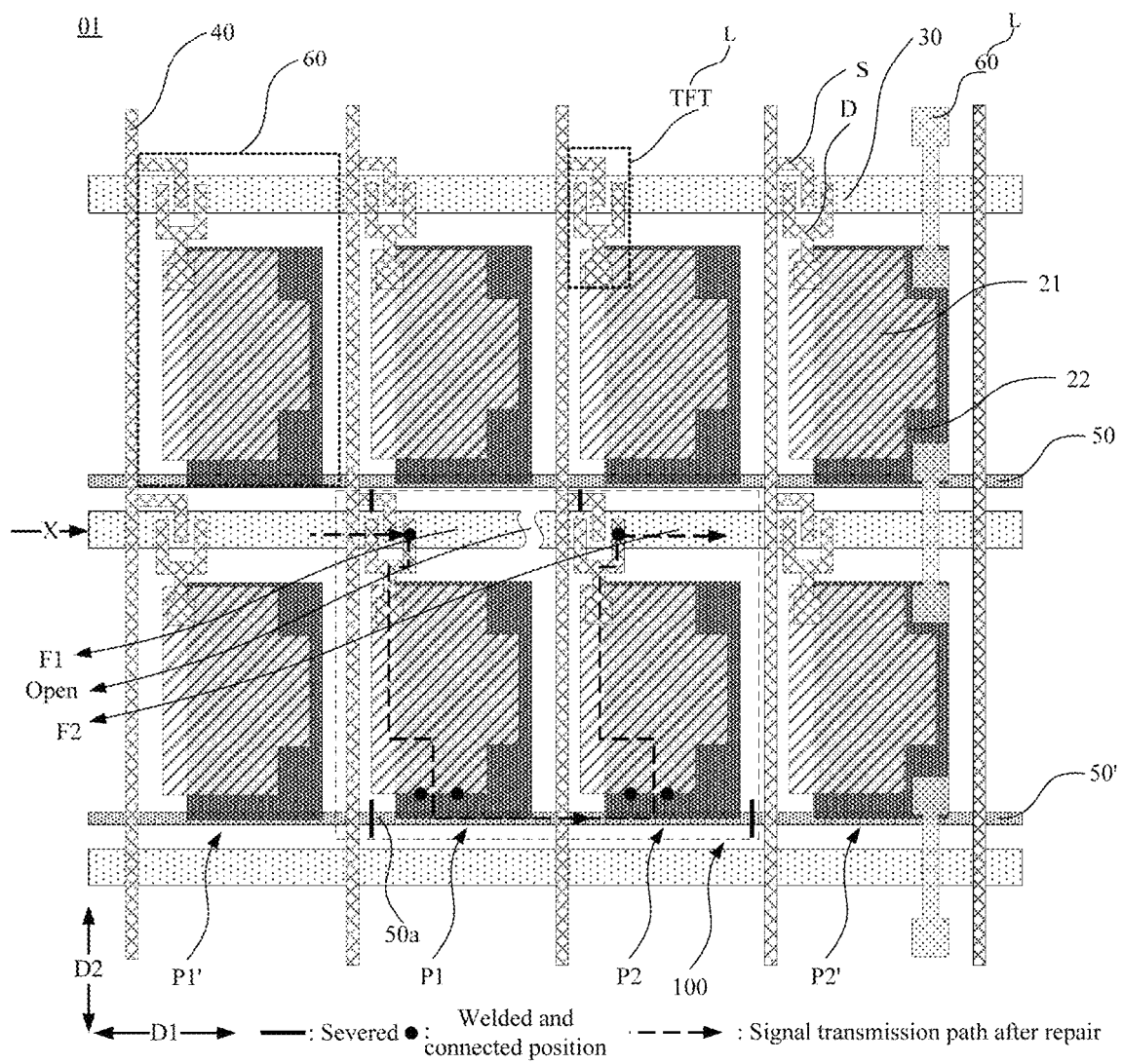
FIG. 6 is a schematic diagram showing a method for repairing a gate-line disconnection, in accordance with some embodiments of the present disclosure.
Figure 7:
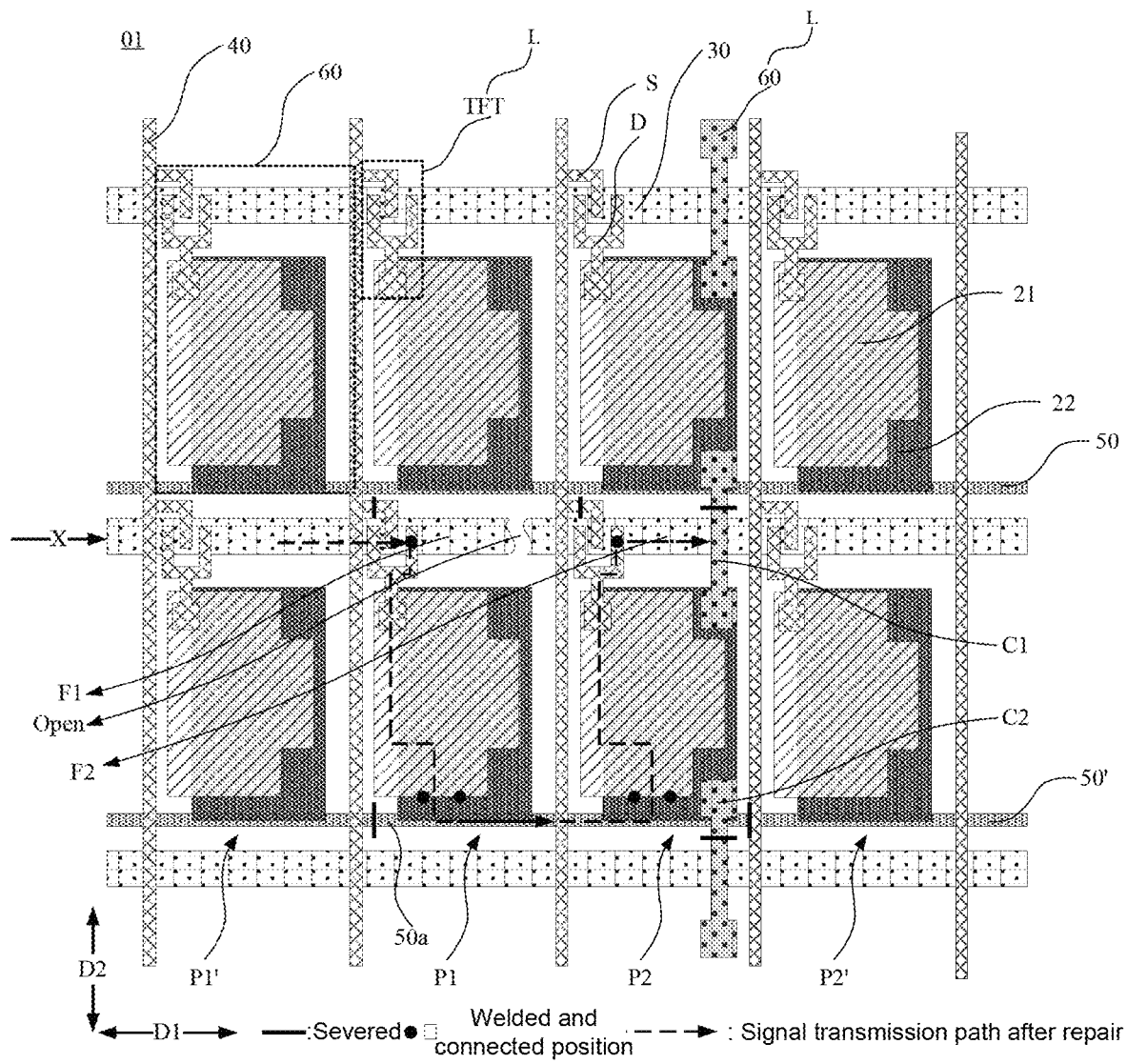
FIG. 7 is a schematic diagram showing another method for repairing a gate-line disconnection, in accordance with some embodiments of the present disclosure.
Figure 8:
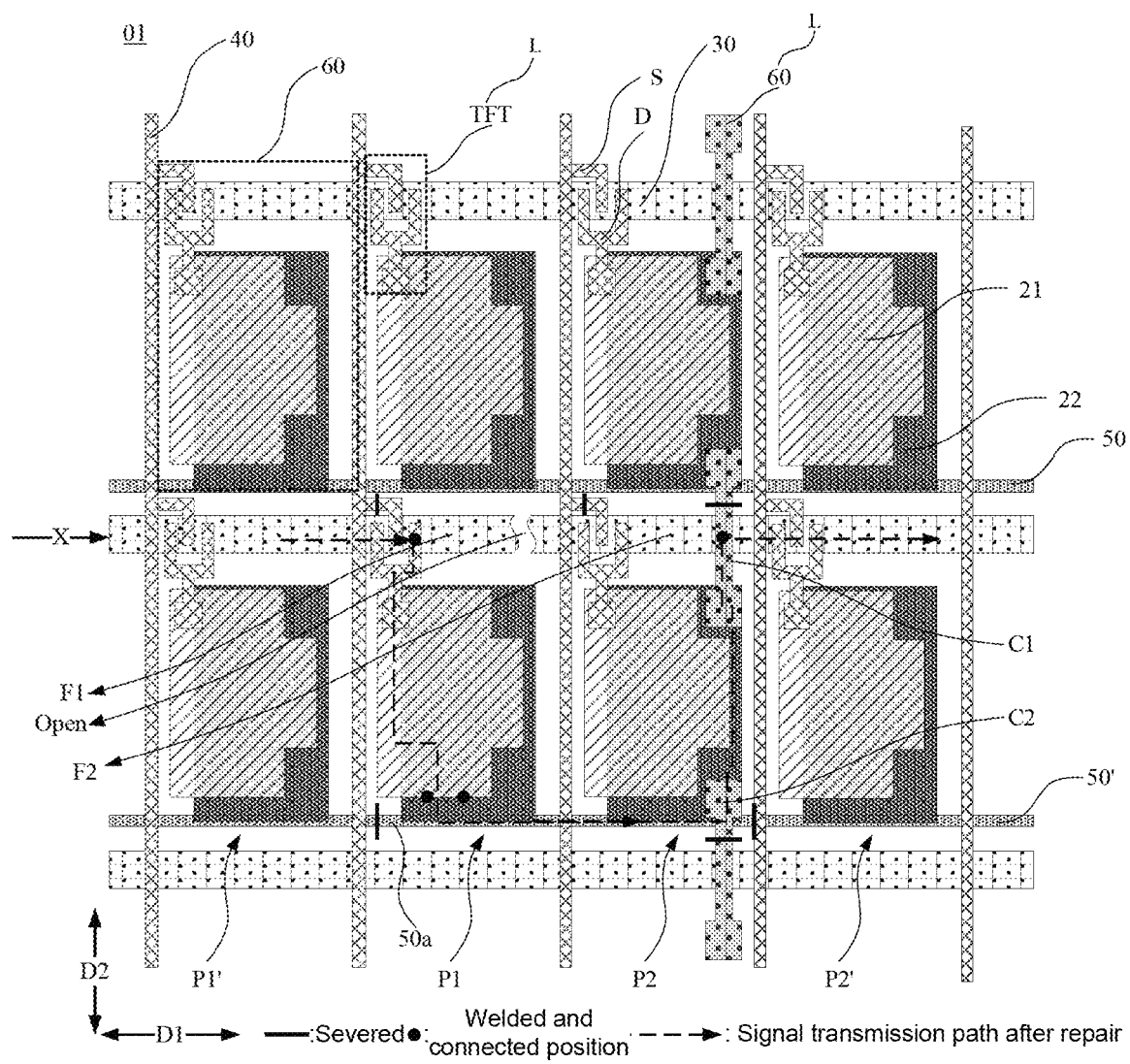
FIG. 8 is a schematic diagram showing yet another method for repairing a gate-line disconnection, in accordance with some embodiments of the present disclosure.

First, as shown in FIGS. 6 to 8, the two connecting elements L closest to the disconnected position on the gate line 30 and respectively located at two sides of the disconnected position are two transistors TFT. That is, the disconnected position (marked "Open" in FIGS. 6 to 8, indicating a disconnection) is located between the two transistors TFT.

Second, as shown in FIGS. 9 to 15, in the two connecting elements L closest to the disconnected position on the gate line 30 and respectively located at two sides of the disconnected position, one is a transistor TFT and the other is a compensation structure 60. That is, the disconnected position (marked "Open" in FIGS. 9 to 15, indicating a disconnection) is located between the transistor TFT and the compensation structure 60.

According to the different situations of the two connecting elements L, S2 includes at least the following three ways regarding how to select the repair sub-pixels.

First, as shown in FIGS. 6 to 8, if the two connecting elements L are two transistors TFT, the sub-pixels 20 to which the two transistors TFT belong respectively are selected from the sub-pixels 20 coupled to the gate line on which the disconnected position is located as a first repair sub-pixel P1 and a second repair sub-pixel P2. The first repair sub-pixel P1 is coupled to the front portion F1 at the disconnected position, and the second repair sub-pixel P2 is coupled to the rear portion F2 at the disconnected position. That is, in the process of repairing the gate-line disconnection, the first repair sub-pixel P1 and the second repair sub-pixel P2 are selected to be sacrificed to complete the repair.

Figure 9:
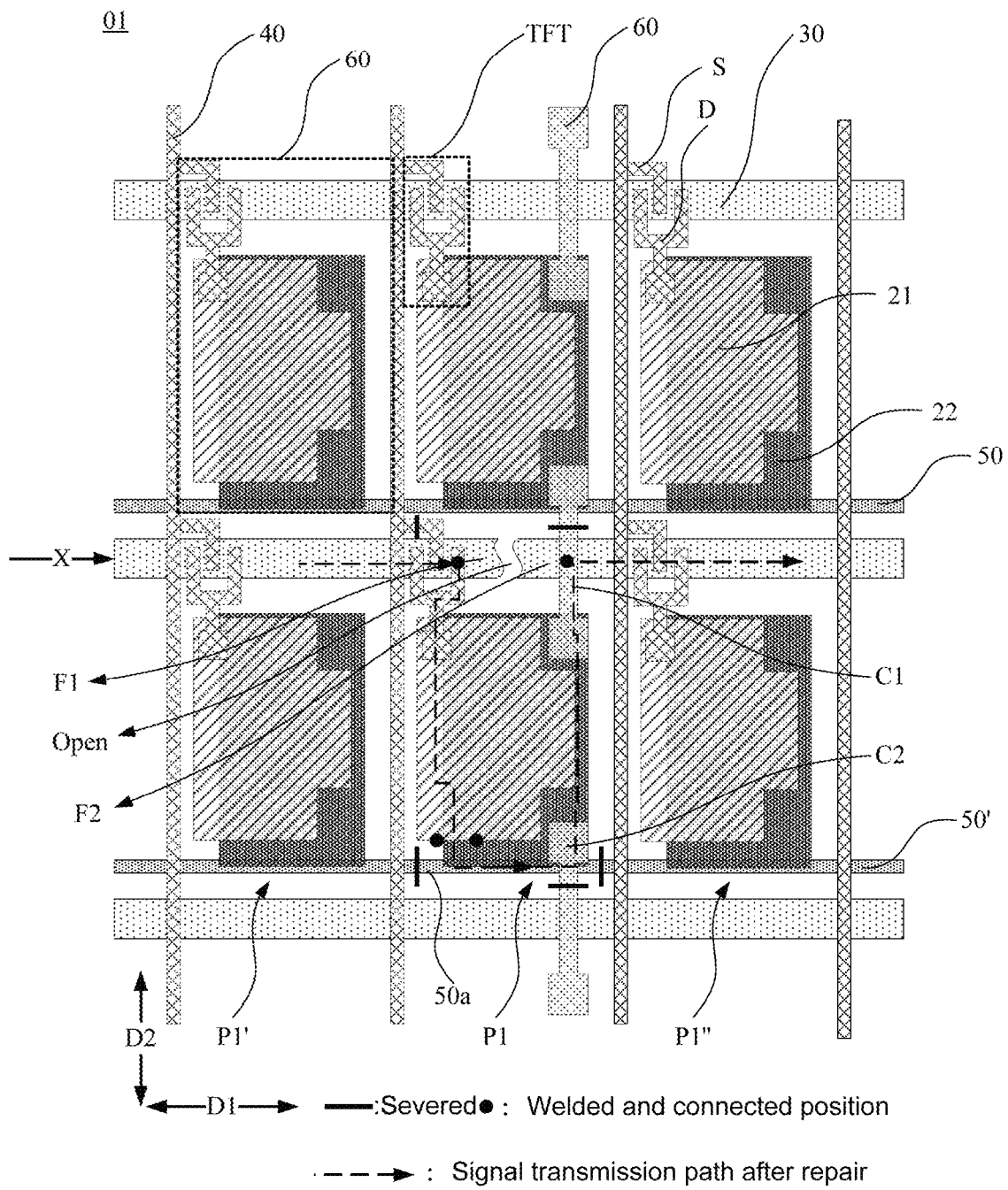
FIG. 9 is a schematic diagram showing yet another method for repairing a gate-line disconnection, in accordance with some embodiments of the present disclosure.

Second, as shown in FIG. 9, if one of the two connecting elements L is a transistor TFT and the other is a compensation structure 60, and the sub-pixel 20 to which the transistor TFT belongs and the sub-pixel 20 to which the common electrode 22 coupled to the compensation structure 60 belongs are the same sub-pixel, among the sub-pixels 20 coupled to the gate line 30 on which the disconnected position is located, the sub-pixel 20 to which the transistor TFT belongs is selected as a first repair sub-pixel P1. The first repair sub-pixel P1 is coupled to the front portion F1 at the disconnected position. That is, in the process of repairing the gate-line disconnection, the first repair sub-pixel P1 is selected to be sacrificed to complete the repair.

Third, as shown in FIGS. 10 to 15, if one of the two connecting elements L is a transistor TFT and the other is a compensation structure 60, and the sub-pixel 20 to which the transistor TFT belongs and the sub-pixel to which the common electrode 22 coupled to the compensation structure 60 belongs are different sub-pixels, among the sub-pixels 20 coupled to the gate line 30 on which the disconnected position is located, the sub-pixel 20 to which the common electrode 22 coupled to the compensation structure 60 belongs is selected as a first repair sub-pixel P1 and the sub-pixel 20 to which the transistor TFT belongs is selected as a second repair sub-pixel P2. The first repair sub-pixel P1 is coupled to the front portion F1 at the disconnected position, and the second repair sub-pixel P2 is coupled to the rear portion F2 at the disconnected position. That is, in the process of repairing the gate-line disconnection, the first repair sub-pixel P1 and the second repair sub-pixel P2 are selected to be sacrificed to complete the repair.

According to the different situations of the two connecting elements L and whether the common electrode 22 of the selected repair sub-pixel is coupled to a compensation structure 60, the disconnected position on the gate line 30 includes at least the following five types.

First, as shown in FIG. 6, the disconnected position (marked "Open" in FIG. 6, indicating a disconnection) is between two transistors TFT. The sub-pixels 20 to which the two transistors TFT belong respectively are the first repair sub-pixel P1 and the second repair sub-pixel P2. The common electrode 22 of the second repair sub-pixel P2 is not coupled to compensation structures 60.

Second, as shown in FIGS. 7 and 8, the disconnected position (marked "Open" in FIGS. 7 and 8, indicating a disconnection) is between two transistors TFT. The sub-pixels 20 to which the two transistors TFT belong respectively are the first repair sub-pixel P1 and the second repair sub-pixel P2. The common electrode 22 of the second repair sub-pixel P2 is coupled to compensation structures 60.

The compensation structures 60 coupled to the common electrode 22 of the second repair sub-pixel P2 include a first compensation structure C1 across the gate line 30 on which the disconnected position is located, and a second compensation structure C2 across the selected common electrode line.

Third, as shown in FIG. 9, the disconnected position (marked "Open" in FIG. 9, indicating a disconnection) is between a transistor TFT and a compensation structure 60, and the sub-pixel 20 to which the transistor TFT belongs and the sub-pixel 20 to which the common electrode 22 coupled to the compensation structure 60 belongs are the same sub-pixel, which is a first repair sub-pixel P1. Compensation structures 60 coupled to the common electrode 22 of the first repair sub-pixel P1 include a first compensation structure C1 across the gate line on which the disconnected position is located, and a second compensation structure C2 across the selected common electrode line.

Figure 10:
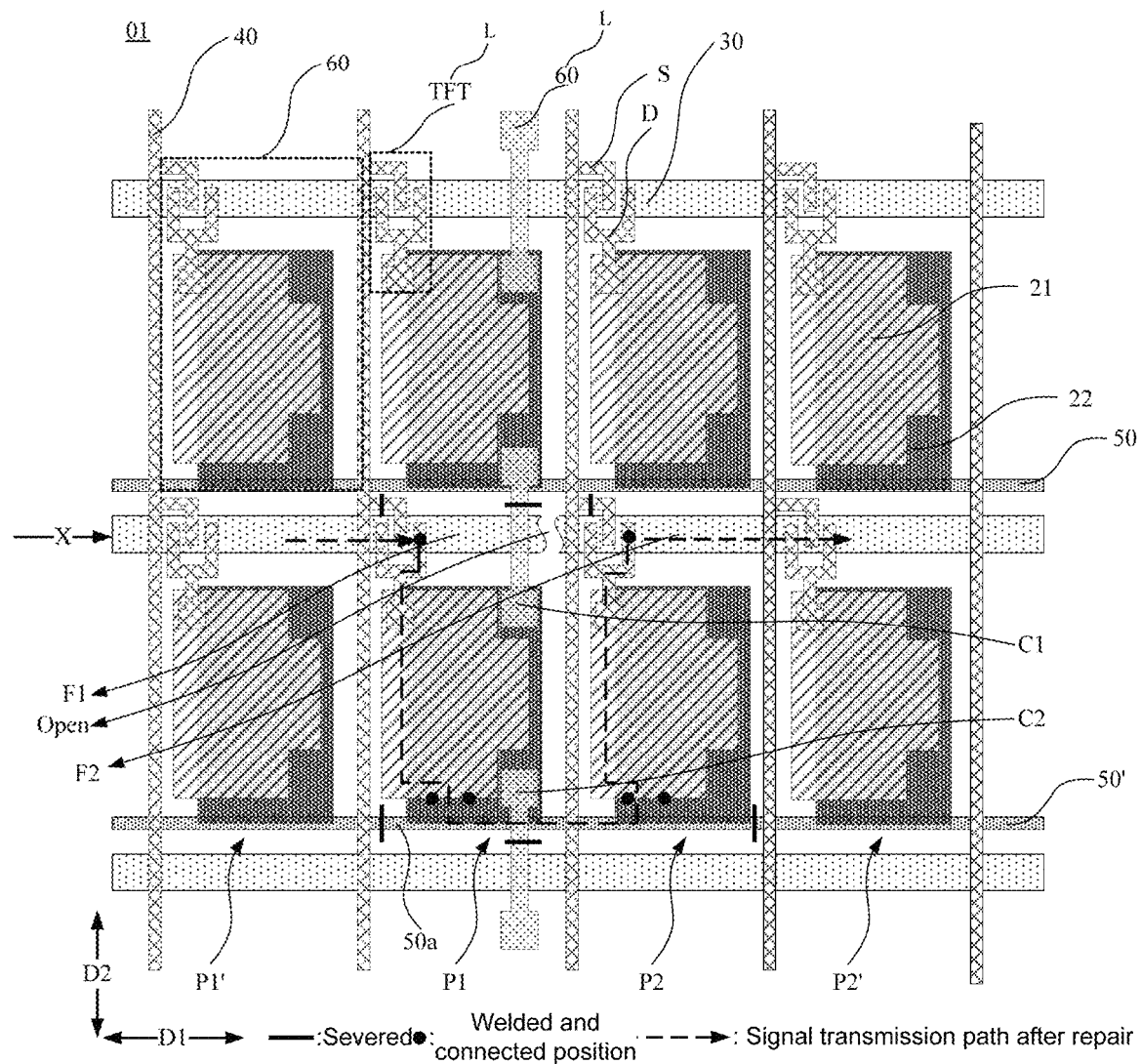
FIG. 10 is a schematic diagram showing yet another method for repairing a gate-line disconnection, in accordance with some embodiments of the present disclosure.
Figure 11:
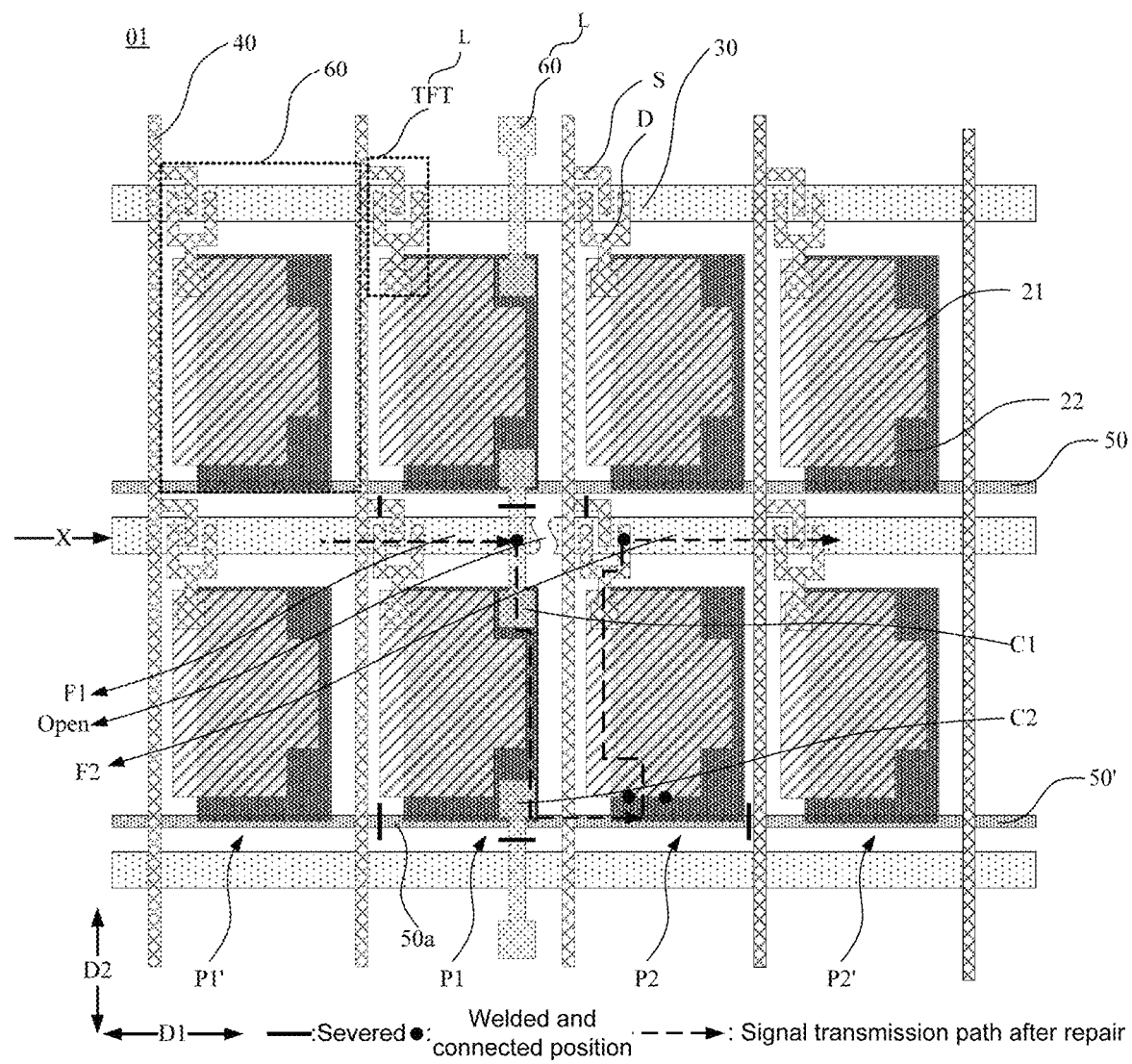
FIG. 11 is a schematic diagram showing yet another method for repairing a gate-line disconnection, in accordance with some embodiments of the present disclosure.

Fourth, as shown in FIGS. 10 and 11, the disconnected position (marked "Open" in FIGS. 10 and 11, indicating a disconnection) is between a transistor TFT and a compensation structure 60, and the sub-pixel 20 to which the transistor TFT belongs and the sub-pixel 20 to which the common electrode 22 coupled to the compensation structure 60 belongs are different sub-pixels. The sub-pixel 20 to which the common electrode 22 coupled to the compensation structure 60 belongs is a first repair sub-pixel P1, and the sub-pixel 20 to which the transistor TFT belongs is a second repair sub-pixel P2. The common electrode 22 of the second repair sub-pixel P2 is not coupled to compensation structures 60.

Compensation structures 60 coupled to the common electrode 22 of the first repair sub-pixel P1 include a first compensation structure C1 across the gate line 30 on which the disconnected position is located, and a second compensation structure C2 across the selected common electrode line 50.

Fifth, as shown in FIG. 12, 13, 14 or 15, the disconnected position (marked "Open" in FIGS. 12, 13, 14 and 15, indicating a disconnection) is between a transistor TFT and a compensation structure 60, and the sub-pixel 20 to which the transistor TFT belongs and the sub-pixel 20 to which the common electrode 22 coupled to the compensation structure 60 belongs are different sub-pixels. The sub-pixel 20 to which the common electrode 22 coupled to the compensation structure 60 belongs is a first repair sub-pixel P1, and the sub-pixel 20 to which the transistor TFT belongs is a second repair sub-pixel P2. Each of the first repair sub-pixel P1 and the second repair sub-pixel P2 is coupled to respective compensation structures 60.

Compensation structures 60 coupled to the common electrode 22 of the first repair sub-pixel P1 include a first compensation structure C1 across the gate line 30 on which the disconnected position is located, and a second compensation structure C2 across the selected common electrode line, and compensation structures 60 coupled to the common electrode 22 of the second repair sub-pixel P2 also include a first compensation structure C1 across the gate line 30 on which the disconnected position is located, and a second compensation structure C2 across the selected common electrode line.

Depending on the disconnected position on the gate line 30, different methods for repairing the gate-line disconnection can be selected.

Several illustrative repair methods are provided below for the above-described different disconnected positions, for describing, in detail, the specific repair process after the gate line is disconnected.

As shown in FIG. 6, for the above-described first type of disconnected position, an illustrative repair method is provided, which includes the following steps.

In S1, a disconnected position of a gate line 30 (marked "Open" in FIG. 6, indicating a disconnection) is determined.

In S2, S2 includes the following S211 to S212.

In S211, two connecting elements L are determined, which are closest to the disconnected position and are respectively located at two sides of the disconnected position; and if the two connecting elements L are two transistors TFT, sub-pixels 20 to which the two transistors TFT respectively belong are selected from the sub-pixels 20 coupled to the gate line 30 on which the disconnected position is located as a first repair sub-pixel P1 and a second repair sub-pixel P2. The first repair sub-pixel P1 is coupled to the front portion F1 at the disconnected position, and the second repair sub-pixel P2 is coupled to the rear portion F2 at the disconnected position.

In S212, one common electrode line 50 coupled to (e.g., having an overlapping region with) common electrodes 22 of the first repair sub-pixel P1 and the second repair sub-pixel P2 is determined as a selected common electrode line 50'.

In S3, S3 includes the following S311 to S314.

In S311, the front portion F1 at the disconnected position is coupled to the common electrode 22 of the first repair sub-pixel 20 through a second terminal (e.g., a drain D) of a transistor TFT of the first repair sub-pixel P1 and a pixel electrode 21 of the sub-pixel 20 (i.e., the first repair sub-pixel P1).

In S312, the rear portion F2 at the disconnected position is coupled to the common electrode 22 of the second repair sub-pixel 20 through a second terminal (e.g., a drain D) of a transistor TFT of the second repair sub-pixel P2 and a pixel electrode 21 of the sub-pixel 20 (i.e., the second repair sub-pixel P2).

In S313, the transistors TFT of the first repair sub-pixel P1 and the second repair sub-pixel P2 are disconnected from the data lines 40 to which the first repair sub-pixel P1 and the second repair sub-pixel P2 are coupled. This can prevent the pixel electrodes 21 of the first repair sub-pixel P1 and the second repair sub-pixel P2 from being still loaded with data line signals from the data lines 40, in which this load may affect the normal repair of the gate line 30.

In S314, the selected common electrode line 50' is disconnected from other common electrodes 22 except the common electrodes 22 of the first repair sub-pixel P1 and the second repair sub-pixel P2 to form a separate line segment 50a cut from the selected common electrode line 50'.

In this way, the disconnected position is bypassed through the communication path composed of the second terminal (the drain D in FIG. 6) of the transistor TFT of the first repair sub-pixel P1, the pixel electrode 21 of the first repair sub-pixel P1, the common electrode 22 of the first repair sub-pixel P1, the separate line segment 50a, the common electrode 22 of the second repair sub-pixel P2, the pixel electrode 21 of the second repair sub-pixel P2, and the second terminal (the drain D in FIG. 6) of the transistor TFT of the second repair sub-pixel P2, and the signal transmission can be shown as dotted arrows in FIG. 6.

It will be noted that the transmission direction X of the gate line signal can be from left to right, or from right to left, or from both sides to the middle. Only the transmission direction X of the gate line signal from left to right is taken as an example for descriptions, that is, as shown in FIG. 6, the transmission direction X of the gate line signal is the same as the direction from the front portion F1 at the disconnected position to the rear portion F2 at the disconnected position. Below, the transmission direction X of the gate line signal from left to right is also taken as an example for descriptions.

It can be understood that there are no limitations on the orders of S211 to S212 and S311 to S314, and the steps can be performed sequentially or simultaneously, which is not limited in the embodiments of the present disclosure.

In this way, the dark spots formed after repairing the disconnected gate line using the above repair method are only the first repair sub-pixel P1 and the second repair sub-pixel P2, which has less influence on the entire display panel and has better repair effect.

For example, the S311 includes following steps.

With continued referring to FIG. 6, the front portion F1 at the disconnected position is welded and connected to the second terminal (the drain D in FIG. 6) of the transistor TFT of the first repair sub-pixel P1, and the pixel electrode 21 in the first repair sub-pixel P1 is welded and connected to the common electrode 22 of the sub-pixel (i.e., the first repair sub-pixel P1), so that the front portion F1 at the disconnected position is coupled to the common electrode 22 of the first repair sub-pixel 20 through the second terminal (the drain D in FIG. 6) of the transistor TFT of the first repair sub-pixel P1 and the pixel electrode 21 of the first repair sub-pixel 20.

For example, the S312 includes following steps.

With continued referring to FIG. 6, the rear portion F2 at the disconnected position and the second terminal (the drain D in FIG. 6) of the transistor TFT of the second repair sub-pixel P2 are welded and connected, and the pixel electrode 21 of the second repair sub-pixel P2 and the common electrode 22 of the sub-pixel (i.e., the second repair sub-pixel P2) are welded and connected, so that the rear portion F2 at the disconnected position is coupled to the common electrode 22 of the second repair sub-pixel 20 through the second terminal (drain D in FIG. 6) of the transistor TFT of the second repair sub-pixel P2 and the pixel electrode 21 of the second repair sub-pixel 20.

For example, S313 includes following steps.

With continued referring to FIG. 6, the first terminals (e.g., source S) of the transistors TFT of the first repair sub-pixel P1 and the second repair sub-pixel P2 are disconnected from the data lines 40 to which the first repair sub-pixel P1 and the second repair sub-pixel P2 are coupled respectively, thus preventing the pixel electrodes 21 of the first repair sub-pixel P1 and the second repair sub-pixel P2 from being still loaded with data line signals from the data lines 40, and preventing the normal repair of the gate line 30 from being affected. For example, the first terminals (e.g., source S) of the transistors TFT of the first repair sub-pixel P1 and the second repair sub-pixel P2 are severed.

It will be noted that in various embodiments provided in the present disclosure, the first terminal of the transistor TFT is a source S and the second terminal is a drain D. Of course, in other embodiments of the present disclosure, it is also possible that the first terminal is the drain D and the second terminal is the source S. Only the previous one is illustrated as an example herein and in the accompanying drawings, that is, the first terminal is the source S and the second terminal is the drain D.

For example, with continued referring to FIG. 6, the S314, in which a separate line segment 50a is formed, may include following steps.

(1) In a row of sub-pixels 20 coupled to the selected common electrode line 50', it is determined that two sub-pixels at two sides of and adjacent to the repair sub-pixels as a first adjacent sub-pixel P1' and a second adjacent sub-pixel P2' respectively.

As shown in FIG. 6, along the extending direction of the gate line 30, the first adjacent sub-pixel P1' is the previous sub-pixel 20 immediately adjacent to the first repair sub-pixel P1, and the second adjacent sub-pixel P2' is the next sub-pixel 20 immediately adjacent to the second repair sub-pixel P2.

(2) A portion of the selected common electrode line 50' between the common electrode 22 of the first repair sub-pixel P1 and a common electrode 22 of the first adjacent sub-pixel P1' is severed.

(3) A portion of the selected common electrode line 50' between the common electrode 22 of the second repair sub-pixel P2 and a common electrode 22 of the second adjacent sub-pixel P2' is severed.

In this way, a separate line segment 50a is formed, which is electrically connected to the common electrodes 22 of both of the first repair sub-pixel P1 and the second repair sub-pixel P2 and is cut from the selected common electrode line 50'.

That is, portions of the selected common electrode lines 50' respectively at both sides of the repair unit composed of the first repair sub-pixel P1 and the second repair sub-pixel P2 are severed to form the separate line segment 50a, so that the separate line segment 50a is electrically isolated from the common electrodes 22 of other sub-pixels 20.

The above (1), (2) and (3) are only for the purpose of distinguishing the levels of description and do not limit the order of the above steps.

As shown in FIG. 7, for the above-described second type of disconnected position, an illustrative repair method is provided, which includes the following steps.

In S1, a disconnected position of a gate line 30 (marked "Open" in FIG. 7, indicating a disconnection) is determined.

In S2, S2 includes the following S221 to S222.

In S221, two connecting elements L are determined, which are closest to the disconnected position and are respectively located at two sides of the disconnected position; and if the two connecting elements L are two transistors TFT, the sub-pixels 20 to which the two transistors TFT belong respectively are selected from sub-pixels 20 coupled to the gate line 30 on which the disconnected position is located as a first repair sub-pixel P1 and a second repair sub-pixel P2. The first repair sub-pixel P1 is coupled to the front portion F1 at the disconnected position, and the second repair sub-pixel P2 is coupled to the rear portion F2 at the disconnected position.

In S222, one common electrode line 50 coupled to (e.g., having an overlapping region with) the common electrodes 22 of the first repair sub-pixel P1 and the second repair sub-pixel P2 is determined as a selected common electrode line 50'.

In S3, S3 includes the following S321 to S325.

In S321, the front portion F1 at the disconnected position is coupled to the common electrode 22 of the first repair sub-pixel 20 through the second terminal (e.g., drain D) of the transistor TFT of the first repair sub-pixel P1 and the pixel electrode 21 of the sub-pixel 20 (i.e., the first repair sub-pixel P1).

In S322, the rear portion F2 at the disconnected position is coupled to the common electrode 22 of the second repair sub-pixel 20 through the second terminal (e.g., drain D) of the transistor TFT of the second repair sub-pixel P2 and the pixel electrode 21 of the sub-pixel 20 (i.e., the second repair sub-pixel P2).

In S323, the transistors TFT of the first repair sub-pixel P1 and the second repair sub-pixel P2 are disconnected from the data lines 40 to which the transistors TFT are coupled respectively. This can prevent the pixel electrodes 21 of the first repair sub-pixel P1 and the second repair sub-pixel P2 from being still loaded with data line signals from the data lines 40, thereby preventing the normal repair of the gate line 30 from being affected.

In S324, the selected common electrode line 50' is disconnected from other common electrodes 22 except the common electrodes 22 of the first repair sub-pixel P1 and the second repair sub-pixel P2 to form a separate line segment 50a cut from the selected common electrode line 50'.

In S325, the first compensation structure C1 coupled to the common electrode 22 of the second repair sub-pixel P2 is disconnected from another common electrode 22 except the common electrode 22 of the second repair sub-pixel P2; and the second compensation structure C2 coupled to the common electrode 22 of the second repair sub-pixel P2 is disconnected from another common electrode except the common electrode 22 of the second repair sub-pixel P2. For example, the first compensation structure C1 and the second compensation structure C2 are severed, so as to prevent the common electrode 22 in the second repair sub-pixel P2 from being still loaded with the common voltage signal from the common electrode line 50, thereby preventing the normal repair of the gate line 30 from being affected.

In this way, the disconnected position is bypassed through the communication path composed of the second terminal (drain D in FIG. 7) of the transistor TFT of the first repair sub-pixel P1, the pixel electrode 21 of the first repair sub-pixel P1, the common electrode 22 of the first repair sub-pixel P1, the separate line segment 50a, the common electrode 22 of the second repair sub-pixel P2, the pixel electrode 21 of the second repair sub-pixel P2, and the second terminal (drain D in FIG. 7) of the transistor TFT of the second repair sub-pixel P2, and the signal transmission can be shown as dotted arrows in FIG. 7.

It can be understood that there are no limitations on the order of S221 to S222 and S321 to S325, and the steps can be performed sequentially or simultaneously, which is not limited in the embodiments of the present disclosure.

In this way, the dark spots formed after the disconnected gate line is repaired by using the above repair method are only the first repair sub-pixel P1 and the second repair sub-pixel P2, which has less influence on the entire display panel and has better repair effect.

For example, the S321 includes following steps.

With continued referring to FIG. 7, the front portion F1 at the disconnected position and the second terminal (drain D in FIG. 7) of the transistor TFT of the first repair sub-pixel P1 are welded and connected, and the pixel electrode 21 of the first repair sub-pixel P1 and the common electrode 22 of the sub-pixel (i.e., the first repair sub-pixel P1) are welded and connected, so that the front portion F1 at the disconnected position is coupled to the common electrode 22 of the first repair sub-pixel 20 through the second terminal (drain D in FIG. 7) of the transistor TFT of the first repair sub-pixel P1 and the pixel electrode 21 of the first repair sub-pixel 20.

For example, the S322 includes following steps.

With regard referring to FIG. 7, the rear portion F2 at the disconnected position and the second terminal (drain D in FIG. 7) of the transistor TFT of the second repair sub-pixel P2 are welded and connected, and the pixel electrode 21 of the second repair sub-pixel P2 and the common electrode 22 of the sub-pixel (i.e., the second repair sub-pixel P2) are welded and connected, so that the rear portion F2 at the disconnected position is coupled to the common electrode 22 of the second repair sub-pixel 20 through the second terminal (drain D in FIG. 7) of the transistor TFT of the second repair sub-pixel P2 and the pixel electrode 21 of the second repair sub-pixel 20.

For example, the S323 includes following steps.

With continued referring to FIG. 7, the first terminals (e.g., sources S) of the transistors TFT of the first repair sub-pixel P1 and the second repair sub-pixel P2 are disconnected from the data lines 40 to which the transistors TFT are coupled respectively, thereby preventing the pixel electrodes 21 of the first repair sub-pixel P1 and the second repair sub-pixel P2 from being still loaded with data line signals from the data lines 40, and prevent the normal repair of the gate line 30 from being affected. For example, the sources S of the transistors TFT of the first repair sub-pixel P1 and the second repair sub-pixel P2 are severed.

For example, with continued referring to FIG. 7, the S324, in which a separate line segment 50a is formed, includes the following steps.

(1) In a row of sub-pixels 20 coupled to the selected common electrode line 50', two sub-pixels at two sides of and adjacent to the repair sub-pixels are determined as a first adjacent sub-pixel P1' and a second adjacent sub-pixel P2' respectively.

As shown in FIG. 7, along the extending direction of the gate line 30, the first adjacent sub-pixel P1' is the previous sub-pixel 20 immediately adjacent to the first repair sub-pixel P1, and the second adjacent sub-pixel P2' is the next sub-pixel 20 immediately adjacent to the second repair sub-pixel P2.

(2) A portion of the selected common electrode line 50' between the common electrode 22 of the first repair sub-pixel P1 and a common electrode 22 of the first adjacent sub-pixel P1' is severed.

(3) A portion of the selected common electrode line 50' between the common electrode 22 of the second repair sub-pixel P2 and a common electrode 22 of the second adjacent sub-pixel P2' is severed.

In this way, a separate line segment 50a is formed, which is electrically connected to the common electrodes 22 of both of the first repair sub-pixel P1 and the second repair sub-pixel P2 and is cut from the selected common electrode line 50'.

That is, portions of the selected common electrode line 50' respectively at two sides of the repair unit composed of the first repair sub-pixel P1 and the second repair sub-pixel P2 are severed to form the separate line segment 50a, so that the separate line segment 50a is electrically isolated from the common electrodes 22 of other sub-pixels 20.

The above (1), (2) and (3) are only for the purpose of distinguishing the levels of description and do not limit the order of the above steps.

For example, with continued referring to FIG. 7, in S325:

The method of disconnecting the first compensation structure C1 coupled to the common electrode 22 of the second repair sub-pixel P2 from another common electrode 22 except the common electrode 22 of the second repair sub-pixel P2 includes:

Severing a portion of the first compensation structure C1 between two common electrodes 22 to which the first compensation structure C1 is coupled.

The method of disconnecting the second compensation structure C2 coupled to the common electrode 22 of the second repair sub-pixel P2 from another common electrode 22 except the common electrode 22 of the second repair sub-pixel P2 includes:

Severing a portion of the second compensation structure C2 between two common electrodes 22 to which the second compensation structure C2 is coupled.

As shown in FIG. 8, for the above-described second type of disconnected position, another illustrative repair method is provided, which includes the following steps.

In S1, a disconnected position of a gate line 30 (marked "Open" in FIG. 8, indicating a disconnection) is determined.

In S2, S2 includes the following S231 to S232.

In S231, two connecting elements L are determined, which are closest to the disconnected position and are respectively located at two sides of the disconnected position; and if the two connecting elements L are two transistors TFT, the sub-pixels 20 to which the two transistors TFT respectively belong are selected from sub-pixels 20 coupled to the gate line 30 on which the disconnected position is located as a first repair sub-pixel P1 and a second repair sub-pixel P2. The first repair sub-pixel P1 is coupled to the front portion F1 at the disconnected position, and the second repair sub-pixel P2 is coupled to the rear portion F2 at the disconnected position.

In S232, one common electrode line 50 coupled to (e.g., having an overlapping region with) the common electrodes 22 of the first repair sub-pixel P1 and the second repair sub-pixel P2 is determined as a selected common electrode line 50'.

In S3, S3 includes the following S331 to S335.

In S331, the front portion F1 at the disconnected position is coupled to the common electrode 22 of the first repair sub-pixel 20 through a second terminal (e.g., drain D) of a transistor TFT of the first repair sub-pixel P1 and a pixel electrode 21 of the sub-pixel 20 (i.e., the first repair sub-pixel P1).

In S332, the rear portion F2 at the disconnected position is coupled to the common electrode 22 of the second repair sub-pixel P2 through the first compensation structure C1 coupled to the common electrode 22 of the second repair sub-pixel P2.

In S333, the transistors TFT of the first repair sub-pixel P1 and the second repair sub-pixel P2 are disconnected from the data lines 40 to which the transistors TFT are coupled respectively. This can prevent the pixel electrodes 21 of the first repair sub-pixel P1 and the second repair sub-pixel P2 from being still loaded with data line signals from the data lines 40, thereby preventing the normal repair of the gate line 30 from being affected.

In S334, the selected common electrode line 50' is disconnected from other common electrodes 22 except the common electrodes 22 of the first repair sub-pixel P1 and the second repair sub-pixel P2 to form a separate line segment 50a cut from the selected common electrode line 50'.

In S335, the first compensation structure C1 coupled to the common electrode 22 of the second repair sub-pixel P2 is disconnected from another common electrode 22 except the common electrode 22 of the second repair sub-pixel P2; and the second compensation structure C2 coupled to the common electrode 22 of the second repair sub-pixel P2 is disconnected from another common electrode 22 except the common electrode 22 of the second repair sub-pixel P2. For example, the first compensation structure C1 and the second compensation structure C2 are severed, so as to prevent the common electrode 22 in the second repair sub-pixel P2 from being still loaded with the common voltage signal from the common electrode line 50, thereby preventing the normal repair of the gate line 30 from being affected.

In this way, the disconnected position is bypassed through the communication path composed of the second terminal (drain D in FIG. 8) of the transistor TFT of the first repair sub-pixel P1, the pixel electrode 21 of the first repair sub-pixel P1, the common electrode 22 of the first repair sub-pixel P1, the separate line segment 50a, the common electrode 22 of the second repair sub-pixel P2, and the first compensation structure C1 coupled to the common electrode 22 of the second repair sub-pixel P2, and the signal transmission can be shown as dotted arrows in FIG. 8.

It can be understood that there are no limitations on the order of S231 to S232 and S331 to S335, and the steps can be performed sequentially or simultaneously, which is not limited in the embodiments of the present disclosure.

In this way, the dark spots formed after the disconnected gate line repaired by using the above repair method are only the first repair sub-pixel P1 and the second repair sub-pixel P2, which has less influence on the entire display panel and has better repair effect.

Here, the difference between the above-described two repair methods illustrated in FIGS. 7 and 8 is that in the communication path illustrated in FIG. 7, the disconnected position is bypassed by the transistors TFT, pixel electrodes 21 and common electrodes 22 of the first repair sub-pixel P1 and second repair sub-pixel P2, and the separate line segment 50a cut from the selected common electrode line 50', and not by the compensation structure 60.

In the communication path illustrated in FIG. 8, the disconnected position is bypassed by the transistor TFT, pixel electrode 21 and common electrode 22 of the first repair sub-pixel P1, the common electrode 22 of the second repair sub-pixel P2, the separate line segment 50a, and the first compensation structure C1 coupled to the common electrode 22 of the second repair sub-pixel P2, and not by the transistor TFT and pixel electrode 21 of the second repair sub-pixel P2.

In a case where the disconnected position on the gate line 30 is of the second type described above, that is, in a case where the disconnected position is between the two transistors TFT and the common electrode 22 of the second repair sub-pixel P2 is coupled to the compensation structure 60, either of the repair methods illustrated in FIGS. 7 and 8 can be selected.

For example, the S331 includes following steps.

With continued referring to FIG. 8, the front portion F1 at the disconnected position and the second terminal (drain D in FIG. 8) of the transistor TFT of the first repair sub-pixel P1 are welded and connected, and the pixel electrode 21 of the first repair sub-pixel P1 and the common electrode 22 of the sub-pixel (i.e., the first repair sub-pixel P1) are welded and connected, so that the front portion F1 at the disconnected position is coupled to the common electrode 22 of the first repair sub-pixel 20 through the second terminal (drain D in FIG. 7) of the transistor TFT of the first repair sub-pixel P1 and the pixel electrode 21 of the first repair sub-pixel 20.

For example, the S332 includes following steps.

With continued referring to FIG. 8, the rear portion F2 at the disconnected position and the first compensation structure C1 coupled to the common electrode 22 of the second repair sub-pixel P2 are welded and connected.

Since the first compensation structure C1 coupled to the common electrode 22 of the second repair sub-pixel P2 is electrically connected to the common electrode 22 of the second repair sub-pixel P2, when the rear portion F2 at the disconnected position and the first compensation structure C1 are welded and connected, the rear portion F2 at the disconnected position is electrically connected to the common electrode 22 in the second repair sub-pixel P2.

The above description of the compensation structure 60 shows that welding and connecting the rear portion F2 at the disconnected position and the first compensation structure C1 can be realized by welding and connecting the portions having an overlapping region of the rear portion F2 at the disconnected position and the first compensation structure C1.

On the basis of the repair method shown in FIG. 8, it is further considered that after the gate line signal loaded on the disconnected gate line 30 is continuously transmitted through the communication path described above, the common electrode 22 of the second repair sub-pixel P2 is loaded with the gate line signal instead of the common voltage signal that should have been loaded when the gate line 30 is not disconnected. Therefore, it is difficult for the second repair sub-pixel P2 to achieve normal display. Both the transistor TFT of the second repair sub-pixel P2 and the pixel electrode 21 of the second repair sub-pixel need to be disconnected, so as to prevent the electric field generated between the pixel electrode 21 of the second repair sub-pixel P2 and the common electrode 22 loaded with the gate line signal in the second repair sub-pixel from affecting the normal deflection of liquid crystal molecules near the second repair sub-pixel P2.

For example, in the S333:

The method of disconnecting the transistor TFT of the first repair sub-pixel P1 from the data line 40 to which the transistor TFT is coupled includes, but is not limited to, the following manner.

The first terminal (e.g., source S) of the transistor TFT of the first repair sub-pixel P1 is disconnected from the data line 40 to which the transistor TFT is coupled. For example, the first terminal (e.g., source S) of the transistor TFT of the first repair sub-pixel P1 is severed.

The method of disconnecting the transistor TFT of the second repair sub-pixel P2 from the data line 40 to which the transistor TFT is coupled includes, but is not limited to, the following three manners.

First, the first terminal (e.g., source S) of the transistor TFT of the second repair sub-pixel P2 is disconnected from the data line 40 to which the transistor TFT is electrically connected. For example, the first terminal (e.g., source S) of the transistor TFT of the second repair sub-pixel P2 is severed.

Second, the second terminal (e.g., drain D) of the transistor TFT of the second repair sub-pixel P2 is disconnected from the pixel electrode 21 to which the transistor TFT is electrically connected. For example, the second terminal (e.g., drain D) of the transistor TFT is severed.

Third, the first terminal (e.g., source S) of the transistor TFT of the second repair sub-pixel P2 is disconnected from the data line 40 to which the transistor TFT is electrically connected, and the second terminal (e.g., drain D) of the transistor TFT of the second repair sub-pixel P2 is disconnected from the pixel electrode 40 to which the transistor TFT is electrically connected. For example, the first terminal (e.g., source S) and the second terminal (e.g., drain D) of the transistor TFT of the second repair sub-pixel P2 are severed.

It will be noted that FIG. 8 only illustrates the manner of "severing the first terminal of the transistor TFT", and with regard to the understanding of the manner of "severing the second terminal of the transistor TFT", reference may be made to FIG. 8, which will not be elaborated herein.

For example, with continued referring to FIG. 8, the S334, in which a separate line segment 50a is formed, may include the following steps.

(1) In a row of sub-pixels 20 coupled to the selected common electrode line 50 two sub-pixels at two sides of and adjacent to the repair sub-pixels are determined as a first adjacent sub-pixel P1' and a second adjacent sub-pixel P2' respectively.

As shown in FIG. 8, along the extending direction of the gate line 30, the first adjacent sub-pixel P1' is the previous sub-pixel 20 immediately adjacent to the first repair sub-pixel P1, and the second adjacent sub-pixel P2' is the next sub-pixel 20 immediately adjacent to the second repair sub-pixel P2.

(2) A portion of the selected common electrode line 50' between the common electrode 22 of the first repair sub-pixel P1 and the common electrode 22 of the first adjacent sub-pixel P1' is severed.

(3) A portion of the selected common electrode line 50' between the common electrode 22 of the second repair sub-pixel P2 and the common electrode 22 of the second adjacent sub-pixel P2' is severed.

In this way, a separate line segment 50a is formed, which is electrically connected to the common electrodes 22 of both of the first repair sub-pixel P1 and the second repair sub-pixel P2 and is cut from the selected common electrode line 50'.

That is, the portions of the selected common electrode lines 50' at two sides of the repair unit composed of the first repair sub-pixel P1 and the second repair sub-pixel P2 are severed to form the separate line segment 50a that is electrically isolated from the rest of the selected common electrode line 50', so that the separate line segment 50a is electrically isolated from the common electrodes 22 of other sub-pixels 20.

The above (1), (2) and (3) are only for the purpose of distinguishing the levels of description and do not limit the order of the above steps.

For example, with continued referring to FIG. 8. In the S335:

The method of disconnecting the first compensation structure C1 coupled to the common electrode 22 of the second repair sub-pixel P2 from another common electrode 22 except the common electrode 22 of the second repair sub-pixel P2 includes:

Severing a portion of the first compensation structure C1 between a first connecting portion and a second connecting portion of the first compensation structure C1. The first connecting portion refers to a portion of the first compensation structure C1 coupled to the rear portion F2 at the disconnected position. For example, when the rear portion F2 at the disconnected position and the first compensation structure C1 are welded and connected using the method described above, the first connecting portion is the welded portion of the first compensation structure C1 welded to the rear portion F2 at the disconnected position. The second connecting portion is a portion of the first compensation structure C1 coupled to another common electrode 22 except the common electrode 22 of the second repair sub-pixel P2. For example, the second connecting portion is an overlapping portion of the first compensation structure C1 with another common electrode 22 except the common electrode 22 of the second repair sub-pixel P2.

The method of disconnecting the second compensation structure C2 coupled to the common electrode 22 of the second repair sub-pixel P2 from another common electrode 22 except the common electrode 22 of the second repair sub-pixel P2 includes:

Severing a portion of the second compensation structure C2 between two common electrodes 22 to which the second compensation structure C2 is coupled.

As shown in FIG. 9, for the above-described third type of disconnected position, an illustrative repair method is provided, which includes the following steps.

In S1, a disconnected position of a gate line 30 (marked "Open" in FIG. 9, indicating a disconnection) is determined.

In S2, S2 includes the following S241 to S242.

In S241, two connecting elements L are determined, which are closest to the disconnected position and are respectively located at two sides of the disconnected position; and if one of the two connecting elements L is a transistor TFT and the other is a compensation structure 60, and the sub-pixel 20 to which the transistor TFT belongs and the sub-pixel 20 to which the common electrode 22 coupled to the compensation structure 60 belongs are the same sub-pixel, the sub-pixel 20 to which the transistor TFT belongs is selected from sub-pixels 20 coupled to the gate line 30 on which the disconnected position is located as a first repair sub-pixel P1. The first repair sub-pixel P1 is coupled to the front portion F1 at the disconnected position.

In S242, one common electrode line 50 coupled to (e.g., having an overlapping region with) the common electrode 22 of the first repair sub-pixel P1 is determined as a selected common electrode line 50'.

In S3, S3 includes the following S341 to S345.

In S341, the front portion F1 at the disconnected position is coupled to the common electrode 22 of the first repair sub-pixel 20 through the second terminal (e.g., drain D) of the transistor TFT of the first repair sub-pixel P1 and the pixel electrode 21 of the sub-pixel 20 (i.e., the first repair sub-pixel P1).

In S342, the rear portion F2 at the disconnected position is coupled to the common electrode 22 of the first repair sub-pixel P1 through the first compensation structure C1 coupled to the common electrode 22 of the first repair sub-pixel P1.

In S343, the transistor TFT of the first repair sub-pixel P1 is disconnected from the data line 40 to which the transistor TFT is coupled. This can prevent the pixel electrode 21 of the first repair sub-pixel P1 from being still loaded with the data line signal from the data line 40, thereby preventing the normal repair of the gate line 30 from being affected.

In S344, the selected common electrode line 50' is disconnected from other common electrodes 22 except the common electrode 22 of the first repair sub-pixel P1 to form a separate line segment 50a cut from the selected common electrode line 50'.

In S345, the first compensation structure C1 coupled to the common electrode 22 of the first repair sub-pixel P1 is disconnected from another common electrode 22 except the common electrode 22 of the first repair sub-pixel P1; and the second compensation structure C2 coupled to the common electrode 22 of the first repair sub-pixel P1 is disconnected from another common electrode 22 except the common electrode 22 of the first repair sub-pixel P1. For example, the first compensation structure C1 and the second compensation structure C2 are severed, so as to prevent the common electrode 22 of the first repair sub-pixel P1 from being still loaded with the common voltage signal from the common electrode line 50, thereby preventing the normal repair of the gate line 30 from being affected.

In this way, the disconnected position is bypassed through the communication path composed of the second terminal (drain D in FIG. 8) of the transistor TFT of the first repair sub-pixel P1, the pixel electrode 21 of the first repair sub-pixel P1, the common electrode 22 of the first repair sub-pixel P1, the separate line segment 50a, and the first compensation structure C1 coupled to the common electrode 22 of the first repair sub-pixel P1, and the signal transmission can be shown as dotted arrows in FIG. 9.

It can be understood that there are no limitations on the order of S241 to S242 and S341 to S345, and the steps can be performed sequentially or simultaneously, which is not limited in the embodiments of the present disclosure.

In this way, the dark spot formed after the disconnected gate line is repaired by using the above repair method is only the first repair sub-pixel P1, which has less influence on the entire display panel and has better repair effect.

For example, the S341 includes following steps.

With continued referring to FIG. 9, the front portion F1 at the disconnected position and the second terminal (drain D in FIG. 9) of the transistor TFT of the first repair sub-pixel P1 are welded and connected, and the pixel electrode 21 of the first repair sub-pixel P1 and the common electrode 22 of the sub-pixel (i.e., the first repair sub-pixel P1) are welded and connected, so that the front portion F1 at the disconnected position is coupled to the common electrode 22 of the first repair sub-pixel 20 through the second terminal (drain D in FIG. 9) of the transistor TFT of the first repair sub-pixel P1 and the pixel electrode 21 of the first repair sub-pixel 20.

For example, the S342 includes following steps.

With continued referring to FIG. 9, the rear portion F2 at the disconnected position and the first compensation structure C1 coupled to the common electrode 22 of the first repair sub-pixel P1 are welded and connected.

Since the first compensation structure C1 coupled to the common electrode 22 of the first repair sub-pixel P1 is electrically connected to the common electrode 22 of the first repair sub-pixel P1, when the rear portion F2 at the disconnected position and the selected first compensation structure C1 are welded and connected, the rear portion F2 at the disconnected position is electrically connected to the common electrode 22 of the first repair sub-pixel P1.

The above description of the compensation structure 60 shows that welding and connecting the rear portion F2 at the disconnected position and the first compensation structure C1 can be realized by welding and connecting the portions having an overlapping region of the rear portion F2 at the disconnected position and the first compensation structure C1.

For example, the S343 includes following steps.

With continued referring to FIG. 9, the first terminal (e.g., source S) of the transistor TFT of the first repair sub-pixel P1 is disconnected from the data line 40 to which the transistor TFT is coupled, thereby preventing the pixel electrode 21 of the first repair sub-pixel P1 from being still loaded with the data line signal from the data line 40, and preventing the normal repair of the gate line 30 from being affected. For example, the first terminal (e.g., source S) of the transistor TFT of the first repair sub-pixel P1 is severed.

For example, with continued referring to FIG. 9, the S344, in which a separate line segment 50a is formed, may include the following steps.

(1) In a row of sub-pixels 20 coupled to the selected common electrode line 50', two sub-pixels at two sides of and adjacent to the repair sub-pixel are determined as a first adjacent sub-pixel P1' and a second adjacent sub-pixel P1", respectively.

As shown in FIG. 9, along the extending direction of the gate line 30, the first adjacent sub-pixel P1' is the previous sub-pixel 20 immediately adjacent to the first repair sub-pixel P1, and the second adjacent sub-pixel P1" is the next sub-pixel 20 immediately adjacent to the first repair sub-pixel P1.

(2) A portion of the selected common electrode line 50' between the common electrode 22 of the first repair sub-pixel P1 and the common electrode 22 of the first adjacent sub-pixel P1' is severed.

(3) A portion of the selected common electrode line 50' between the common electrode 22 of the first repair sub-pixel P1 and the common electrode 22 of the second adjacent sub-pixel P1" is severed.

In this way, a separate line segment 50a is formed, which is electrically connected to the common electrode 22 of the first repair sub-pixel P1 and is cut from the selected common electrode line 50'.

That is, the portions of the selected common electrode lines 50' respectively at two sides of the first repair sub-pixel P1 are severed to form the separate line segment 50a, so that the separate line segment 50a is electrically isolated from the common electrodes 22 of other sub-pixels 20.

The above (1), (2) and (3) are only for the purpose of distinguishing the levels of description and do not limit the order of the above steps.

For example, with continued referring to FIG. 9, in the S345:

The method of disconnecting the first compensation structure C1 coupled to the common electrode 22 of the first repair sub-pixel P1 from another common electrode 22 except the common electrode 22 of the first repair sub-pixel P1 includes:

Severing a portion of the first compensation structure C1 between a first connecting portion and a second connecting portion of the first compensation structure C1. The first connecting portion refers to a portion of the first compensation structure C1 coupled to the rear portion F2 at the disconnected position. For example, when the rear portion F2 at the disconnected position and the first compensation structure C1 are welded and connected using the method described above, the first connecting portion is the welded portion of the first compensation structure C1 welded to the rear portion F2 at the disconnected position. The second connecting portion is a portion of the first compensation structure C1 coupled to another common electrode 22 except the common electrode 22 of the first repair sub-pixel P1. For example, the second connecting portion is an overlapping portion of the first compensation structure C1 having an overlapping region with another common electrode 22 except the common electrode 22 of the first repair sub-pixel P1.

The method of disconnecting the second compensation structure C2 coupled to the common electrode 22 of the first repair sub-pixel P1 from another common electrode 22 except the common electrode 22 of the first repair sub-pixel P1 includes:

Severing a portion of the second compensation structure C2 between two common electrodes 22 to which the second compensation structure C2 is coupled.

As shown in FIG. 10, for the above-described fourth type of disconnected position, an illustrative repair method is provided, which is similar to that provided for the above-described second type of disconnected position shown in FIG. 7. In both of the methods, the disconnected position is bypassed by the communication path including the transistors TFT, pixel electrodes 21 and common electrodes 22 of the first repair sub-pixel P1 and second repair sub-pixel P2, and the separate line segment 50a cut from the selected common electrode line 50'.

The difference between the repair method for the fourth type of disconnected position shown in FIG. 10 and the repair method for the second type of disconnected position shown in FIG. 7 is as follows.

In the repair method for the second type of disconnected position shown in FIG. 7, the common electrode 22 of the second repair sub-pixel P2 is coupled to compensation structures 60, and the common electrode 22 of the first repair sub-pixel P1 is not coupled to compensation structures 60.

However, in the repair method for the fourth type of disconnected position shown in FIG. 10, the common electrode 22 of the first repair sub-pixel P1 is coupled to compensation structures 60, and the common electrode 22 of the second repair sub-pixel P2 is not coupled to compensation structures 60.

That is, the repair method for the fourth type of disconnected position shown in FIG. 10 is equivalent to the situation that positions of the first repair sub-pixel P1 and the second repair sub-pixel P2 in the repair method for the second type of disconnected position shown in FIG. 7 are exchanged, that is, originally the first repair sub-pixel P1 is coupled to the front portion F1 at the disconnected position while the second repair sub-pixel P2 is coupled to the rear portion F2 at the disconnected position in the repair method for the second type of disconnected position shown in FIG. 7, but now the situation is that the second repair sub-pixel P2 is coupled to the front portion F1 at the disconnected position while the first repair sub-pixel P1 is coupled to the rear portion F2 at the disconnected position.

Therefore, for the repair method provided for the fourth type of disconnected position shown in FIG. 10, the processing steps for the first repair sub-pixel P1 can follow the processing steps for the second repair sub-pixel P2 in the repair method provided for the second type of disconnected position shown in FIG. 7; the processing steps for the second repair sub-pixel P2 can follow the processing steps for the first repair sub-pixel P1 in the repair method provided for the second type of disconnected position shown in FIG. 7; and other steps except the processing steps for the first repair sub-pixel P1 and the second repair sub-pixel P2 can follow the corresponding steps in the repair method provided for the second type of disconnected position shown in FIG. 7.

Here, the specific steps of the repair method provided for the fourth type of disconnected position shown in FIG. 10 will not be elaborated.

As shown in FIG. 11, for the above-described fourth type of disconnected position, another illustrative repair method is provided, which is similar to that provided for the above-described second type of disconnected position shown in FIG. 8. In both of the methods, the disconnected position is bypassed by the communication path including the transistor TFT of one repair sub-pixel, the pixel electrode 21 of the one repair sub-pixel, the common electrode 22 of the one repair sub-pixel, the separate line segment 50a, the common electrode 22 of the other repair sub-pixel, and the first compensation structure C1 coupled to the common electrode 22 of the other repair sub-pixel.

The difference between the repair method for the fourth type of disconnected position shown in FIG. 11 and the repair method for the second type of disconnected position shown in FIG. 8 is only as follows.

In the repair method for the second type of disconnected position shown in FIG. 8, the common electrode 22 of the second repair sub-pixel P2 is coupled to compensation structures 60, and the common electrode 22 of the first repair sub-pixel P1 is not coupled to compensation structures 60.

However, in the repair method for the fourth type of disconnected position shown in FIG. 11, the common electrode 22 of the first repair sub-pixel P1 is coupled to compensation structures 60, and the common electrode 22 of the second repair sub-pixel P2 is not coupled to compensation structures 60.

That is, the repair method for the fourth type of disconnected position shown in FIG. 11 is equivalent to the situation that positions of the first repair sub-pixel P1 and the second repair sub-pixel P2 in the repair method for the second type of disconnected position shown in FIG. 8 are exchanged, that is, originally the first repair sub-pixel P1 is coupled to the front portion F1 at the disconnected position while the second repair sub-pixel P2 is coupled to the rear portion F2 at the disconnected position in the repair method for the second type of disconnected position shown in FIG. 8, but now the situation is that the second repair sub-pixel P2 is coupled to the front portion F1 at the disconnected position while the first repair sub-pixel P1 is coupled to the rear portion F2 at the disconnected position.

Therefore, for the repair method provided for the fourth type of disconnected position shown in FIG. 11, the processing steps for the first repair sub-pixel P1 can follow the processing steps for the second repair sub-pixel P2 in the repair method provided for the second type of disconnected position shown in FIG. 8; the processing steps for the second repair sub-pixel P2 can follow the processing steps for the first repair sub-pixel P1 in the repair method provided for the second type of disconnected position shown in FIG. 8; and other steps except for the processing steps for the first repair sub-pixel P1 and the second repair sub-pixel P2 can follow the corresponding steps in the repair method provided for the second type of disconnected position shown in FIG. 8. Here, the specific steps of the repair method provided for the fourth type of disconnected position shown in FIG. 11 will not be elaborated.

Figure 12:
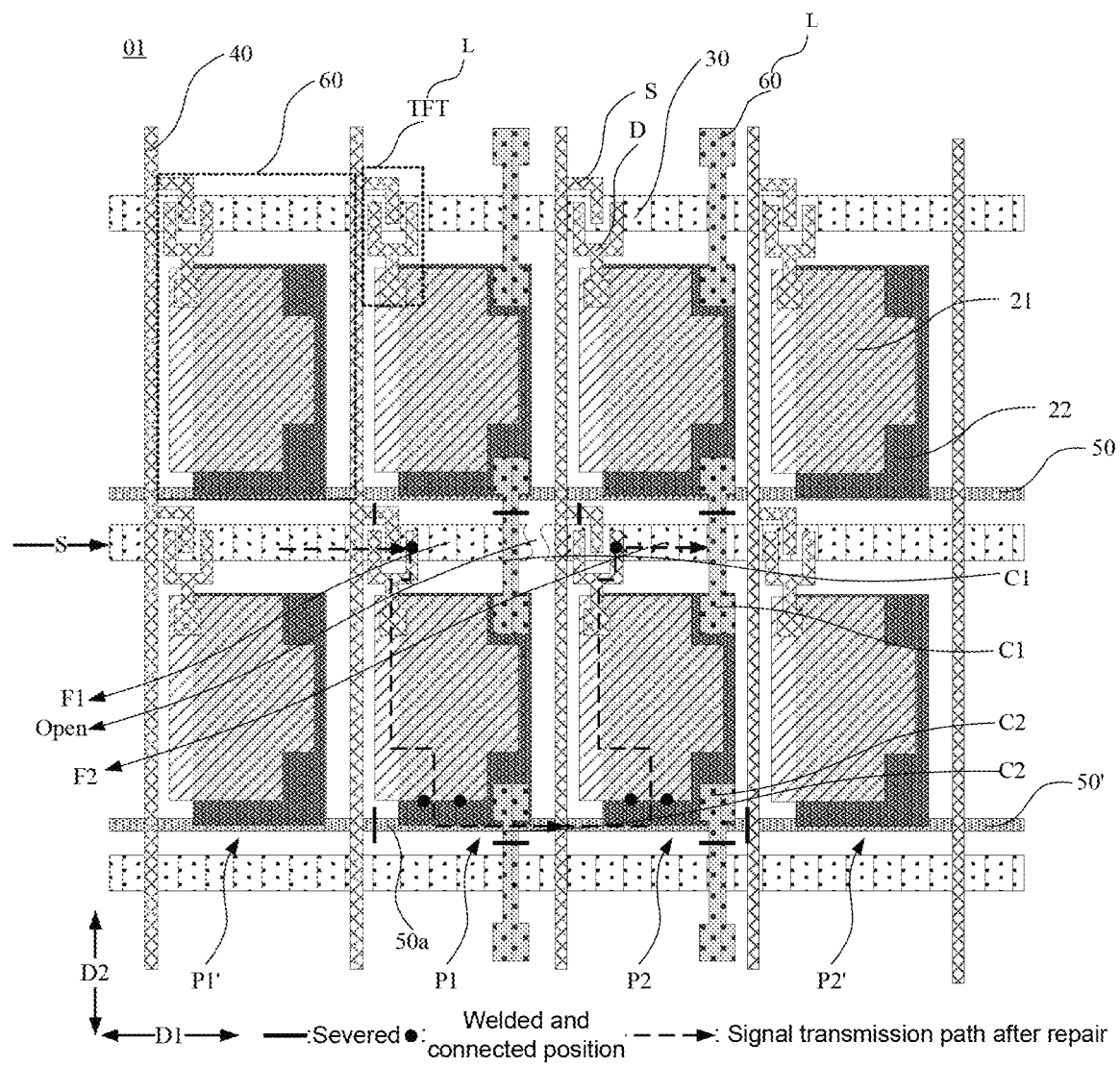
FIG. 12 is a schematic diagram showing yet another method for repairing a gate-line disconnection, in accordance with some embodiments of the present disclosure.

As shown in FIG. 12, for the above-described fifth type of disconnected position, an illustrative repair method is provided, which is similar to that provided for the above-described second type of disconnected position shown in FIG. 7. In both of the methods, the disconnected position is bypassed by the communication path including the transistors TFT, pixel electrodes 21 and common electrodes 22 of the first repair sub-pixel P1 and second repair sub-pixel P2, and the separate line segment 50a cut from the selected common electrode line 50'.

The difference between the repair method for the fifth type of disconnected position shown in FIG. 12 and the repair method for the second type of disconnected position shown in FIG. 7 is only as follows.

In the repair method for the second type of disconnected position shown in FIG. 7, the common electrode 22 of the second repair sub-pixel P2 is coupled to compensation structures 60, while the common electrode 22 of the first repair sub-pixel P1 is not coupled to compensation structures 60.

In the repair method for the fifth type of disconnected position shown in FIG. 12, the common electrode 22 of the first repair sub-pixel P1 and the common electrode 22 of the second repair sub-pixel P2 are coupled to respective compensation structures 60.

That is, the repair method for the fifth type of disconnected position shown in FIG. 12 is equivalent to the situation that on the original basis of the repair method for the second type of disconnected position shown in FIG. 7, compensation structures 60 coupled to the common electrode 22 of the first repair sub-pixel P1 are added, that is, on the basis of the repair method for the second type of disconnected position shown in FIG. 7, the second repair sub-pixel P2 remains unchanged, and compensation structures 60 are added and coupled to the first repair sub-pixel P1.

Therefore, for the repair method provided for the fifth type of disconnected position shown in FIG. 12, the processing steps for the first repair sub-pixel P1 can follow the processing steps for the first repair sub-pixel P1 in the repair method provided for the second type of disconnected position shown in FIG. 7, and further include the processing for the compensation structures 60 coupled to the common electrode 22 of the first repair sub-pixel P1; the processing method for the compensation structures 60 coupled to the common electrode 22 of the first repair sub-pixel P1 can follow the processing method for the compensation structures 60 coupled to the common electrode 22 of the second repair sub-pixel P2 in the repair method provided for the second type of disconnected position shown in FIG. 7; and other steps except for the processing steps for the first repair sub-pixel P1 can follow the corresponding steps in the repair method provided for the second type of disconnected position shown in FIG. 7. Here, the specific steps of the repair method provided for the fifth type of the disconnected position shown in FIG. 12 will not be elaborated.

Figure 13:
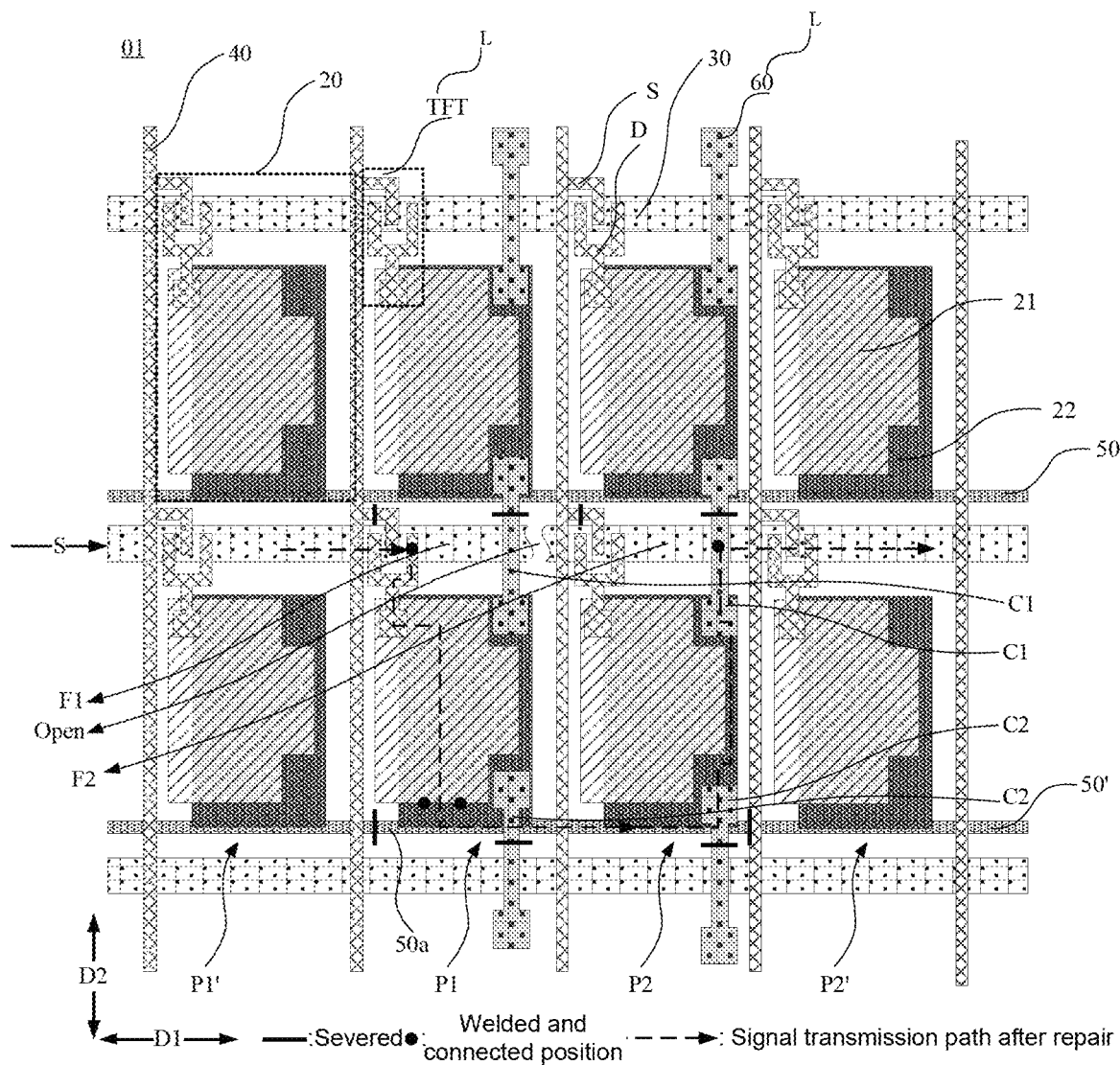
FIG. 13 is a schematic diagram showing yet another method for repairing a gate-line disconnection, in accordance with some embodiments of the present disclosure.

As shown in FIG. 13, for the above-described fifth type of disconnected position, another illustrative repair method is provided, which is similar to that provided for the above-described second type of disconnected position shown in FIG. 8. In both of the methods, the disconnected position is bypassed by the communication path including the transistor TFT of the first repair sub-pixel P1, the pixel electrode 21 of the first repair sub-pixel P1, the common electrode 22 of the first repair sub-pixel P1, the separate line segment 50a, the common electrode 22 of the second repair sub-pixel P2, and the first compensation structure C1 coupled to the common electrode 22 of the second repair sub-pixel P2.

The difference between the repair method for the fifth type of disconnected position shown in FIG. 13 and the repair method for the second type of disconnected position shown in FIG. 8 is only as follows.

In the repair method for the second type of disconnected position shown in FIG. 8, the common electrode 22 of the second repair sub-pixel P2 is coupled to compensation structures 60, while the common electrode 22 of the first repair sub-pixel P1 is not coupled to compensation structures 60.

In the repair method for the fifth type of disconnected position shown in FIG. 13, the common electrode 22 of the first repair sub-pixel P1 and the common electrode 22 of the second repair sub-pixel P2 are both coupled to respective compensation structures 60.

That is, the repair method for the fifth type of disconnected position shown in FIG. 13 is equivalent to the situation that on the original basis of the repair method for the second type of disconnected position shown in FIG. 8, compensation structures 60 coupled to the common electrode 22 of the first repair sub-pixel P1 are added, that is, on the basis of the repair method for the second type of disconnected position shown in FIG. 8, the second repair sub-pixel P2 remains unchanged, and compensation structures 60 are added and coupled to the first repair sub-pixel P1.

Therefore, for the repair method provided for the fifth type of disconnected position shown in FIG. 13, the processing steps for the first repair sub-pixel P1 can follow the processing steps for the first repair sub-pixel P1 in the repair method provided for the second type of disconnected position shown in FIG. 8 and further include the processing for the compensation structures 60 coupled to the common electrode 22 of the first repair sub-pixel P1; the processing method for the compensation structures 60 coupled to the common electrode 22 of the first repair sub-pixel P1 can follow the processing method for the compensation structures 60 coupled to the common electrode 22 of the second repair sub-pixel P2 in the repair method provided for the second type of disconnected position shown in FIG. 8; and other steps except for the processing steps for the first repair sub-pixel P1 can follow the corresponding steps in the repair method provided for the second type of disconnected position shown in FIG. 8. Here, the specific steps of the repair method provided for the fifth type of disconnected position shown in FIG. 13 will not be elaborated.

Figure 14:
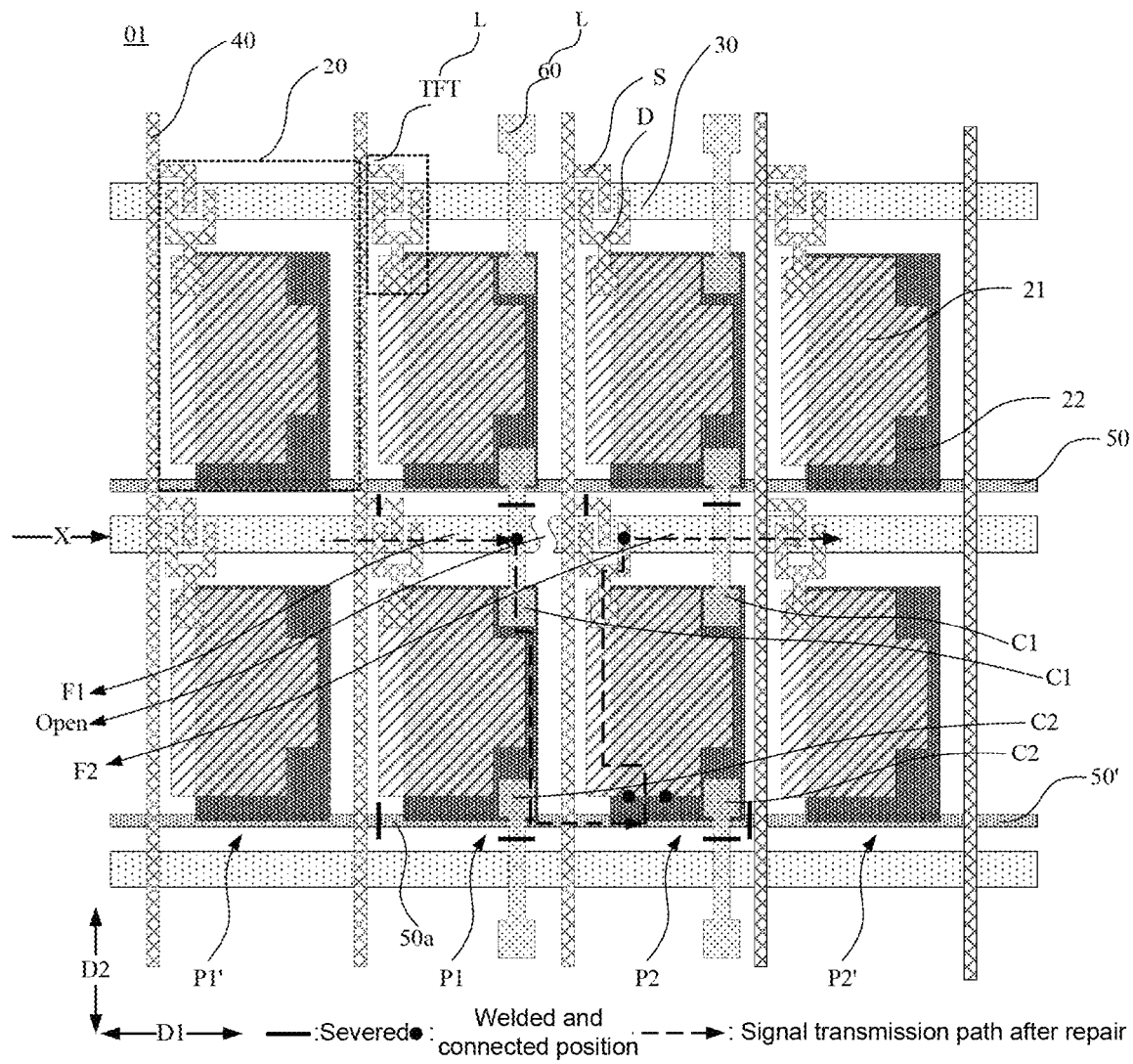
FIG. 14 is a schematic diagram showing yet another method for repairing a gate-line disconnection, in accordance with some embodiments of the present disclosure.

As shown in FIG. 14, for the above-described fifth type of disconnected position, yet another illustrative repair method is provided, which is similar to that provided for the above-described second type of disconnected position shown in FIG. 8. In both of the methods, the disconnected position is bypassed by the communication path including the transistor TFT of one repair sub-pixel, the pixel electrode 21 of the one repair sub-pixel, the common electrode 22 of the one repair sub-pixel, the separate line segment 50a, the common electrode 22 of the other repair sub-pixel, and the first compensation structure C1 coupled to the common electrode 22 of the other repair sub-pixel.

The difference between the repair method for the fifth type of disconnected position shown in FIG. 14 and the repair method for the second type of disconnected position shown in FIG. 8 is only as follows.

In the repair method provided for the second type of disconnected position shown in FIG. 8, the disconnected position is bypassed by the communication path including the transistor TFT of the first repair sub-pixel P1, the pixel electrode 21 of the first repair sub-pixel P1, the common electrode 22 of the first repair sub-pixel P1, the separate line segment 50a, the common electrode 22 of the second repair sub-pixel P2, and the first compensation structure C1 coupled to the common electrode 22 of the second repair sub-pixel P2.

However, in the repair method provided for the fifth type of disconnected position shown in FIG. 14, the disconnected position is bypassed by the communication path including the first compensation structure C1 coupled to the common electrode 22 of the first repair sub-pixel P1, the common electrode 22 of the first repair sub-pixel P1, the separate line segment 50a, the common electrode 22 of the second repair sub-pixel P2, the pixel electrode 21 of the second repair sub-pixel P2 and the transistor TFT of the second repair sub-pixel P2.

That is, the repair method for the fifth type of disconnected position shown in FIG. 14 is equivalent to the situation that positions of the first repair sub-pixel P1 and the second repair sub-pixel P2 in the repair method for the second type of disconnected position shown in FIG. 8 are exchanged and on the original basis, compensation structures 60 coupled to the common electrode 22 of the first repair sub-pixel P1 are added. That is, originally that "the first repair sub-pixel P1 is coupled to the front portion F1 at the disconnected position while the second repair sub-pixel P2 is coupled to the rear portion F2 at the disconnected position" in the repair method for the second type of disconnected position shown in FIG. 8, but now the situation is that "the second repair sub-pixel P2 is coupled to the front portion F1 at the disconnected position while the first repair sub-pixel P1 is coupled to the rear portion F2 at the disconnected position", and the second repair sub-pixel P2 remains unchanged while compensation structures 60 are added and coupled to the first repair sub-pixel P1.

Therefore, for the repair method provided for the fifth type of disconnected position shown in FIG. 14, the processing steps for the first repair sub-pixel P1 can follow the processing steps for the second repair sub-pixel P2 in the repair method provided for the second type of disconnected position shown in FIG. 8. The processing steps for the second repair sub-pixel P2 can follow the processing steps for the first repair sub-pixel P1 in the repair method provided for the second type of disconnected position shown in FIG. 8, and further include the processing for the compensation structures 60 coupled to the common electrode 22 of the second repair sub-pixel P2. The processing method for the compensation structures 60 coupled to the common electrode 22 of the second repair sub-pixel P2 can follow the processing method for the compensation structures 60 coupled to the common electrode 22 of the second repair sub-pixel P2 in the repair method provided for the second type of disconnected position shown in FIG. 7. Other steps except for the processing steps for the first repair sub-pixel P1 and the second repair sub-pixel P2 can follow the corresponding steps in the repair method provided for the second type of disconnected position shown in FIG. 8. Here, the specific steps of the repair method provided for the fifth type of disconnected position shown in FIG. 14 will not be elaborated.

As shown in FIG. 15, for the above-described fifth type of disconnected position, yet another illustrative repair method is provided, which includes the following steps.

In S1, a disconnected position of a gate line 30 (marked "Open" in FIG. 15, indicating a disconnection) is determined.

In S2, S2 includes the following S251 to S252.

In S251, two connecting elements L are determined, which are closest to the disconnected position and are respectively located at two sides of the disconnected position; and if one of the two connecting elements L is a transistor TFT and the other is a compensation structure 60, and the sub-pixel 20 to which the transistor TFT belongs and the sub-pixel 20 to which the common electrode 22 coupled to the compensation structure 60 belongs are different sub-pixels, among sub-pixels 20 coupled to the gate line 30 on which the disconnected position is located, the sub-pixel 20 to which the common electrode 22 coupled to the compensation structure 60 belongs is selected as a first repair sub-pixel P1, and the sub-pixel 20 to which the transistor TFT belongs is selected as a second repair sub-pixel P2. The first repair sub-pixel P1 is coupled to the front portion F1 at the disconnected position and the second repair sub-pixel P2 is coupled to the rear portion F2 at the disconnected position.

In S252, one common electrode line 50 coupled to (e.g., having an overlapping region with) the common electrodes 22 of the first repair sub-pixel P1 and the second repair sub-pixel P2 is determined as a selected common electrode line 50'.

In S3, S3 includes the following S351 to S355.

In S351, the front portion F1 at the disconnected position is coupled to the common electrode 22 of the first repair sub-pixel P1 through a first compensation structure C1 coupled to the common electrode 22 of the first repair sub-pixel P1.

In S352, the rear portion F2 at the disconnected position is coupled to the common electrode 22 of the second repair sub-pixel P2 through a first compensation structure C1 coupled to the common electrode 22 of the second repair sub-pixel P2.

In S353, transistors TFT of the first repair sub-pixel P1 and the second repair sub-pixel P2 are disconnected from data lines 40 to which the transistors TFT are coupled respectively. This can prevent the pixel electrodes 21 of the first repair sub-pixel P1 and the second repair sub-pixel P2 from being still loaded with data line signals from the data lines 40, thereby preventing the normal repair of the gate line 30 from being affected.

In S354, the selected common electrode line 50' is disconnected from other common electrodes 22 except the common electrodes 22 in the first repair sub-pixel P1 and the second repair sub-pixel P2 to form a separate line segment 50a cut from the selected common electrode line 50'.

In S355, the first compensation structure C1 and the second compensation structure C2 coupled to the common electrode 22 of the first repair sub-pixel P1 are disconnected from other common electrodes except the common electrode 22 of the first repair sub-pixel P1; and the first compensation structure C1 and the second compensation structure C2 coupled to the common electrode 22 of the second repair sub-pixel P2 are disconnected from other common electrodes except the common electrode 22 of the second repair sub-pixel P2. For example, the first compensation structures C1 and the second compensation structures C2 are severed, so as to prevent the common electrode 22 of the first repair sub-pixel P1 and the common electrode 22 of the second repair sub-pixel P2 from being still loaded with the common voltage signal from the common electrode line 50, thereby preventing the normal repair of the gate line 30 from being affected.

In this way, the disconnected position is bypassed through the communication path composed of the first compensation structure C1 coupled to the common electrode 22 of the first repair sub-pixel P1, the common electrode 22 of the first repair sub-pixel P1, the separate line segment 50a, the common electrode 22 of the second repair sub-pixel P2, and the first compensation structure C1 coupled to the common electrode 22 of the second repair sub-pixel P2, and the signal transmission can be shown as dotted arrows in FIG. 15.

It can be understood that there are no limitations on the order of S251 to S252 and S351 to S355, and the steps can be performed sequentially or simultaneously, which is not limited in the embodiments of the present disclosure.

In this way, the dark spots formed after the disconnected gate line is repaired by using the above repair method are only the first repair sub-pixel P1 and the second repair sub-pixel P2, which has less influence on the entire display panel and has better repair effect.

When the disconnected position on the gate line 30 is of the fifth type mentioned above, that is, when the disconnected position is between the transistor TFT and the compensation structure 60, the sub-pixel to which the transistor TFT belongs and the sub-pixel to which the common electrode coupled to the compensation structure belongs are different sub-pixels, and the first repair sub-pixel and the second repair sub-pixel are both coupled to respective compensation structures, any repair method illustrated in FIGS. 12 to 15 can be selected.

For example, the step S351 includes the following step.

With continued referring to FIG. 15, the front portion F1 at the disconnected position and the first compensation structure C1 coupled to the common electrode 22 of the first repair sub-pixel P1 are welded and connected For example, the step S352 includes the following step.

With continued referring to FIG. 15, the rear portion F2 at the disconnected position and the first compensation structure C1 coupled to the common electrode 22 of the second repair sub-pixel P2 are welded and connected.

Since the first compensation structure C1 coupled to the common electrode 22 of the first repair sub-pixel P1 is electrically connected to the common electrode 22 of the first repair sub-pixel P1, when the front portion F1 at the disconnected position is welded and connected to this first compensation structure C1, the front portion F1 at the disconnected position is electrically connected to the common electrode 22 of the first repair sub-pixel P1. Since the first compensation structure C1 coupled to the common electrode 22 of the second repair sub-pixel P2 is electrically connected to the common electrode 22 of the second repair sub-pixel P2, when the rear portion F2 at the disconnected position is welded and connected to this first compensation structure C1, the rear portion F2 at the disconnected position is electrically connected to the common electrode 22 of the second repair sub-pixel P2.

The above description of the compensation structures 60 shows that welding and connecting the front portion F1 at the disconnected position and the first compensation structure C1 can be realized by welding and connecting portions having an overlapping region of the front portion F1 at the disconnected position and the first compensation structure C1, and that welding and connecting the rear portion F2 at the disconnected position and another first compensation structure C1 can be realized by welding and connecting portions having an overlapping region of the rear portion F2 at the disconnected position and the another first compensation structure C1.

On the basis of the repair method shown in FIG. 15, it is further considered that after the gate line signal loaded on the disconnected gate line 30 is continuously transmitted through the connection path mentioned above, the gate line signal is loaded on the common electrode 22 of the first repair sub-pixel P1 and the common electrode 22 of the second repair sub-pixel P2 instead of the common voltage signal that should have been loaded when the gate line 30 is not disconnected. Therefore, it is difficult for the first repair sub-pixel P1 and the second repair sub-pixel P2 to achieve normal display. In order to avoid the electric field generated between both the pixel electrode 21 of the first repair sub-pixel P1 and the pixel electrode 21 of the second repair sub-pixel P2 and respective common electrodes 22 loaded with the gate line signal in these sub-pixels, in which the electric field may affect the normal deflection of liquid crystal molecules near the first repair sub-pixel P1 and the second repair sub-pixel P2, the transistor TFT of the first repair sub-pixel P1 and the pixel electrode 21 of the first repair sub-pixel need to be disconnected, and the transistor TFT of the second repair sub-pixel P2 and the pixel electrode 21 of the second repair sub-pixel need to be disconnected.

For example, in the S353:

The method of disconnecting the transistor TFT of the first repair sub-pixel P1 from the data line 40 to which the transistor TFT of the first repair sub-pixel P1 is coupled includes, but is not limited to, the following three methods.

First, the first terminal (e.g., source S) of the transistor TFT of the first repair sub-pixel P1 is disconnected from the data line 40 to which the transistor TFT is coupled. For example, the first terminal (e.g., the source S) of the transistor TFT of the first repair sub-pixel P1 is severed.

Second, the second terminal (e.g., drain D) of the transistor TFT of the first repair sub-pixel P1 is disconnected from the pixel electrode 21 to which the transistor is electrically connected. For example, the second terminal (e.g., drain D) of the transistor TFT of the first repair sub-pixel P1 is severed.

Third, the first terminal (e.g., source S) of the transistor TFT of the first repair sub-pixel P1 is disconnected from the data line 40 to which the transistor is electrically connected, and the second terminal (e.g., drain D) of the transistor TFT of the first repair sub-pixel P1 is disconnected from the pixel electrode 21 to which the transistor TFT is electrically connected. For example, the first terminal (e.g., source S) and the second terminal (e.g., drain D) of the transistor TFT of the first repair sub-pixel P1 are severed.

The method of disconnecting the transistor TFT of the second repair sub-pixel P2 from the data line 40 to which the transistor TFT is coupled includes, but is not limited to, the following three methods.

First, the first terminal (e.g., source S) of the transistor TFT of the second repair sub-pixel P2 is disconnected from the data line 40 to which the transistor is electrically connected. For example, the first terminal (e.g., source S) of the transistor TFT of the second repair sub-pixel P2 is severed.

Second, the second terminal (e.g., drain D) of the transistor TFT of the second repair sub-pixel P2 is disconnected from the pixel electrode 21 to which the transistor is electrically connected. For example, the second terminal (e.g., drain D) of the transistor TFT is severed.

Third, the first terminal (e.g., source S) of the transistor TFT of the second repair sub-pixel P2 is disconnected from the data line 40 to which the transistor is electrically connected, and the second terminal (e.g., drain D) of the transistor TFT of the second repair sub-pixel P2 is disconnected from the pixel electrode 21 to which the transistor is electrically connected. For example, the first terminal (e.g., source S) and the second terminal (e.g., drain D) of the transistor TFT of the second repair sub-pixel P2 are severed.

It will be noted that FIG. 15 only illustrates the disconnection manner of "severing the first terminal of the transistor TFT", and the manner of "severing the second terminal of the transistor TFT" can be understood with reference to FIG. 15 and will not be elaborated.

For example, with continued referring to FIG. 15, the S354, in which the separate line segment 50*a* is formed, may include the following steps.

(1) In a row of sub-pixels 20 coupled to the selected common electrode line 50', two sub-pixels at two sides of and adjacent to the repair sub-pixels are determined as a first adjacent sub-pixel P1' and a second adjacent sub-pixel P2' respectively.

As shown in FIG. 15, along the extending direction of the gate line 30, the first adjacent sub-pixel P1' is a previous sub-pixel 20 immediately adjacent to the first repair sub-pixel P1, and the second adjacent sub-pixel P2' is a next sub-pixel 20 immediately adjacent to the second repair sub-pixel P2.

(2) A portion of the selected common electrode line 50' between the common electrode 22 of the first repair sub-pixel P1 and the common electrode 22 of the first adjacent sub-pixel P1' is severed.

(3) A portion of the selected common electrode line 50' between the common electrode 22 of the second repair sub-pixel P2 and the common electrode 22 of the second adjacent sub-pixel P2' is severed.

In this way, a separate line segment 50*a* is formed, which is electrically connected to the common electrodes 22 of the first repair sub-pixel P1 and the second repair sub-pixel P2 and is cut off from the selected common electrode line 50'.

That is, portions of the selected common electrode lines 50' respectively at two sides of the repair unit composed of the first repair sub-pixel P1 and the second repair sub-pixel P2 are severed to form the separate line segments 50*a*, so that the separate line segments 50*a* is electrically isolated from the common electrodes 22 of other sub-pixels 20.

The above (1), (2) and (3) are only for the purpose of distinguishing the levels of description and do not limit the order of the above steps.

For example, with continued referring to FIG. 15, in the S355:

The method of disconnecting the first compensation structure C1 coupled to the common electrode 22 of the first repair sub-pixel P1 from another common electrode 22 except the common electrode 22 of the first repair sub-pixel P1 includes:

Severing a portion of the first compensation structure C1 between a first connecting portion and a second connecting portion of the first compensation structure C1. The first connecting portion refers to a portion of the first compensation structure C1 coupled to the front portion F1 at the disconnected position. For example, when the front portion F1 at the disconnected position and the first compensation structure C1 are connected by using the above welding manner, the first connecting portion is the welded portion of the first compensation structure C1 welded and connected to the front portion F1 at the disconnected position. The second connecting portion is a portion of the first compensation structure C1 coupled to another common electrode 22 except the common electrode 22 of the first repair sub-pixel P1. For example, the second connecting portion is an overlapping portion of the first compensation structure C1 having an overlapping region with another common electrode 22 except the common electrodes 22 of the first repair sub-pixel P1.

The method of disconnecting the second compensation structure C2 coupled to the common electrode 22 of the first repair sub-pixel P1 from another common electrode 22 except the common electrode 22 of the first repair sub-pixel P1, includes:

Severing a portion of the second compensation structure C2 between two common electrodes 22 to which the second compensation structure C2 is coupled.

The manner of disconnecting both the first compensation structure C1 and the second compensation structure C2 that are coupled to the common electrode 22 of the second repair sub-pixel P2 from other common electrodes 22 except the common electrode 22 of the second repair sub-pixel P2 is the same as the manner of disconnecting both the first compensation structure C1 and the second compensation structure C2 that are coupled to the common electrode 22 of the first repair sub-pixel P1 from other common electrodes 22 except the common electrode 22 of the first repair sub-pixel P1, and can be understood with reference to FIG. 15 and will not be elaborated herein.

For example, in the S355, the method of disconnecting the first compensation structure C1 coupled to the common electrode 22 of the second repair sub-pixel P2 from another common electrode 22 except the common electrodes 22 of the second repair sub-pixel P2 can follow the method of disconnecting the first compensation structure C1 coupled to the common electrode 22 of the first repair sub-pixel P1 from another common electrode except the common electrode 22 of the first repair sub-pixel P2, and will not be elaborated herein.

In the exemplary embodiments illustrated in FIGS. 6 to 15, the welding and connecting mode includes, but is not limited to, a laser welding mode. That is, the portions having an overlapping region of two parts to be connected are fused by the laser with high energy density, so that the portions are directly fused together by the portion passing through the insulating layer between the two parts and the electrical connection is realized.

In order to prevent the laser with high energy density from adversely affecting other structures in the array substrate 01, corresponding structures can be welded from one side of the base substrate (i.e., the laser penetrates the base substrate first) for connection.

In addition, the portions connected by welding (which may be a laser welding point as an example) include, but are not limited to, the portions illustrated in FIGS. 6 to 15, as long as the two fused conductive structures can be fully welded together to achieve electrical connection.

In the above exemplary embodiments, the severing method includes, but is not limited to, laser cutting, i.e., heating the corresponding structure with the laser with high energy density to make its temperature rise rapidly and reach the boiling point of the material of the structure in a very short time, so as to gasify the material to vapor. The vapor is ejected at a very fast speed, and the cut can be formed on the corresponding structure at the same time. Thus the corresponding structure is severed.

In order to prevent the laser with high energy density from adversely affecting other structures in the array substrate 01, the severing may be made by the laser on corresponding structures from one side of the base substrate (i.e., the laser penetrates the base substrate first).

It will be noted that the sequence numbers of the steps indicated by the letter "S" in the above examples of repair methods provided by the embodiments of the present disclosure are only numbers for the convenience of description and do not strictly represent the actual sequence of steps. Those skilled in the art have the ability to adjust the sequence of the steps after understanding the technical solutions of the embodiments of the present disclosure, which should fall within the scope disclosed by the embodiments of the present disclosure.

On the basis of the above-mentioned method for repairing the gate-line disconnection, some embodiments of the present disclosure provide a method for repairing a short circuit between a gate line and a data line in an array substrate. As shown in FIGS. 16 to 20, the method for repairing the short circuit between the gate line and the data line include the following steps.

A short-circuit position between the gate line 30 and the data line 40 (indicated as DGS in FIGS. 16 to 20) is determined.

Portions of the gate line 30 at two sides of and adjacent to the short-circuit position along the extending direction of the gate line 30 are severed to form a disconnection of the gate line 30.

The disconnected gate line 30 is repaired by using the above-mentioned method for repairing the gate-line disconnection illustrated in FIGS. 6 to 8 and 10 to 15.

That is, in the method for repairing the short circuit between the gate line and the dataline provided by the embodiments of the present disclosure, the short circuit between the gate line and the data line is converted into the disconnection of the gate line, and then the gate line is repaired by using the above-mentioned method for repairing the gate-line disconnection, thereby expanding the repair types for the poor signal lines in the array substrate.

Referring to the aforementioned division method for the disconnected position on the gate line 30, the short circuit between the gate line 30 and the data line 40 includes the following four types.

Figure 16:
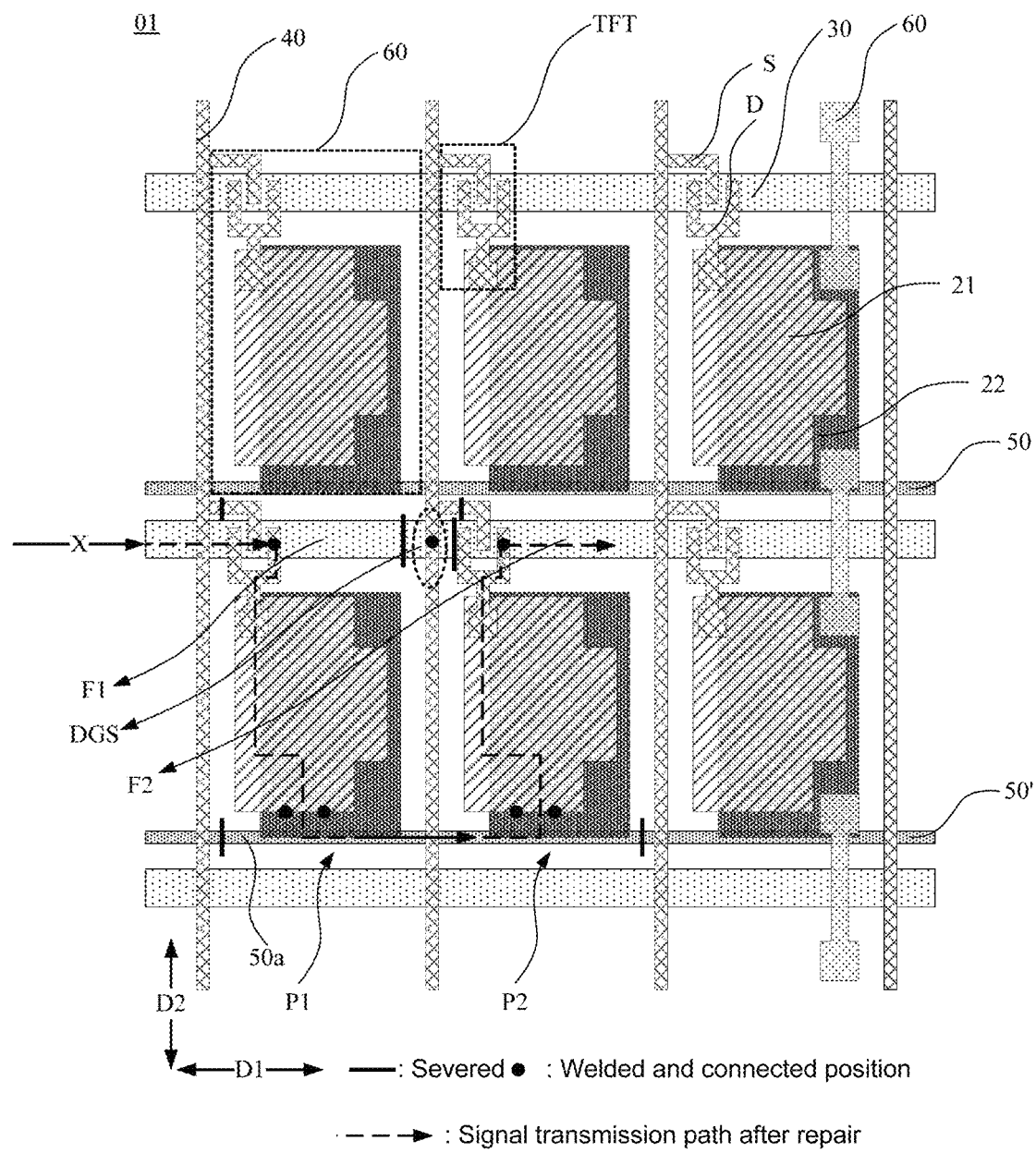
FIG. 16 is a schematic diagram showing a method for repairing a short circuit between a gate line and a data line, in accordance with some embodiments of the present disclosure.

First, as shown in FIG. 16, the common electrode 22 of the first repair sub-pixel P1 and the common electrode 22 of the second repair sub-pixel P2 are not coupled to compensation structures 60. In this case, portions of the gate line 30 at two sides of and adjacent to the short-circuit position in the extending direction of the gate line 30 are severed, and after a disconnection of the gate line 30 is formed, the disconnected position of the gate line 30 is located between two transistors TFT.

Figure 17:
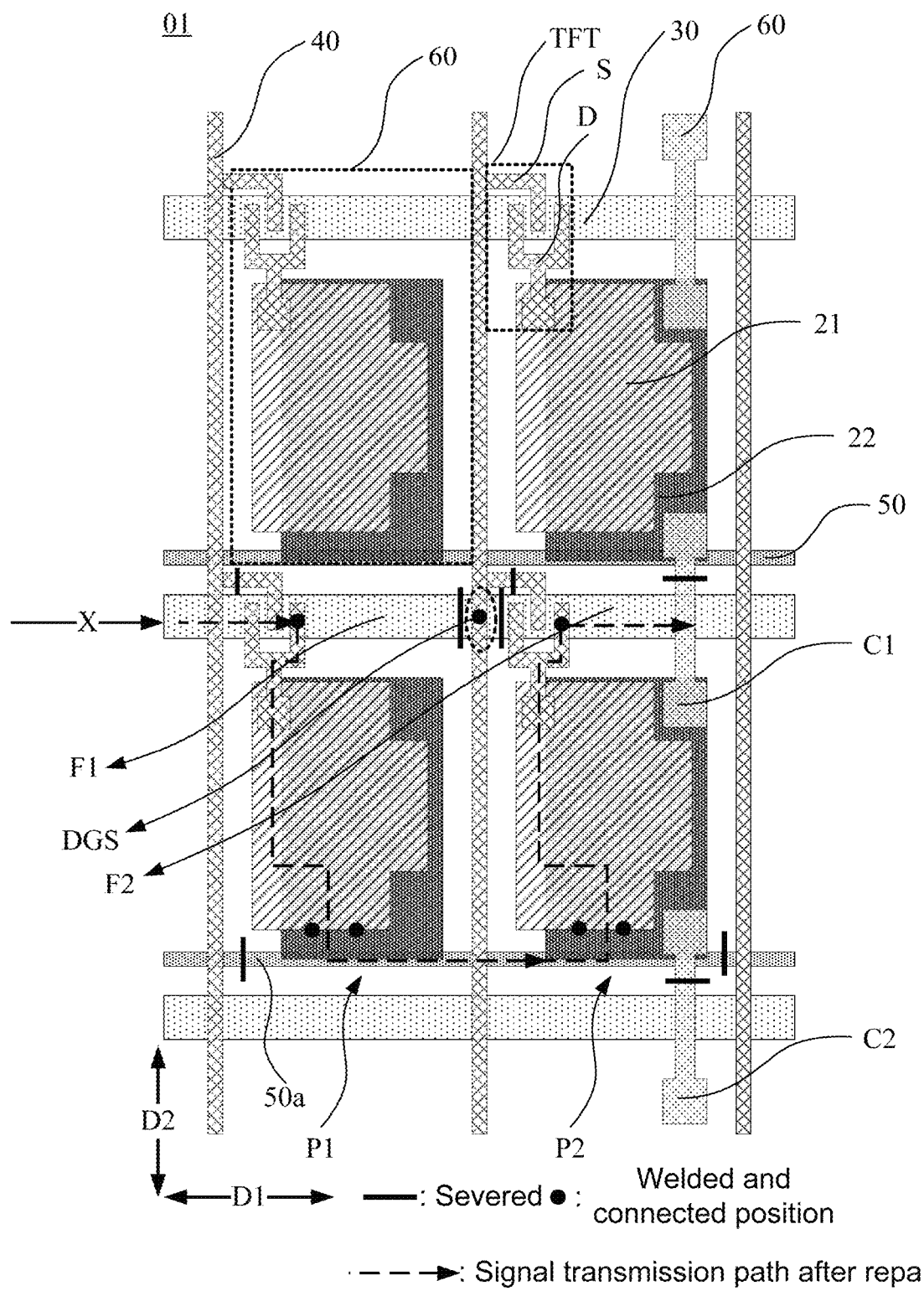
FIG. 17 is a schematic diagram showing another method for repairing a short circuit between a gate line and a data line, in accordance with some embodiments of the present disclosure.
Figure 18:
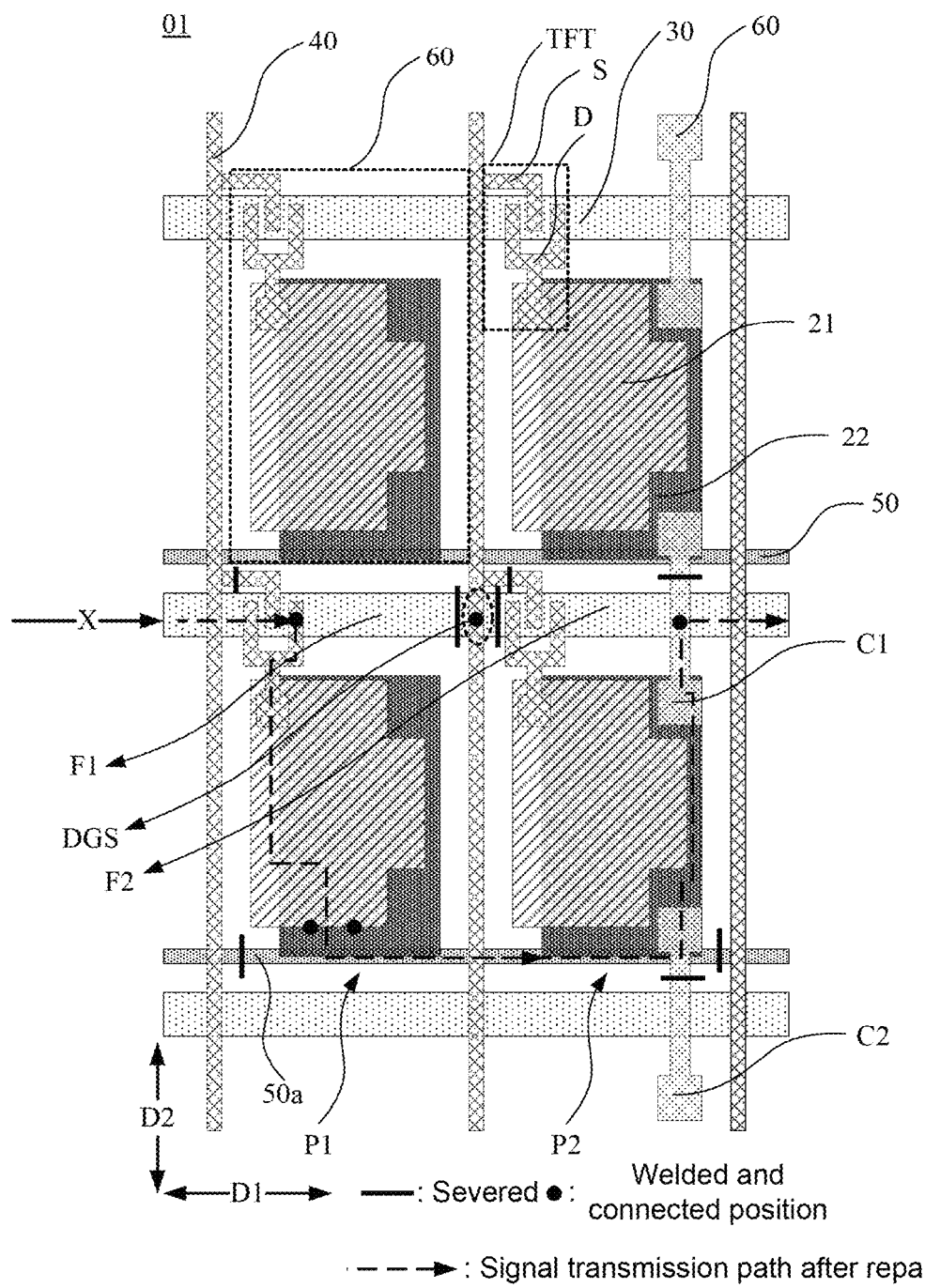
FIG. 18 is a schematic diagram showing yet another method for repairing a short circuit between a gate line and a data line, in accordance with some embodiments of the present disclosure.

Second, as shown in FIGS. 17 and 18, the common electrode 22 of the first repair sub-pixel P1 is not coupled to compensation structures 60 but the common electrode 22 of the second repair sub-pixel P2 is coupled to compensation structures 60. In this case, portions of the gate line 30 at two sides of and adjacent to the short-circuit position in the extending direction of the gate line 30 are severed, and after a disconnection of the gate line 30 is formed, the disconnected position of the gate line 30 is located between two transistors TFT.

Figure 19:
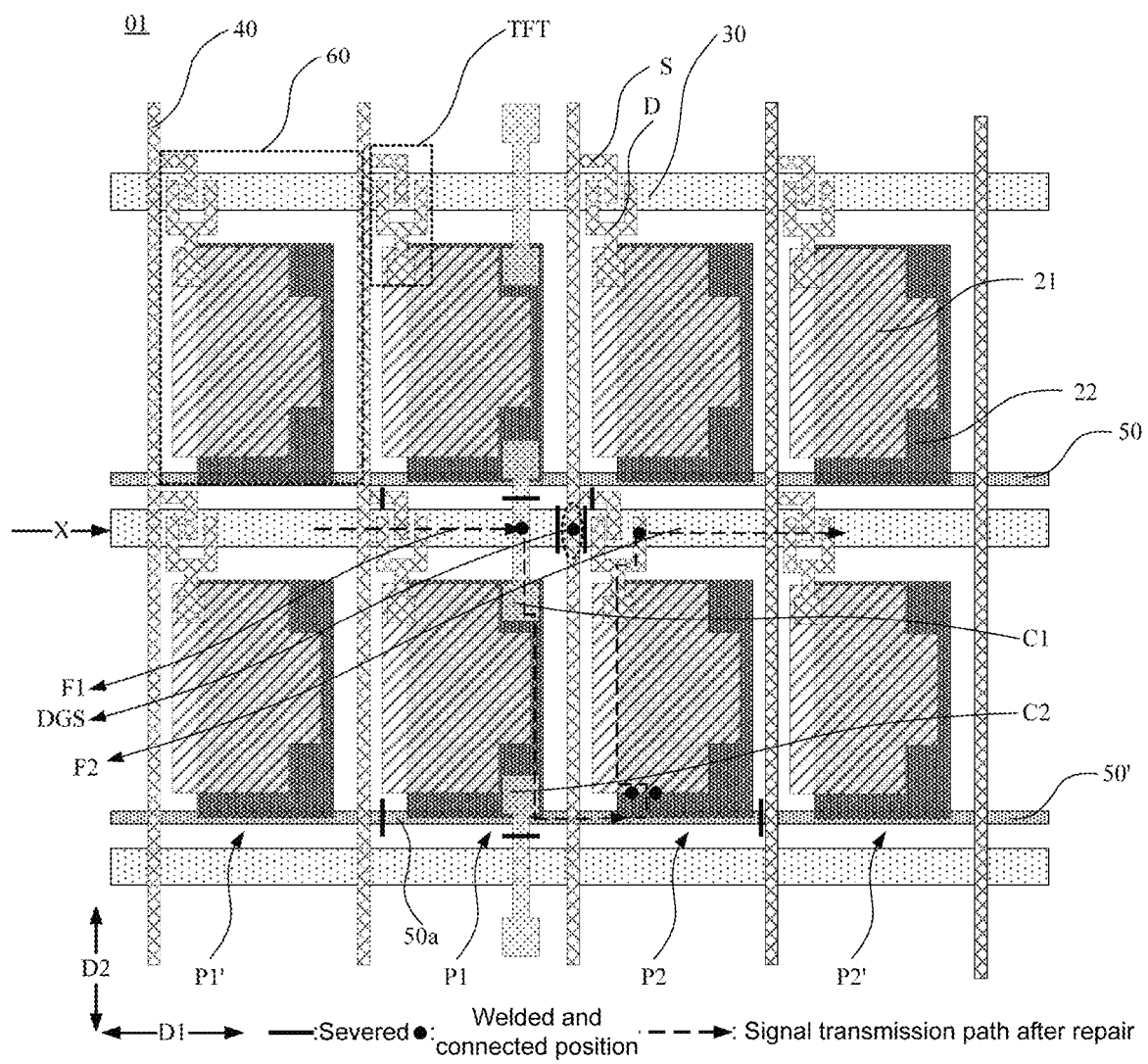
FIG. 19 is a schematic diagram showing yet another method for repairing a short circuit between a gate line and a data line, in accordance with some embodiments of the present disclosure.

Third, as shown in FIG. 19, the common electrode 22 of the first repair sub-pixel P1 is coupled to compensation structures 60 but the common electrode 22 of the second repair sub-pixel P2 is not coupled to compensation structures 60. In this case, portions of the gate line 30 at two sides of and adjacent to the short-circuit position in the extending direction of the gate line 30 are severed, and after a disconnection of the gate line 30 is formed, the disconnected position of the gate line 30 is located between a compensation structure 30 and a transistor TFT.

Figure 20:
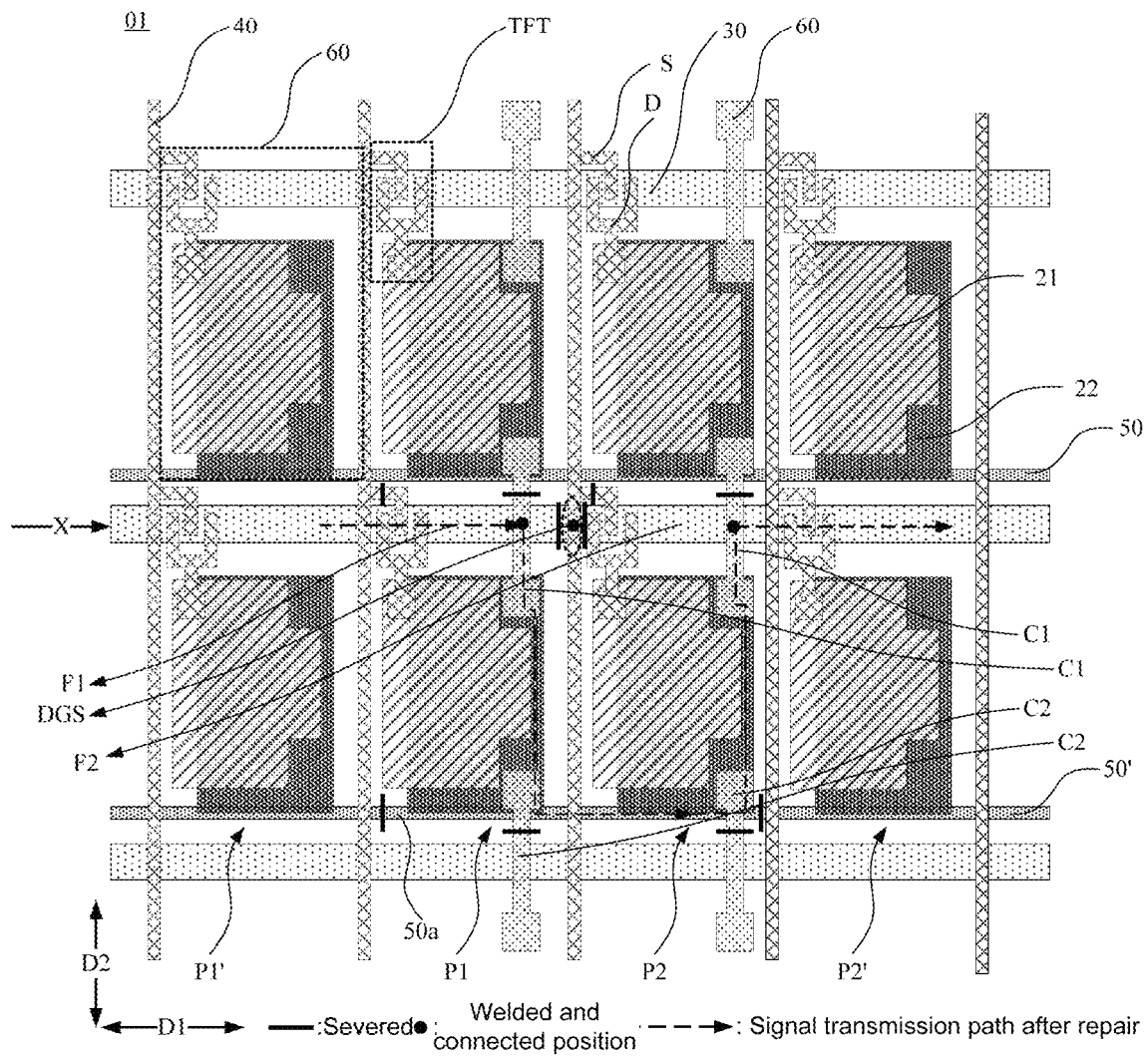
FIG. 20 is a schematic diagram showing yet another method for repairing a short circuit between a gate line and a data line, in accordance with some embodiments of the present disclosure.

Fourth, as shown in FIG. 20, the common electrode 22 of the first repair sub-pixel P1 and the common electrode 22 of the second repair sub-pixel P2 are both coupled to respective compensation structures 60. In this case, portions of the gate line 30 at two sides of and adjacent to the short-circuit position in the extending direction of the gate line 30 are severed, and after a disconnection of the gate line 30 is formed, the disconnected position of the gate line 30 is located between a compensation structure 30 and a transistor TFT.

For the first case, i.e., the position of the short circuit between the gate line and the data line schematically shown in FIG. 16, with regard to the repair process, reference may be made to the related description of the method for repairing the gate-line disconnection as shown in FIG. 6. For the second case, i.e., the position of the short circuit between the gate line and the data line schematically shown in FIGS. 17 and 18, with regard to the repair process, reference may be made to the related description of the method for repairing the gate-line disconnection as shown in FIGS. 7 and 8. For the third case, i.e., the position of the short circuit between the gate line and the data line schematically shown in FIG. 19, with regard to the repair process, reference may be made to the related description of the method for repairing the gate-line disconnection shown in FIGS. 10 and 11. For the fourth case, i.e., the position of the short circuit between the gate line and the data line shown in FIG. 20, with regard to the repair process, reference may be made to the related description of the method for repairing the gate-line disconnection as shown in FIGS. 12 to 15. Specific steps will not be elaborated here.

It can be understood that in the above-mentioned methods for converting the short circuit between the gate line and the data line into the disconnection of the gate line provided by the embodiments of the present disclosure, the design at the overlap between the gate line 30 and the data line 40 in the applicable array substrate 01 may be referred to the design in FIG. 1, that is, as shown by the dotted frame at the overlap between the gate line 30 and the data line 40 in FIG. 1, the width of the region of the gate line 30 that overlaps the data line 40 is less than the width of other regions on the gate line 30. That is, the gate line 30 is divided into wider regions and narrower regions, and those two kinds of regions are arranged alternately.

In this way, it is convenient to sever the short-circuit position between the gate line 30 and the data line 40, and it is also possible to reduce the overlapping region where the gate line 30 and the data line 40 cross and to reduce the parasitic capacitance between the two.

In addition, in order to prevent the laser with high energy density from adversely affecting the data line 40 in the array substrate 01, the gate line 30 could be severed by the laser from one side of the base substrate (i.e., the laser penetrates the base substrate first). Therefore, in order to facilitate severing the short-circuit position between the gate line 30 and the data line 40, the gate line 30 may be disposed below the data line 40, that is, the gate line 30 is closer to the base substrate of the array substrate 01 relative to the data line 40.

On the basis of the above embodiments, some embodiments of the present disclosure provide a repair structure for a gate-line disconnection in an array substrate. The repair structure is formed by any of the methods for repairing the gate-line disconnection corresponding to FIGS. 6 to 15, or by any of the methods for repairing the short circuit between the gate line and the data line corresponding to FIGS. 16 to 20.

Referring to FIG. 6, the repair structure 100 includes a disconnected gate line 30, one or two repair sub-pixels and a selected common electrode line 50'.

The disconnected gate line 30, for one disconnected position, includes a front portion F1 and a rear portion F2 at the disconnected position.

The one or two repair sub-pixels are, for example, a first repair sub-pixel P1 and/or a second repair sub-pixel P2, and each repair sub-pixel includes a transistor TFT, a pixel electrode 21, and a common electrode 22.

The selected common electrode line 50' is a common electrode line coupled to the common electrode 22 of each repair sub-pixel among a plurality of common electrode lines 50 of the array substrate 01. The selected common electrode line 50' includes the separate line segment 50a coupled to the common electrode 22 of each repair sub-pixel. The separate line segment 50a is a common electrode line segment obtained by severing the selected common electrode line 50', and it is not coupled to other portions of the selected common electrode line 50'.

In the above-described repair structure 100, there is a communication path between the front portion F1 and the rear portion F2 at the disconnected position, and the communication path is configured to bypass the disconnected position. The communication path is formed by the repair method described in any of the above embodiments. The communication path includes at least the common electrode 22 of each repair sub-pixel and the separate line segment 50a in the selected common electrode line 50'. The common electrodes 22 in the communication path is not coupled to other common electrodes, and each repair sub-pixel is not coupled to a data line 40.

In this way, the disconnection of the gate line 30 can be repaired by bypassing the disconnected position of the gate line 30 by the communication path in the above-mentioned repair structure 100, so as to ensure that the gate line 30 can normally transmit scanning signals to the row of sub-pixels to which the gate line is coupled except the repair sub-pixels, thereby enabling the other sub-pixels to be normally turned on or turned off.

As shown in FIGS. 6 to 14, in some embodiments, the communication path includes at least a transistor TFT and a pixel electrode 21 of one repair sub-pixel, a common electrode 22 of each repair sub-pixel, and a separate line segment 50a in the selected common electrode line 50'.

For example, as shown in FIG. 6, the repair structure 100 includes two repair sub-pixels, namely, a first repair sub-pixel P1 coupled to the front portion F1 at the disconnected position and a second repair sub-pixel P2 coupled to the rear portion F2 at the disconnected position. In addition, the common electrode 22 of the second repair sub-pixel P2 is not coupled to compensation structures.

The front portion F1 at the disconnected position is coupled to the common electrode 22 of the first repair sub-pixel P1 through the second terminal of the transistor TFT of the first repair sub-pixel P1 and the pixel electrode 21 of the first repair sub-pixel. The rear portion F2 at the disconnected position is coupled to the common electrode 22 of the second repair sub-pixel P2 through the second terminal of the transistor TFT of the second repair sub-pixel P2 and the pixel electrode 21 of the second repair sub-pixel.

Thus, the communication path is formed between the front portion F1 and the rear portion F2 at the disconnected position by the second terminal of the transistor TFT of the first repair sub-pixel P1, the pixel electrode 21 of the first repair sub-pixel P1, the common electrode 22 of the first repair sub-pixel P1, the separate line segment 50a, the common electrode 22 of the second repair sub-pixel P2, the pixel electrode 21 of the second repair sub-pixel P2, and the second terminal of the transistor TFT of the second repair sub-pixel P2.

With regard to the specific structure of the repair structure shown in FIG. 6, reference may be made to the above description of the repair method corresponding to the FIG. 6, and details will not be elaborated here.

For example, as shown in FIG. 7, the repair structure includes two repair sub-pixels, namely, a first repair sub-pixel P1 coupled to the front portion F1 at the disconnected position and a second repair sub-pixel P2 coupled to the rear portion F2 at the disconnected position. In addition, the common electrode 22 of the second repair sub-pixel P2 is coupled to compensation structures.

The compensation structures coupled to the common electrode 22 of the second repair sub-pixel P2 include a first compensation structure C1 across the gate line 30 on which the disconnected position is located, and a second compensation structure C2 across the selected common electrode line 50'.

The front portion F1 at the disconnected position is coupled to the common electrode 22 of the first repair sub-pixel P1 through the second terminal of the transistor TFT of the first repair sub-pixel P1 and the pixel electrode 21 of the first repair sub-pixel. The rear portion F2 at the disconnected position is coupled to the common electrode 22 of the second repair sub-pixel P2 through the second terminal of the transistor TFT of the second repair sub-pixel P2 and the pixel electrode 21 of the second repair sub-pixel.

The first compensation structure C1 and the second compensation structure C2 are not coupled to other common electrodes 22 of the sub-pixels except the second repair sub-pixel P2.

In this way, the communication path is formed between the front portion F1 and the rear portion F2 at the disconnected position by the second terminal of the transistor TFT of the first repair sub-pixel P1, the pixel electrode 21 of the first repair sub-pixel P1, the common electrode 22 of the first repair sub-pixel P1, the separate line segment 50a, the common electrode 22 of the second repair sub-pixel P2, the pixel electrode 21 of the second repair sub-pixel P2, and the second terminal of the transistor TFT of the second repair sub-pixel P2.

With regard to the specific structure of the repair structure shown in FIG. 7, reference may be made to the above description of the repair method corresponding to FIG. 7, and details will not be elaborated here.

For example, as shown in FIG. 8, the repair structure includes two repair sub-pixels, namely, a first repair sub-pixel P1 coupled to the front portion F1 at the disconnected position and a second repair sub-pixel P2 coupled to the rear portion F2 at the disconnected position. In addition, the common electrode 22 of the second repair sub-pixel P2 is coupled to compensation structures.

The compensation structures coupled to the common electrode 22 of the second repair sub-pixel P2 include a first compensation structure C1 across the gate line 30 on which the disconnected position is located, and a second compensation structure 50a across the selected common electrode line 50'.

The front portion F1 at the disconnected position is coupled to the common electrode 22 of the first repair sub-pixel P1 through the second terminal of the transistor TFT of the first repair sub-pixel P1 and the pixel electrode 21 of the first repair sub-pixel. The rear portion F2 at the disconnected position is coupled to the common electrode 22 of the second repair sub-pixel P2 through the first compensation structure C1 to which the common electrode 22 of the second repair sub-pixel P2 is coupled.

The first compensation structure C1 and the second compensation structure C2 are not coupled to other common electrodes 22 of sub-pixels except the second repair sub-pixel P2.

In this way, the communication path is formed between the front portion F1 and the rear portion F2 at the disconnected position by the second terminal of the transistor TFT of the first repair sub-pixel P1, the pixel electrode 21 of the first repair sub-pixel P1, the common electrode 22 of the first repair sub-pixel P1, the separate line segment 50a, the common electrode 22 of the second repair sub-pixel P2, and the first compensation structure C1 coupled to the common electrode 22 of the second repair sub-pixel P2.

With regard to the specific structure of the repair structure shown in FIG. 8, reference may be made to the above description of the repair method corresponding to FIG. 8, and details will not be elaborated here.

For example, as shown in FIG. 9, the repair structure includes one repair sub-pixel, i.e., a first repair sub-pixel P1, which is coupled to the front portion F1 at the disconnected position and to compensation structures.

The compensation structures coupled to the common electrode 22 of the repair sub-pixel include a first compensation structure C1 across the gate line 30 on which the disconnected position is located, and a second compensation structure C2 across the selected common electrode line 50'.

The front portion F1 at the disconnected position is coupled to the common electrode 22 of the repair sub-pixel through the second terminal of the transistor TFT of the repair sub-pixel and the pixel electrode 21 of the repair sub-pixel. The rear portion F2 at the disconnected position is coupled to the common electrode 22 of the repair sub-pixel through the first compensation structure C1 coupled to the common electrode 22 of the repair sub-pixel.

The first compensation structure C1 and the second compensation structure C2 are not coupled to other common electrodes 22 of sub-pixels except the repair sub-pixel.

In this way, the communication path is formed between the front portion F1 and the rear portion F2 at the disconnected position by the second terminal of the transistor TFT of the first repair sub-pixel P1, the pixel electrode 21 of the first repair sub-pixel P1, the common electrode 22 of the first repair sub-pixel P1, the separate line segment 50a, and the first compensation structure C1 coupled to the common electrode 22 of the first repair sub-pixel P1.

With regard to the specific structure of the repair structure shown in FIG. 9, reference may be made to the above description of the repair method corresponding to FIG. 9, and details will not be elaborated here.

For example, FIGS. 10 to 14 show some other repair structures. With regard to specific structures of these repair structures, reference may be made to the above descriptions of the repair methods corresponding to FIGS. 10 to 14, and details will not be elaborated here.

As shown in FIG. 15, in some other embodiments, the communication path does not include the transistor TFT of each repair sub-pixel and the pixel electrode of each repair sub-pixel, and is composed of compensation structures coupled to the common electrode 22 of each repair sub-pixel, a common electrode 22 of each repair sub-pixel, and a separate line segment 50a in the selected common electrode line 50'.

For example, as shown in FIG. 15, the repair structure includes two repair sub-pixels, namely, a first repair sub-pixel P1 coupled to the front portion F1 at the disconnected position and a second repair sub-pixel P2 coupled to the rear portion F2 at the disconnected position. In addition, the first repair sub-pixel P1 and the second repair sub-pixel P2 are coupled to respective compensation structures.

The compensation structures coupled to the common electrode 22 of the first repair sub-pixel P1 and the compensation structures coupled to the common electrode 22 of the second repair sub-pixel P2 include a first compensation structure C1 across the gate line 30 on which the disconnected position is located, and a second compensation structure C2 across the selected common electrode line 50'.

The front portion F1 at the disconnected position is coupled to the common electrode 22 of the first repair sub-pixel P1 through the first compensation structure C1 to which the common electrode 22 of the first repair sub-pixel P1 is coupled. The rear portion F2 at the disconnected position is coupled to the common electrode 22 of the second repair sub-pixel P2 through the first compensation structure C1 to which the common electrode 22 of the second repair sub-pixel P2 is coupled.

The first compensation structure C1 and the second compensation structure C2 coupled to the common electrode 22 of the first repair sub-pixel P1 are not coupled to common electrodes 22 of other sub-pixels except the first repair sub-pixel P1. The first compensation structure C1 and the second compensation structure C2 coupled to the common electrode 22 of the second repair sub-pixel P2 are not coupled to common electrodes 22 of other sub-pixels except the second repair sub-pixel P2.

In this way, the communication path is formed between the front portion F1 and the rear portion F2 at the disconnected position by the first compensation structure C1 coupled to the common electrode 22 of the first repair sub-pixel P1, the common electrode 22 of the first repair sub-pixel P1, the separate line segment 50a, the common electrode 22 of the second repair sub-pixel P2, and the first compensation structure C1 coupled to the common electrode 22 of the second repair sub-pixel P2.

With regard to the specific structure of the repair structure shown in FIG. 15, reference may be made to the above description of the repair method corresponding to FIG. 15, and details will not be elaborated here.

On the basis of the repair structures described in the above embodiments, some embodiments of the present disclosure provide an array substrate. As shown in FIGS. 6 to 15 and 16 to 20, the array substrate 01 includes at least one repair structure described above.

For example, in a case where the disconnection of the gate line and the short circuit between the gate line and the data line in the array substrate 01 are repaired by the above repair structures, the number of the repair structures included in the array substrate 01 is equal to the sum of the number of the disconnected gate lines and short-circuited gate lines and data lines in the array substrate 01, namely, one repair structure corresponds to one disconnected gate line or one short-circuited gate line and data line.

The array substrate 01 further includes elements or structures such as a plurality of gate lines 30, a plurality of data lines 50, a plurality of sub-pixels 60, etc. With regard to the specific structures thereof, reference may be made to the previous description of the structure of the array substrate 01, and details will not be elaborated here.

Figure 21:
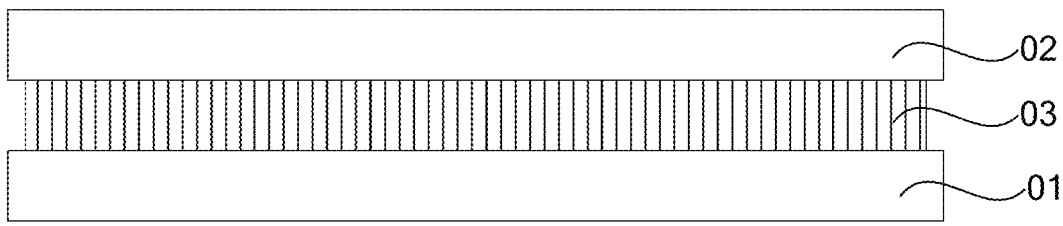
FIG. 21 is a schematic cross-sectional structural view of a display device, in accordance with some embodiments of the present disclosure.

On the basis of the above-mentioned embodiments, some embodiments of the present disclosure provide a display device 1A. As shown in FIG. 21, the display device 1A includes an array substrate 01, which has been repaired by the above-mentioned method of repairing the gate-line disconnection or has been repaired by the above-mentioned method of repairing the short circuit between the gate line and the data line. That is, the array substrate 01 is the array substrate 01 provided in the above embodiments.

With continued referring to FIG. 21, in some embodiments, the display device 1A is a liquid crystal display device, and may further include an opposite substrate 02 disposed opposite to the array substrate 01, and a liquid crystal layer 03 between the array substrate 01 and the opposite substrate 02.

For example, the opposite substrate 02 may be a color filter substrate. Alternatively, when the array substrate 01 is a color filter on array (COA) type array substrate, that is, when a color filter film is formed in the array substrate 01, the opposite substrate 02 may be a cover plate such as a cover glass.

Ina case where the display device 1A is a liquid crystal display device, each sub-pixel in the array substrate 01 includes a pixel electrode and a common electrode. After the array substrate 01 and the opposite substrate 02 are packaged to form the liquid crystal display panel included in the liquid crystal display device, the liquid crystal display panel may be the advanced-super dimensional switching (AD-SDS) type panel. The edge electric field generated between the pixel electrode and the common electrode in the array substrate enables the oriented liquid crystal molecules between the electrodes and above the electrodes to be deflected in the plane direction parallel to the display surface of the display panel, thereby increasing the viewing angle, while improving the light transmission efficiency of the liquid crystal layer.

The display device 1A may further include a backlight module for providing backlight, a driving circuit, etc. The specific structures thereof will not be elaborated here.

The display device provided by the embodiments of the present disclosure may be any device that displays dynamic images (like videos) or still texts and pictures (like still images). More specifically, it is expected that the embodiments may be implemented in, or associated with a variety of electronic devices including, but not limited to, mobile phones, wireless devices, portable android devices (PADs), handheld or portable computers, receivers/navigators of global positioning systems (GPSs), cameras, MPEG-4 Part 14 (referred to as MP4) video players, video cameras, game consoles, watches, clocks, calculators, television monitors, flat panel displays, computer monitors, car displays (e.g., odometer displays), navigators, cockpit controllers and/or displays, displays of camera views (e.g., displays of rear view cameras in vehicles), electronic photos, electronic billboards or signs, projectors, building structures, packaging and aesthetic structures (e.g., displays for displaying images of a piece of jewelry).

The above contents are merely specific embodiments of the present disclosure, but the scope of protection of the present disclosure is not limited thereto, and any conceivable change or substitution within the scope of the present disclosure by the skilled in the art should be covered within the scope of the present disclosure.

What is claimed is:

1. A method for repairing a gate-line disconnection in an array substrate, the array substrate comprising a base substrate, a plurality of sub-pixels, a plurality of gate lines, a plurality of data lines, a plurality of common electrode lines and a plurality of compensation structures, wherein, each sub-pixel includes a transistor, a pixel electrode and a common electrode, transistors of a row of sub-pixels are coupled to a same gate line, and transistors of a column of sub-pixels are coupled to a same data line, common electrodes of the row of sub-pixels are coupled to a same common electrode line, common electrodes of the plurality of sub-pixels are electrically connected through the plurality of common electrode lines and the plurality of compensation structures;

the method for repairing the gate-line disconnection comprises:

determining a disconnected position of a gate line;

determining two connecting elements that are closest to the disconnected position and are respectively located at two sides of the disconnected position along an extending direction of the gate line on which the disconnected position is located, wherein the two connecting elements are two elements which are from transistors coupled to the gate line on which the disconnected position is located and compensation structures across the gate line and coupled to common electrodes of sub-pixels to which the gate line is coupled;

selecting one or two sub-pixels electrically connected to the determined two connecting elements as repair sub-pixels from the sub-pixels coupled to the gate line on which the disconnected position is located; determining a common electrode line coupled to a common electrode of each repair sub-pixel as a selected common electrode line;

forming a communication path between a front portion and a rear portion at the disconnected position to bypass the disconnected position by using the communication path, the communication path including at least a transistor and a pixel electrode of one repair sub-pixel, the common electrode of each repair sub-pixel and a separate line segment cut from the selected common electrode line, or the communication path including at least a compensation structure coupled to a common electrode of one repair sub-pixel, the common electrode of each repair sub-pixel, and the separate line segment cut from the selected common electrode line;

disconnecting the common electrode in the communication path from other common electrodes; and disconnecting each repair sub-pixel from a data line to which the repair sub-pixel is coupled;

wherein an orthogonal projection of the pixel electrode on the base substrate and an orthogonal projection of the common electrode line on the base substrate are separated from each other;

the orthogonal projection of the common electrode on the base substrate partially overlaps the orthogonal projection of the pixel electrode on the base substrate, and the orthogonal projection of the common electrode on the base substrate partially overlaps the orthogonal projection of the common electrode line on the base substrate;

the common electrode line electrically connects a row of common electrodes in a row direction of the sub-pixels; and the compensation structures electrically connect a column of common electrodes in a column direction of the sub-pixels.

2. The method for repairing the gate-line disconnection according to claim 1, wherein a common electrode line is disposed between every two adjacent gate lines;

the plurality of compensation structures are divided into a plurality of groups, each group of compensation structures includes multiple compensation structures arranged at intervals along a column direction; compensation structures in each group of compensation structures are alternately arranged with common electrodes of a column of sub-pixels to connect the common electrodes of the column of sub-pixels in series;

the two connecting elements that are closest to the disconnected position and are respectively located at two sides of the disconnected position are two transistors, or one transistor and one compensation structure.

3. The method for repairing the gate-line disconnection according to claim 2, wherein selecting one or two sub-pixels electrically connected to the determined two connecting elements as repair sub-pixels from the sub-pixels coupled to the gate line on which the disconnected position is located, includes:

if the two connecting elements that are closest to the disconnected position and are respectively located at two sides of the disconnected position are two transistors, selecting sub-pixels to which the two transistors respectively belong as a first repair sub-pixel and a second repair sub-pixel;

if the two connecting elements that are closest to the disconnected position and are respectively located at two sides of the disconnected position are one transistor and one compensation structure, and a sub-pixel to which the one transistor belongs and a sub-pixel to which a common electrode coupled to the one compensation structure belongs are different sub-pixels, selecting the sub-pixel to which the common electrode coupled to the one compensation structure belongs as the first repair sub-pixel, and the sub-pixel to which the one transistor belongs as the second repair sub-pixel; and if the two connecting elements that are closest to the disconnected position and are respectively located at two sides of the disconnected position are one transistor and one compensation structure, and a sub-pixel to which the one transistor belongs and a sub-pixel to which a common electrode coupled the one compensation structure belongs are a same sub-pixel, selecting the same sub-pixel to which the one transistor belongs as the first repair sub-pixel, wherein the first repair sub-pixel is coupled to the front portion at the disconnected position, and the second repair sub-pixel is coupled to the rear portion at the disconnected position.

4. The method for repairing the gate-line disconnection according to claim 3, wherein in a case where the two connecting elements that are closest to the disconnected position and are respectively located at two sides of the disconnected position are the two transistors and a common electrode of the second repair sub-pixel is not coupled to compensation structures, forming the communication path between the front portion and the rear portion at the disconnected position includes:

coupling the front portion at the disconnected position to a common electrode of the first repair sub-pixel through a second terminal of a transistor of the first repair sub-pixel and a pixel electrode of the first repair sub-pixel; and coupling the rear portion at the disconnected position to a common electrode of the second repair sub-pixel through a second terminal of a transistor of the second repair sub-pixel and a pixel electrode of the second repair sub-pixel.

5. The method for repairing the gate-line disconnection according to claim 3, wherein in a case where the two connecting elements that are closest to the disconnected position and are respectively located at two sides of the disconnected position are the two transistors and a common electrode of the second repair sub-pixel is coupled to compensation structures, the compensation structures coupled to the common electrode of the second repair sub-pixel include a first compensation structure across the gate line on which the disconnected position is located and a second compensation structure across the selected common electrode line; and forming the communication path between the front portion and the rear portion at the disconnected position includes:

coupling the front portion at the disconnected position to a common electrode of the first repair sub-pixel through a second terminal of a transistor of the first repair sub-pixel and a pixel electrode of the first repair sub-pixel; and coupling the rear portion at the disconnected position to the common electrode of the second repair sub-pixel through a second terminal of a transistor of the second repair sub-pixel and a pixel electrode of the second repair sub-pixel.

6. The method for repairing the gate-line disconnection according to claim 3, wherein in a case where the two connecting elements that are closest to the disconnected position and are respectively located at two sides of the disconnected position are the two transistors and a common electrode of the second repair sub-pixel is coupled to compensation structures, the compensation structures coupled to the common electrode of the second repair sub-pixel include a first compensation structure across the gate line on which the disconnected position is located and a second compensation structure across the selected common electrode line, and forming the communication path between the front portion and the rear portion at the disconnected position includes:

coupling the front portion at the disconnected position to a common electrode of the first repair sub-pixel through a second terminal of a transistor of the first repair sub-pixel and a pixel electrode of the first repair sub-pixel; and coupling the rear portion at the disconnected position to the common electrode of the second repair sub-pixel through the first compensation structure coupled to the common electrode of the second repair sub-pixel.

7. The method for repairing the gate-line connection according to claim 5, wherein disconnecting the common electrode in the communication path from other common electrodes includes:

disconnecting the first compensation structure and the second compensation structure coupled to the common electrode of the second repair sub-pixel from other common electrodes except the common electrode of the second repair sub-pixel.

8. The method for repairing the gate-line disconnection according to claim 3, wherein in a case where the two connecting elements that are closest to the disconnected position and are respectively located at two sides of the disconnected position are the one transistor and the one compensation structure, and the sub-pixel to which the one transistor belongs and the sub-pixel to which the common electrode coupled to the one compensation structure belongs are the same sub-pixel, compensation structures coupled to the common electrode of the first repair sub-pixel include a first compensation structure across the gate line on which the disconnected position is located and a second compensation structure across the selected common electrode line; and forming the communication path between the front portion and the rear portion at the disconnected position includes:

coupling the front portion at the disconnected position to the common electrode of the first repair sub-pixel through a second terminal of a transistor of the first repair sub-pixel and a pixel electrode of the first repair sub-pixel; and coupling the rear portion at the disconnected position to the common electrode of the first repair sub-pixel through the first compensation structure coupled to the common electrode of the first repair sub-pixel.

9. The method for repairing the gate-line disconnection according to claim 8, wherein disconnecting the common electrode in the communication path from other common electrodes includes:

disconnecting the first compensation structure and the second compensation structure coupled to the common electrode of the first repair sub-pixel from other common electrodes except the common electrode of the first repair sub-pixel.

10. The method for repairing the gate-line disconnection according to claim 3, wherein in a case where the two connecting elements that are closest to the disconnected position and are respectively located at two sides of the disconnected position are the one transistor and the one compensation structure, the sub-pixel to which the transistor belongs and the sub-pixel to which the common electrode coupled to the compensation structure belongs are different sub-pixels, and the first repair sub-pixel and the second repair sub-pixel are both coupled to respective compensation structures, compensation structures coupled to the common electrode of the first repair sub-pixel and compensation structures coupled to the common electrode of the second repair sub-pixel all include: a first compensation structure across the gate line on which the disconnected position is located, and a second compensation structure across the selected common electrode line; and forming the communication path between the front portion and the rear portion at the disconnected position includes:

coupling the front portion at the disconnected position to the common electrode of the first repair sub-pixel through the first compensation structure coupled to the common electrode of the first repair sub-pixel; and coupling the rear portion at the disconnected position to the common electrode of the second repair sub-pixel through the first compensation structure coupled to the common electrode of the second repair sub-pixel.

11. The method for repairing the gate-line disconnection according to claim 10, wherein disconnecting the common electrode in the communication path from other common electrodes includes:

disconnecting the first compensation structure and the second compensation structure coupled to the common electrode of the first repair sub-pixel from other common electrodes except the common electrode of the first repair sub-pixel; and disconnecting the first compensation structure and the second compensation structure coupled to the common electrode of the second repair sub-pixel from other common electrodes except the common electrode of the second repair sub-pixel.

12. A repair structure for a gate-line disconnection in an array substrate, obtained by performing the method according to claim 1, the repair structure comprising:
the disconnected gate line including the front portion and the rear portion at the disconnected position;
the one or two repair sub-pixels, each repair sub-pixel including the transistor, the pixel electrode and the common electrode; and
the selected common electrode line including the separate line segment coupled to the common electrode of each repair sub-pixel, the separate line segment being not coupled to other portions of the selected common electrode line,
wherein, the front portion and the rear portion at the disconnected position have the communication path therebetween, and the communication path is configured to bypass the disconnected position, the communication path includes at least a transistor and a pixel electrode of one repair sub-pixel, the common electrode of each repair sub-pixel and the separate line segment in the selected common electrode line, or the communication path includes at least a compensation structure coupled to the common electrode of one repair sub-pixel, the common electrode of each repair sub-pixel, and the separate line segment cut from the selected common electrode line;
the common electrode in the communication path is disconnected to other common electrodes, and each repair sub-pixel is disconnected to the data line;
wherein the orthogonal projection of the pixel electrode on the base substrate and the orthogonal projection of the common electrode line on the base substrate are separated from each other;
the orthogonal projection of the common electrode on the base substrate partially overlaps the orthogonal projection of the pixel electrode on the base substrate, and the orthogonal projection of the common electrode on the base substrate partially overlaps the orthogonal projection of the common electrode line on the base substrate;
the common electrode line electrically connects the row of common electrodes in the row direction of the sub-pixels;
the compensation structures electrically connect the column of common electrodes in the column direction of the sub-pixels.

13. The repair structure according to claim 12, wherein the repair structure comprises two repair sub-pixels that are a first repair sub-pixel coupled to the front portion at the disconnected position and a second repair sub-pixel coupled to the rear portion at the disconnected position, and a common electrode of the second repair sub-pixel is not coupled to compensation structures;
the front portion at the disconnected position is coupled to a common electrode of the first repair sub-pixel through a second terminal of a transistor of the first repair sub-pixel and a pixel electrode of the first repair sub-pixel; and
the rear portion at the disconnected position is coupled to the common electrode of the second repair sub-pixel through a second terminal of a transistor of the second repair sub-pixel and a pixel electrode of the second repair sub-pixel.

14. The repair structure according to claim 12, wherein the repair structure comprises two repair sub-pixels that are a first repair sub-pixel coupled to the front portion at the disconnected position and a second repair sub-pixel coupled to the rear portion at the position, and a common electrode of the second repair sub-pixel is coupled to compensation structures;
the compensation structures coupled to the common electrode of the second repair sub-pixel include a first compensation structure across the gate line on which the disconnected position is located and a second compensation structure across the selected common electrode line;
the front portion at the disconnected position is coupled to a common electrode of the first repair sub-pixel through a second terminal of a transistor of the first repair sub-pixel and a pixel electrode of the first repair sub-pixel;
the rear portion at the disconnected position is coupled to the common electrode of the second repair sub-pixel through a second terminal of a transistor of the second repair sub-pixel and a pixel electrode of the second repair sub-pixel; and
the first compensation structure and the second compensation structure are not coupled to common electrodes of other sub-pixels except the second repair sub-pixel.

15. The repair structure according to claim 12, wherein the repair structure comprises two repair sub-pixels that are a first repair sub-pixel coupled to the front portion at the disconnected position and a second repair sub-pixel coupled to the rear portion at the disconnected position, and a common electrode of the second repair sub-pixel is coupled to compensation structures;
the compensation structures coupled to the common electrode of the second repair sub-pixel include a first compensation structure across the gate line on which the disconnected position is located and a second compensation structure across the selected common electrode line;
the front portion at the disconnected position is coupled to a common electrode of the first repair sub-pixel through a second terminal of a transistor of the first repair sub-pixel and a pixel electrode of the first repair sub-pixel;
the rear portion at the disconnected position is coupled to the common electrode of the second repair sub-pixel through the first compensation structure coupled to the common electrode of the second repair sub-pixel; and
the first compensation structure and the second compensation structure are not coupled to common electrodes of other sub-pixels except the second repair sub-pixel.

16. The repair structure according to claim 12, wherein the repair structure comprises one repair sub-pixel that is coupled to the front portion at the disconnected position and compensation structures;
the compensation structures coupled to a common electrode of the repair sub-pixel include a first compensation structure across the gate line on which the disconnected position is located and a second compensation structure across the selected common electrode line;
the front portion at the disconnected position is coupled to the common electrode of the repair sub-pixel through a second terminal of a transistor of the repair sub-pixel and a pixel electrode of the repair sub-pixel;
the rear portion at the disconnected position is coupled to the common electrode of the repair sub-pixel through the first compensation structure coupled to the common electrode of the repair sub-pixel;
the first compensation structure and the second compensation structure are not coupled to common electrodes of other sub-pixels except the repair sub-pixel.

17. The repair structure according to claim 12, wherein the repair structure comprises two repair sub-pixels that are a first repair sub-pixel coupled to the front portion at the disconnected position and a second repair sub-pixel coupled to the rear portion at the position, and common electrodes of the first repair sub-pixel and the second repair sub-pixel are both coupled to compensation structures;
  compensation structures coupled to a common electrode of the first repair sub-pixel and compensation structures coupled to a common electrode of the second repair sub-pixel all include a first compensation structure across the gate line on which the disconnected position is located and a second compensation structure across the selected common electrode line;
  the front portion at the disconnected position is coupled to the common electrode of the first repair sub-pixel through the first compensation structure coupled to the common electrode of the first repair sub-pixel;
  the rear portion at the disconnected position is coupled to the common electrode of the second repair sub-pixel through the first compensation structure coupled to the common electrode of the second repair sub-pixel;
  the first compensation structure and the second compensation structure coupled to the common electrode of the first repair sub-pixel are not coupled to common electrodes of other sub-pixels except the first repair sub-pixel, the first compensation structure and the second compensation structure coupled to the common electrode of the second repair sub-pixel are not coupled to common electrodes of other sub-pixels except the second repair sub-pixel.

18. A method for repairing a short circuit between a gate lien and a data line in an array substrate, the method comprising:
  determining a short-circuit position between a gate line and a data line;
  disconnecting two sides of and adjacent to the short-circuit position on the gate line along an extending direction of the gate line to form a disconnection;
  repairing the gate line with the disconnection by using the method for repairing the gate-line disconnection according to claim 1.

* * * * *